United States Patent Office 3,642,813
Patented Feb. 15, 1972

3,642,813
1,2,3-TRIAZOLES AS UV ABSORBERS
Rudolf Kirchmayr, Binningen, Hans-Jörg Heller, Riehen, and Jean Rody, Basel, Switzerland, assignors to Ciba-Geigy Corporation, Ardsley, N.Y.
No Drawing. Filed Feb. 2, 1968, Ser. No. 702,554
Claims priority, application Switzerland, Feb. 7, 1967, 1,893/67
Int. Cl. C07d 55/02, 99/02, 99/04
U.S. Cl. 260—308 A
6 Claims

ABSTRACT OF THE DISCLOSURE 1,2,3-triazole derivatives (so-called "v-triazoles") are described which are substituted in 1-position by an o-hydroxyphenyl or o-hydroxynaphthyl radical and which are useful as ultraviolet light-absorbing agents in the stabilization of organic materials especially synthetic polymeric materials which deteriorate under prolonged exposure to ultraviolet radiation; methods for using these compounds as UV-absorbing components, and organic materials stabilized therewith are also disclosed.

DETAILED DISCLOSURE

The present invention concerns new v-triazoles (1,2,3-triazoles) substituted in the 2-position, processes for the production thereof and their use as UV absorbers for light-sensitive organic materials against the injurious action of UV rays of light, e.g. as component of light filters in which the protection is given by covering with film-like articles or protective coatings which contain these triazole compounds, or their use for the stabilising of light-sensitive organic material by incorporating the v-triazole compounds thereinto homogeneously or on the surface.

Anellated v-triazoles, particularly benzotriazoles have often been suggested as UV absorbers and some have also been offered commercially. Some representatives of this class of compounds attain a high degree of fastness to light but, because of their self-colour, they often cause an unsuitable discolouration of the carrier materials or substrates stabilised therewith against deterioration caused by ultraviolet radiation which discolouration is one of the undesirable effects that their use should prevent. In addition, when used in some materials, they show insufficient compatibility with the substrate and insufficient fastness to sublimation.

Of the compounds having a triazole ring, the 1,2,4-triazoles have already been suggested as UV absorbers. Representatives of this class of compounds, however, are not suitable as stabilizers because of their insufficient fastness to light. Up to now they have become of no industrial importance because of their often marked accelerating effect on the yellowing of the substrates due to light.

In contrast thereto, the invention provides novel v-triazoles substituted in the 2-position by o-hydroxyphenyl or o-hydroxynaphthyl groups of the Formula I below, which, when possessing light fastnesses comparable to the previously known UV absorbers having other triazole ring systems, have less intrinsic colour and better compatibility with substrates to be stabilized, or when they have a comparable intrinsic colour, they show better compatibility or have better fastness to light.

Another essential advantage of the v-triazole compounds according to the invention is that, when their substituents are suitably chosen, their properties can very easily be adapted to the most various intended uses. Whilst the 4- and 5-position of the triazole ring in anellated v-triazoles is occupied by the other ring fused thereto, thus leaving no room for other substituents in these positions, the most important properties of the compounds according to the invention, such as solubility, migration properties, fastness to sublimation, intrinsic colour, drawing power from aqueous baths, etc., can be influenced in a simple way and adapted to the different requirements depending on the various uses; such adaptions can be effected by variation of the substituents in 4- and 5-position of the non-anellated triazole ring. In addition, the new v-triazoles are suitable as component of UV absorber formulations.

The v-triazoles substituted in 2-position according to the invention correspond to general Formula I

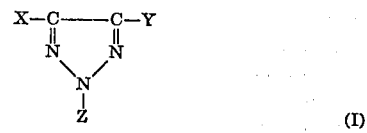

(I)

In this formula:
X and Y each represent hydrogen, a monovalent substituent or, together, they represent the radical of a non-aromatic ring fused to the v-triazole ring, preferably a hydroaromatic six-membered ring, and
Z represents an optionally further substituted o-hydroxyphenyl or o-hydroxynaphthyl radical.

When the visual appearance of the substrate to be protected is not to be changed, X, Y and Z must not impart distinct intrinsic colour to the molecule of the novel compounds. Otherwise, protection against deterioration by UV light might be given, but the intrinsic colour of the stabilizer would be imparted to the substrate.

The symbols X and Y in Formula I, irrependently of each other, have in particular the following meaning:
(a) Halogens, preferably chlorine or bromine,
(b) Secondary and tertiary acylamino groups of the formula

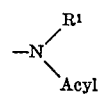

preferably, however, they have the meanings given below under (c), (d), (e) and (f):
(c) Hydrogen; preferably only X is hydrogen and Y is one of the radicals given below,
(d) An optionally modified carboxyl group, preferably a carboxyl group in free or salt form, a carboxylic acid ester of the formula —COOR$_2$, a carboxylic acid amide of the formula

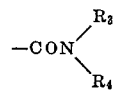

or a nitrile group,
(e) A non-colour imparting organic substituent Q, which comprises a carbon atom, being a saturated open chain or a ring carbon atom, via which carbon atom Q is linked to the 4- or 5-position of the v-triazole ring.
Any fused ring system of substituent Q consists of at most three rings having 5 or 6 members each, of which rings at most two are carbocyclic aromatic and at most one is heterocyclic, this heterocycle containing at most three ring members different from carbon, of which at most three are nitrogen and at most one is oxygen or sulphur,
(f) X and Y together represent the divalent organic radical Q' of a hydroaromatic six-membered ring formed by this radical and the two carbon atoms of the v-triazole ring, in particular a tetramethylene group optionally substituted by low alkyl groups, e.g. the tetramethylene group, the 1-methyltetramethylene group or the 1,3-dimethyl-tetramethylene group, or an optionally low alkyl substituted o,ω-phenylethylene group which, optionally, is further substituted at the benzene ring by sulphonic acid or low alkoxy groups.

In the formulae in which X and Y have the meanings given under (b) and (d):

$R_1$, $R_2$, $R_3$ and $R_4$ represent monovalent, optionally substituted alkyl, aralkyl, cycloalkyl or aryl radicals, in addition $R_1$, $R_3$ and $R_4$ also represent hydrogen, and Acyl represents the monovalent radical of an optionally cyclic oxygen acid, acyl being bound by a C, P or S atom to the nitrogen of the acylamino group.

For example, the substituents $R_1$, $R_2$, $R_3$, $R_4$ and Q mentioned have the following meanings:

$R_1$ represents hydrogen or an $R_5$ group, whereby $R_5$ represents an alkyl group having preferably 1 to 18 carbon atoms, e.g. a methyl, ethyl, propyl, isopropyl, butyl, octyl, dodecyl, tetradecyl or octadecyl group, a hydroxyalkyl or oxaalkyl group having 2 to 8 carbon atoms and 1 to 2 oxygen atoms, e.g. a 2-hydroxyethyl, 3-methoxypropyl or 2-(2-butoxyethoxy)-ethyl group, an optionally substituted alkenyl or oxaalkenyl group having preferably 2 to 12 carbon atoms and 0 to 2 chlorine and/or oxygen atoms, e.g. the allyl, methylallyl, 2-chloroallyl, $\Delta^9$-decenyl, 2-allyloxyethyl, 2-phenylallyl, 3-phenylallyl or the vinyl group, although $R_5$ only represents the latter group in compounds in which the vinyl group is not bound direct to an atom which simultaneously also has an acid hydrogen atom. Thus, vinyl esters or tertiary vinyl acid amides can be used but not compounds containing secondary vinyl acid amides of the formula Acyl—NH—CH=CH$_2$, an aralkyl or oxaaralkyl group having preferably 7 to 16 carbon atoms, 0 to 2 chlorine and/or oxygen atoms and a monocarbocyclic aryl group, e.g. a benzyl, α- and β-phenylethyl, 3-methylphenylmethyl, 4-chlorophenylmethyl, 3,4-dichlorophenylmethyl, 2,4-dimethoxyphenylmethyl, a 2-butoxy-5-tert. butylphenylmethyl, benzyloxyethyl or a phenoxyethyl group, a cycloalkyl group having preferably 5 to 10 carbon atoms of which 5 or 6 are ring members, e.g. a cyclopentyl, cyclohexyl or 4-tert.butylcyclohexyl group, $R_2$ represents an $R_5$ group or an aryl group having preferably 6 to 14 carbon atoms, 0 to 2 chlorine and/or oxygen atoms and a carbomonocyclic aryl ring, e.g. the phenyl, o-, m- and p-methylphenyl, 2,4-dimethylphenyl, m-chlorophenyl, p-methoxyphenyl, p-(1,1,3,3 - tetramethylbutyl)-phenyl, m-octyloxyphenyl or 3,4-dichlorophenyl group, $R_3$ and $R_4$ independently of each other represent hydrogen or an $R_2$ group whereby, in the carboxylic acid amide group

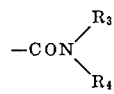

which can be symbolised by X and/or Y, preferably at least one of $R_3$ and $R_4$ is an $R_2$ group and at most one of $R_3$ and $R_4$ represents an aryl radical, and whereby, in the carboxylic acid amide group

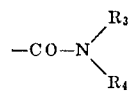

$R_3$ and $R_4$ together can also form the radical of a 5- or 6-membered nitrogen heterocycle, i.e. the grouping

can represent, e.g. the piperidyl-(1), morpholinyl-(4), 2- or 3-methyl-morpholinyl-(4), 2,6- or 3,5-dimethyl-morpholinyl-(4) or the pyrrolidinyl-(1) radical, and "Acyl" represents the monovalent radical of the compound Acyl-OH which imparts acidity to water when dispersed or dissolved therein, which acid compound can form acyl chlorides with at least one of the chlorides and oxychlorides of tetra- or hexa-valent sulphur or tri- or penta-valent phosphorus; these acyl chlorides of the formula Acyl-Cl yield, in their turn, upon reaction with alcohols or amines at below 100° C., esters or amides. The "Acyl" radical contains at least one oxygen or nitrogen atom and also at least one carbon atom per hetero atom P or S and, should there be no P and no S, it contains at least one carbon atom per hetero atom O and N.

For example, "Acyl" is the radical of an ammeline or ammelide such as 4,6-bis-dimethylamino-s-triazinyl-(2), 4-dibutylamino-6-ethoxy-s-triazinyl-(2); preferably however, Acyl is the radical of a carboxylic acid, particularly of the formula $R_3$—CO—, the radical of a sulphonic acid, particularly of the formula $R_2$—SO$_2$— or the radical of a carbonic acid half ester, particularly of the formula $R_2$—OCO—, wherein $R_2$ and $R_3$ have the meanings given above.

In all radicals defined above, an oxygen atom having two single bonds which is contained in $R_1$, $R_3$ or $R_4$ is separated from another oxygen atom by at least two carbon atoms.

Q, in the meaning of X or Y, can be monovalent, optionally substituted alkyl, aralkyl, cycloalkyl, aryl or heterocyclic radicals.

Preferably Q is an $R_2$ radical defined above or an $R_6$ radical.

By such $R_6$ radicals are meant: substituted alkyl radicals, preferably of the formula —$R_7$—A, substituted aralkyl radicals having preferably 7 to 16 carbon atoms of the formula —$R_8$—$R_9$, substituted aryl radicals having, preferably, 6 to 18 carbon atoms of the formula —$R_{10}$, optionally substituted heterocyclic radicals having 5- or 6-membered rings of which at most one is heterocyclic, this heterocycle preferably containing at most three ring members different from carbon of which at most 3 are nitrogen and at most one is oxygen or sulphur, e.g. the optionally substituted furanyl-(2), thienyl-(2), triazolyl-(4), pyridyl - (2), pyridyl - (3), benzothiazolyl - (6) or quinolinyl-(2) radical.

$R_7$, $R_8$, $R_9$ $R_{10}$ and A which, according to the above formulae are used in or as $R_6$, have the following meanings:

$R_7$ an alkylene group having, preferably, 1 to 10 carbon atoms, e.g. the methylene, ethylene, trimethylene, hexamethylene, propylene-(2-methylethylene) or 2,2-dimethyltrimethylene group, $R_8$ an optionally substituted alkylene group such as a group >CH—X or, preferably, an $R_7$ group, of which the methylene and ethylene group are particularly preferred, $R_9$ a monovalent substituted, preferably carbomonocyclic, aryl group the substituents of which are different from alkyl, alkoxy and chlorine and are, e.g. fluorine, bromine or the nitro group and, preferably an acylamino group of the formula

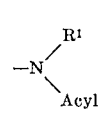

a carboxyl group in the free or salt form, a carboxylic acid ester group of the formula —COOR$_2$, a carboxylic acid amide group of the formula

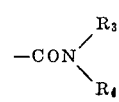

a nitrile group, a sulphonic acid group in free or salt form, a sulphonic acid ester group —SO$_2$OR$_{11}$, a sulphonamide group of the formula

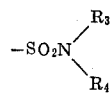

an alkylsulphone group the low alkyl moiety of which preferably contains 1–5 carbon atoms, an alkylmercapto group the alkyl of which preferably has 1 to 12 carbon atoms or an acylated hydroxyl group of the formula —O—Acyl, substituents bound by way of O, S or C being preferred, R$_{10}$ a monovalent aryl group which, when monocyclic, is substituted by substituents different from chlorine, alkyl groups and alkoxy groups and, when it is polycyclic, is optionally substituted and contains at most three 5- or 6-membered rings of which at most two are carbocyclic aromatic, preferably tetrahydronaphthyl, naphthyl or acenaphthyl groups, which can be substituted by the substituents mentioned for R$_9$, preferably however, by alkyl groups having 1 to 8 carbon atoms or alkoxy groups having 1 to 8 carbon atoms; particularly preferred for R$_{10}$ however, is an R$_9$ group, R$_{11}$ an optionally substituted aryl group such as the 1- or 2-naphthyl or 2-tetrahydronaphthyl group, preferably however, the carbomonocyclic aryl group preferred in R$_2$, A, a halogen, e.g. chlorine or bromine, a hydroxyl group, an alkoxy or oxaalkoxy group having, preferably 1 to 6 carbon atoms, e.g. the methoxy- or 2-butoxyethoxy group, an acylated hydroxy group, preferably of the formula —O—Acyl, e.g. an —O—acetyl, —O—benzoyl or O-propionyl group, a primary, secondary or tertiary amino group, preferably of the formula

particularly preferred is one having hydrogen or low alkyl groups as R$_3$ and R$_4$, e.g. a free amino, a methylamino, dimethylamino or butylamino group, an acylamino group preferably of the formula

particularly preferred is one having hydrogen or a low alkyl group as R$_3$, e.g. an N-methylacetylamino, N-benzylacetylamino, N-butylbenzoylamino or a butyroylamino group, a nitrile group, a carboxyl group in free or salt form, a carboxylic acid ester group, preferably of the formula —COOR$_2$, a carboxylic acid amide group of the formula

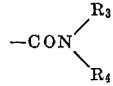

a thioether group of the formula —SR$_2$ or an SO$_2$R$_2$ group.

The symbols R$_1$, R$_2$, R$_3$, R$_4$ and Acyl used in the definitions of R$_7$ to R$_{11}$ and of A have the meanings given above. In particular, in carboxylic acid amide groups of the formula

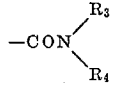

also however in sulphonic acid amide groups of the formula

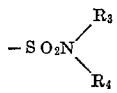

the symbols R$_3$ and R$_4$ together can form a 5- or 6-membered nitrogen heterocycle, or, as mentioned above, together they form an alkylene group interrupted by oxygen and having, preferably, 4 to 7 carbon atoms of which 4 or 5 are ring members of the heterocycle.

Also basic or quaternary groups are of advantage in many cases as nitrogen substituents of carboxylic acid amides and sulfonic acid amides in or as X and/or Y, in addition to the R$_3$ and R$_4$ groups specifically mentioned, particularly for UV absorbers which are to be drawn from an aqueous bath onto anionically modified polymers, particularly threads. As such, mainly nitrogen-containing alkyl groups such as 2-aminoethyl, 2-dimethylaminoethyl, 3-dimethylaminoethyl, 3-diethylaminoethyl, 3-(4-morpholino)-propyl groups or quaternary groups such as those of the formula

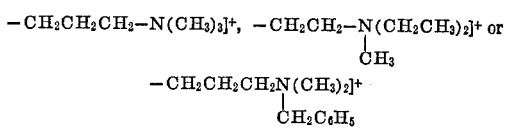

are useful, whereby the latter ones can be in salt form with the usual inorganic or organic anions such as chloride ion, bromide ion, tetrachlorozincate(II)-methane sulphonate anion, p-toluene sulphonate anion, sulphate, bisulphate or acetate anion.

Substituents which can be symbolised by Z are 2-hydroxynaphthyl-(1) radicals or, preferably, 1-hydroxynaphthyl-(2) and 3-hydroxynaphthyl-(2) radicals. o-hydroxyphenyl radicals, however, are particularly valuable as Z.

All these o-hydroxyaryl radicals can be further substituted by the substituents having no colouring character usual in the benzene or naphthalene series, but advantageously the o- or peri-positions adjacent to the bond to the v-triazole ring are unsubstituted.

Specially listed as substituents of the o-hydroxyaryl radicals mentioned as Z are:

Optionally substituted alkyl groups, preferably alkyl groups having 1 to 18 carbon atoms as listed e.g. for R$_5$ above, low alkyl groups substituted by acylamino groups of the formula

carboxyl groups, ester groups of the formula —COOR$_2$ and acid amide groups of the formula

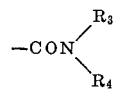

as defined above, substituted low alkyl groups, halogenoalkyl groups particularly chloro- or bromo-alkyl groups, preferably having 1 to 4 carbon atoms, or low alkyl groups substituted by hydroxy, R$_2$O—, R$_2$S— or

groups;

Optionally substituted alkenyl or oxaalkenyl groups, preferably low alkenyl groups, low chloroalkenyl or phenylalkenyl groups;

Optionally substituted cycloalkyl groups, preferably cycloalkyl groups having 5 to 10 carbon atoms of which 5 or 6 are ring members;

Optionally substituted aralkyl or oxaaralkyl groups having, preferably, 7 to 16 carbon atoms, 0 to 2 chlorine and/or oxygen atoms and a carbomonocyclic aryl moiety;

Optionally substituted aryl groups having, preferably, 6 to 14 carbon atoms, 0 to 2 chlorine and/or oxygen atoms and a carbomonocyclic aryl ring.

All these optionally substituted hydrocarbon substituents have been illustrated by the examples given above, particularly under $R_5$, $R_2$ and $R_6$.

In addition, substituents for Z are also halogens, particularly chlorine and bromine as well as functional groups containing hetero atoms. Specifically listed as such are: acylamino groups of the formula

Simple or modified hydroxyl groups, preferably free hydroxyl groups, ether groups of the formula —O—$R_2$ or acylated hydroxyl groups of the formula —O—Acyl;

Simple or modified carboxylic acid groupings, preferably carboxyl groups in free or salt form, carboxylic acid esters of the formula —COO$R_2$, carboxylic acid amines of the formula

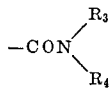

or nitrile groups;

Simple or modified sulphonic acid groupings, preferably sulphonic acid groups in free or salt form, sulphonic acid aryl ester groups of the formula —$SO_2OR_{11}$, sulphonic acid amide groups of the formula

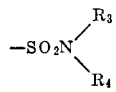

Alkylsulphone groups, preferably having low alkyl; and Alkylsulphone oxide groups, preferably having low alkyl.

The groups $R_1$, $R_2$, $R_3$, $R_4$, $R_{11}$ and Acyl used in the definitions of these substituents of Z containing hetero atoms have the meanings given above.

Whenever the term "lower" is used in this specification and the appended claims, with an aliphatic radical, it means that such radical has at most 6, and preferably not more than 4 carbon atoms. The terms "halogen" and "halogeno" refer to halogen of an atomic number of at most 35, and preferably to chlorine and bromine.

The compounds according to the invention as defined hereinbefore, to be effective as ultraviolet ray-absorbing agents useful for the purposes described further below should have absorption maxima in the range between 270 and 370 millimicrons, and any substituents present in X, Y and Z as described hereinbefore, should be of such structure and molecular weight that the absorption maximum of the respective compound is not shifted outside the aforesaid range.

Compounds which fulfill the above conditions and the starting materials for which are particularly accessible, are those falling under Formula I, in which each of X and Y represents, independently of the other, (A) chlorine; (B) bromine; (C) hydrogen; (D) cyano; (E)

—NH—E—R (F) —COO—M+; (G) —COO$R_2$;

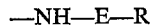

(I) a non-colour-imparting monovalent organic radical selected from ($I_1$) an aliphatic radical, ($I_2$) an araliphatic radical; and ($I_3$) an aryl radical; (J) a heterocyclic radical, or (K) —$SO_2R$; or X and Y together represent a tetramethylene radical substituted by from 0 to 2 lower alkyl groups; and Z represents an o-hydroxyphenyl or an o-hydroxynaphthyl radical, any substituent of which does not shift the absorption maximum of the compound outside the range of from 270 to 370 millimicrons;

$R_2'$ representing hydrogen, alkyl of at most 18 carbon atoms, hydroxy-lower alkyl, preferably of from 2 to 4 carbon atoms, lower alkoxy-lower alkyl or lower alkenyl, preferably of from 3 to 4 carbon atoms.

$R_3'$ representing hydrogen, alkyl of at most 18 carbon atoms, hydroxy-lower alkyl, lower alkoxy-lower alkyl, lower alkenyl, benzyl or cyclohexyl;

$R_4'$ representing lower alkyl or hydroxy-lower alkyl;

M+ representing an alkali metal ion or an optionally substituted ammonium ion any substituent of which is selected from lower alkyl, hydroxy-lower alkyl and benzyl;

E representing CO or $SO_2$, and

R representing alkyl of at most 17 carbon atoms, alkoxy of at most 8 carbon atoms, cyclohexyl, benzyl, cyclohexyloxy, benzyloxy, phenoxy or a phenyl radical any substituent of which is selected from lower alkyl, lower alkoxy and halogen; but, most preferably, in the case of X and/or Y representing —NH—CO—R, R represents alkyl of at most 12 carbon atoms or phenyl, and, in the case of X and/or Y representing —$SO_2R$ or

—NH—$SO_2$—R

R represents lower alkyl, phenyl or lower alkylphenyl.
(ii) lower alkanoyl,

In the above described, especially accessible class of compounds, Z represents preferably, either o-hydroxynaphthyl, or an o-hydroxyphenyl radical any substituent of which is selected from:

(1) alkyl of at most 18 carbon atoms,
(2) a substituted lower alkyl radical the substitution of which is selected from:

(a) a group

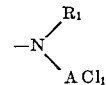

wherein:

$R_1'$ represents hydrogen or lower alkyl, and
$Ac_1$ is selected from (i) alkanoyl of at most 18 carbon atoms,
(ii) lower alkanoyl,
(iii) substituted lower alkanoyl the substitution of which is selected from halogen, phenyl, phenylthio, cyclohexylthio, benzylthio, hydroxy-lower alkylthio, or carboxy-lower alkylthio,
(iv) amino-lower alkanoyl, wherein the amino moiety is

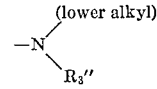

and $R_3''$ represents lower alkyl, cyclohexyl or benzyl;
(v) mono-oxa-alkanoyl of a total of at most 14 carbon atoms,
(vi) monothia-alkanoyl of a total of at most 14 carbon atoms,
(vii) cyclohexanoyl,
(viii) a benzoyl radical any substituent of which is selected from halogen, lower alkyl or lower alkoxy, and
(ix) lower alkoxy-carbonyl;

(b) a radical of the formula

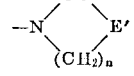

wherein:

E' represents —$CH_2$— or —O—, and
$n$ is an integer ranging from 2 to 6;

(3) a lower alkenyl radical any substituent of which is selected from halogen and phenyl;
(4) cyclohexyl;
(5) lower alkyl-cyclohexyl;

(6) phenyl;
(7) phenyl-lower alkyl;
(8) halogen;
(9) hydroxy;
(10) alkoxy of at most 12 carbon atoms;
(11) lower alkenyloxy;
(12) benzyloxy;
(13) alkanoyloxy of at most 12 carbon atoms;
(14) benzoyloxy;
(15) —COOH;
(16) —SO$_3$H;
(17) a group —E—O$^-$M$^+$ wherein E represents CO or SO$_2$, and M$^+$ has the aforesaid meaning;
(18) lower alkoxy carbonyl;
(19) a group —NH—E—R, and
(20) a group

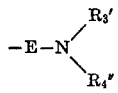

E, R and R$_3$' in the latter two groups having the aforesaid meanings, and R$_4$'' representing hydrogen, alkyl of at most 8 carbon atoms, hydroxy-lower alkyl or lower alkoxy-lower alkyl.

In the above-defined, particularly accessible class of compounds according to the invention, which are, for this reason, of special economic importance, the said non-colour-imparting monovalent organic radical defined under (I) is preferably selected from:

(1) alkyl of at most 16 carbon atoms;
(2) cycloalkyl of from 5 to 6 carbon atoms;
(3) a substituted lower alkyl group of the formula A'—(lower alkylene)— wherein A' represents lower alkoxy, lower alkoxy-carbonyl, lower alkylthio, phenyl or alkoxy-phenyl, wherein alkoxy has a total of at most 8 carbon atoms;
(4) a phenyl radical any substituent of which is selected from (a) nitro, (b) cyano, (c) halogen, (d) hydroxy, (e) alkyl of at most 12 carbon atoms, (f) alkoxy of at most 12 carbon atoms, (g) benzyloxy, (h) lower alkenyloxy, (i) alkanoyloxy of at most 12 carbon atoms, (j) benzoyloxy, (k) —NH—E—R, wherein E and R have the aforesaid meanings, but, especially alkyl of at most 12 carbon atoms, lower alkoxy, cyclohexyl or a phenyl radical as defined under R, supra, (l) —COO$^-$M$^+$ wherein M$^+$ has the aforesaid meaning, (m) —COOR$_2$' wherein R$_2$' has the aforesaid meaning, but preferably hydrogen, alkyl of at most 18 carbon atoms, or lower alkoxy-lower alkyl, (n)

wherein R$_3$' has the aforesaid meaning, but preferably hydrogen, alkyl of at most 18 carbon atoms, hydroxy-lower alkyl, benzyl or cyclohexyl, and R$_4$'' represents hydrogen, lower alkyl or hydroxy-lower alkyl;
(5) a mononuclear aromatic heterocyclic radical having from 5 to 6 ring members one of which is a hetero atom selected from nitrogen, sulfur and oxygen, the remaining ring members being carbon atoms.

Most of the preferred compounds falling under Formula I, e.g. most of those in which Z, X and Y have the specific definitions given above and those defined in Formula Id, infra, have absorption maxima in the range between 280 and 350 millimicrons.

Compounds as defined above in which at least one of X and Y represents a phenyl radical as defined above under (4) are particularly compatible with a great variety of substrates.

The v-triazoles of Formula I according to the invention can be produced by various methods depending on X and Y and the substituents in Z. In particular, however, they can be produced by the methods A, B and C described below.

METHOD A

A method applicable in many cases (A), is the splitting off of water to close the rings of oxime hyrazones of α-diketones of Formula IIa or IIb

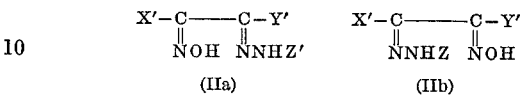

After the optional liberation of the protected hydroxyl group or the hydroxyl group acylated during the splitting off of water, this yields v-triazoles of Formula Ia

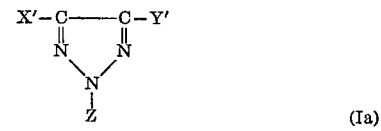

in which formulae Z has the meaning given in Formula I, X' and Y' stand for the groups defined above under Q or Q' and Z' ("is" not in German) a Z group or a Z group having an etherified or acylated o-hydroxy group, simple alkyl ethers having low alkyl groups being preferred.

Water can be split off by heating with proton donor acids or with acid anhydrides, optionally in solvents.

As such agents which split off water, the hydrohalic acids can be mentioned as examples of proton donor acids and, as examples of acid anhydrides, the inorganic anhydrides P$_2$O$_5$ and SO$_3$, the mixed anhydrides such as acetyl chlride, p-toluene sulphochloride, benzoyl chloride as well as the pure organic anhyrides such as acetanhydride, benzoic acid anhydride, also the mixed anhydride of formic and acetic acid, can be mentioned. Mainly inert high boiling hydrocarbons or halogenated hydrocarbons such as chlorobenzene, dichlorobenzenes or xylenes, also however, slightly basic solvents such as dimethyl formamide, dimethyl acetamide or even pyridine are useful as solvents. Depending on the substituents of the oxime hydrazones of Formulae IIa and IIb, the ring is closed by simply allowing to stand or by heating the starting products with the agents which split off water. As reaction temperature, temperatures between room temperature up to 250° C., preferably 200° C., are useful. Sometimes an addition of basic catalysts such as alkali or alkaline earth metal salts improves the yield and purity of the end products. It is best to follow the cyclisation by thin layer chromatography.

Often, particularly when mixed inorganic-organic or pure organic acid anhydrides are used, O-acylated compounds of Formula IIIa or IIIb

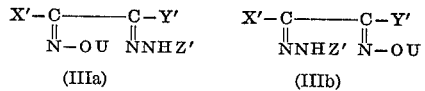

occurs as more or less stable intermediate products which, on splitting off the acid UOH by heating, yield the desired v-triazoles. U in Formulae IIIa and IIIb represents the acyl radical of the acid anhyride used for splitting off of water, e.g. the radical —COCH$_3$, —SO$_2$CH$_3$,

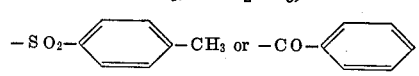

In principle, there is no reason why any intermediate product IIIa or IIIb formed should not be isolated but in most cases noting is gained thereby.

Some of the starting products necessary of Formulae IIa or IIb are known and can be obtained by several methods depending on X' and Y'.

The following scheme of reaction, wherein V stands for a hydrogen atom, an acyl or COOH group which can be split off, illustrates the most simple of these methods of formation, whereby in principle, the reaction scheme a with the ways of approach $a_1$ and $a_2$ is differentiated from the reaction scheme $b$ with the ways of approach $b_1$ and $b_2$.

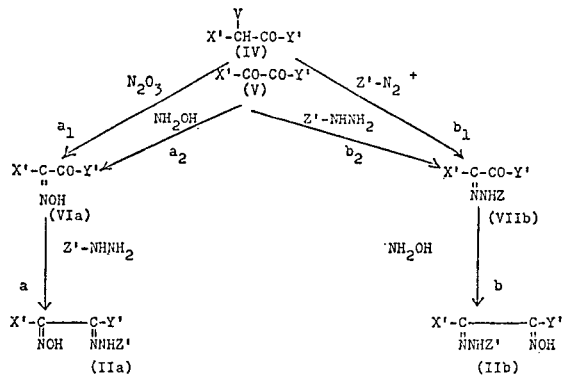

When X' and Y' are different, it is apparent that the compounds IIa and IIb are different. The isomer ratios are still further complicated, however, by the fact that each of the two oxime hydrazones II can exist in different syn- and anti-forms.

When X' and Y' are different there are at most 8 isomers of each. Also, in the reaction of the α-dicarbonyl compound of Formula V with hydroxylamine or the hydrazine of the formula Z'—NHNH₂, apart from the isomers sketched in the above scheme, also the two forms

 (VIb)

and

 (VIIa)

differing when X' and Y' are different, can be formed. However, on further reaction they yield products which are not different from IIa and IIb.

These differing isomer forms of the starting products, however, are of no importance for the structure of the v-triazoles which are interesting as UV absorbers as, on cylisation, the cis-trans isomer possibilities of the two C=N double bonds and also the difference in the nitrogen substituents disappear. All isomers yield one and the same v-triazole although with varying rapidity and in different yields. Thus, the isomerism describes only influences the production costs and, therefore, care should be taken to choose that process which, regarded in all its steps, is economically the most advantageous in a specific case.

In short, it can be said: v-triazoles of Formula I are obtained according to the invention when one mol of water is split off from oxime hydrazones of α-dicarbonyl compounds of the general Formula IIc

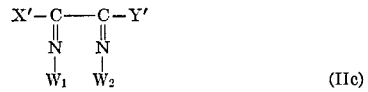 (IIc)

wherein one of $W_1$ and $W_2$ is the monovalent radical —NHZ' and the other is the hydroxyl group, and X', Y' and Z' have the same meanings as in Formula II, by reaction with acid agents and the o-hydroxy group in Z' which may be protected or acylated during the reaction is liberated.

The following examples are mentioned as carbonyl compounds of Formula IV which can be coupled with diazonium ions of the formula Z'—N₂⁺; these also serve to illustrate X or X' and Y or Y':

Phenyl acetone (benzylmethyl ketone), 1-phenyl-butanone-(2), 1 - phenyl-tridecanone-(2), benzylcyclopentyl ketone, benzylcyclohexyl ketone, dibenzyl ketone, benzyl-p-chlorobenzyl ketone, benzyl-2,4-dimethylbenzyl ketone, benzyl-p-methoxybenzyl ketone, benzylpyridy-(3)-ketone, benzyl-furyl-(2)-ketone or benzylthienyl-(2)-ketone. All these ketones are obtained analogously to phenyl acetone from the sodium salt of benzyl cyanide and the corresponding acid chloride after saponification and decarboxylation. Also, ketones having a hydroaromatic ring such as tetralone-(2) (1,2,3,4 - tetrahydro-2-oxo-naphthalene) are useful. The intermediate products formed in this ketone production, phenyl acetic acid in the case of phenyl acetone, its homologues and analogues in the other cases, can naturally also be coupled and on decarboxylating, the same products are formed as from the simple ketones.

Other ketones of Formula IV which can be coupled are the desoxybenzoins such as desoxybenzoin (benzylphenyl ketone), benzyl-p-ethoxyphenyl ketone, benzyl-2,4- and benzyl - 3,4-dimethylphenyl ketone, benzyl-2,5-dichlorophenyl ketone; all these can be obtained from phenyl acetic acid chloride and the corresponding benzene derivatives according to Friedel-Crafts, as well as the desoxybenzoins obtained by using substituted phenyl acetic acids such as p-chlorobenzylphenyl ketone, p-methoxybenzyl-p-butoxyphenyl ketone, p-methoxybenzyl - 2,4-diethylphenyl ketone or p-nitrobenzylphenyl ketone. Also heterocyclic carbonyl compounds such as desoxyfuroin (furyl-furyl-methyl ketone) are useful in this class.

To produce monohydrazones of Formula VII wherein Y' is a non-aromatic radical, only carbonyl compounds having an active methylene or methine group as is present in optionally substituted ketoaldehydes, 3 - diketones, α-formyl carboxylic acids or β-ketocarboxylic acids, are suitable as coupling comopnents. In the coupling, an acyl group or CO₂ can be split off with formation of the monohydrazone. Naturally, dicarbonyl compounds as well as carbonyl carboxylic acids can also be used when Y' is an aromatic radical. Examples of such coupling components are:

3-methyl-2,4-pentane dione, acetoacetic acid, C-methyl-acetoacetic acid (2-methyl-3-keto-butyric acid), 2-oxo-3-carboxypentadecane, 2-oxo-3-carboxyundecane, 1-chloro-5 - carboxy-6-oxo-heptane, 1-methoxy-5-carboxy-6-oxo-heptane, 6-carboxy-7-oxo-caprylic acid nitrile, 1-bromo-9-carboxy - 10-oxoundecane, 10-carboxy-11-oxolauric acid ethyl ester, C-benzyl acetoacetic acid, C-β-phenylethyl acetoacetic acid (1 - phenyl-3-carboxy-4-oxopentane), C-p-chlorobenzyl acetoacetic acid, C-m-methoxybenzyl acetoacetic acid, C-(2,4-dimethylbenzyl)-acetoacetic acid, C-cyclohexyl acetoacetic acid, C-cyclopentyl acetoacetic acid (all of which substituted acetoacetic acid derivatives are obtained by alkylating acetoacetic acid esters with the corresponding alkyl halides, some of which are further substituted, and saponifying cold in an alkaline medium in the usual way and, best of all, immediately further working up, i.e. coupling) as well as 2-methyl-3-ketovaleric acid and cyclohexanone-2-carboxylic acid.

As diazonium ions of the formula Z'–N₂⁺ which, according to method $b_1$ can be coupled with carbonyl compounds mentioned above, those are useful which are derived from o-alkoxy anilines or o-alkoxy naphthylamines or from o-aminophenols or o-aminonaphthols. As examples of the first class of amines which can be used according to the invention are mentioned:

o-anisine, o-ethoxy aniline,
2-methoxy-5-methyl aniline,
2-methoxy-5-t.butyl aniline,
2-methoxy-5-t.octyl aniline,
2-methxoy-5-phenyl aniline,
2-methoxy-5-benzyl aniline,
2-methoxy-5-cyclohexyl aniline,
2-methoxy-5-n-octyl aniline,
2,4-diethoxy aniline,
2-methoxy-4-nitroaniline,
3-amino-4-methoxy benzoic acid-N-methyl-N-cyclohexylamine,
2-methoxy-4-cyanoniline,
2,5-dimethoxy aniline,
2-methoxy-3,5-dimethyl aniline,
2-methoxy-5-chloroaniline, 2-methoxy-4,5-dimethyl aniline,
2-methoxy-1-aminonaphthalene,
2-methoxy-3-aminonaphthalene or
1-methoxy-2-aminonaphthalene.

All these aromatic amines yield v-triazoles having o-alkoxyaryl groups in the 2-position, in which, therefore, the o-hydroxy group must still be liberated after cyclisation. This is done in the usual way, e.g. by stirring and, optionally, gently warming with $AlCl_3$ in aromatic, possibly chlorinated hydrocarbons such as benzene, toluene, xylene, chlorobenzene or o-dichlorobenzene, or by heating with a solution of concentrated aqueous hydrobromic acid in glacial acetic acid. If these dealkylations are performed under mild conditions then other alkoxy groups which may be in Z but not in the o-position, are substantially retained. However, hydroxyl groups not in the o-position can be liberated also by longer reaction with the dealkylating agents mentioned, particularly at a raised temperature, also however with the help of more strongly acting agents such as hydroiodic acid.

As examples of the second class of amines usable according to the invention can be listed:

2-hydroxy-3,5-dichloroaniline,
2-hydroxyaniline-5-sulphonic acid,
2-hydroxyaniline-4-sulphonic acid phenyl ester,
2-hydroxyaniline-4-sulphonic acid amide,
2-hydroxyaniline-5-sulphonic acid dimethylamide,
2-hydroxyaniline-5-sulphonic acid diethylamine,
2-hydroxyaniline-5-sulphonic acid dibutylamine,
2-hydroxyaniline-5-sulphonic acid methylamide,
2-hydroxyaniline-5-sulphonic acid-N-methyl-N-butylamide,
2-hydroxyaniline-5-sulphonic acid-N-methyl-N-laurylamide,
2-hydroxyaniline-5-sulphonic acid-N-methyl-N-cyclohexylamide,
2-hydroxyaniline-5-sulphonic acid-N-methyl-N-benzylamide,
2-hydroxyaniline-5-sulphonic acid-β-hydroxyethylamide
2-hydroxyaniline-5-sulphonic acid-β-butoxyethylamine,
2-hydroxyaniline-5-sulphonic acid-γ-methoxypropylamide,
2-hydroxyaniline-5-sulphonic acid-N-butyl-N-β-hydroxyethylamide,
2-hydroxyaniline-5-sulphonic acid-N-morpholide,
2-hydroxyaniline-5-sulphonic acid-N-piperidide,
2-hydroxyaniline-5-carboxylic acid,
2-hydroxy-5-diethylamidocarbonyl aniline or
2-hydroxy-4-methyl-5-chloroaniline.

Depending on the agent used in the cyclisation to split off water, the amines having a free hydroxyl group mentioned above yield v-triazoles of Formula Ia or those in which the hydroxyl group in the o-position is acylated. In the latter case, e.g. on using acetanhydride as dehydrating agent, i.e. when o-acetoxy compounds are formed, the o-hydroxy group must be liberated. This is done in the usual way by alkaline saponification, optionally in an organic solvent.

The monohydrazones of Formula VIIb or isomers thereof of Formula VIIa obtained by coupling by method $b_1$ can also be obtained by method $b_2$ by reacting equimolar amounts of α-dicarbonyl compounds of Formula V and hydrazines of formula Z'—NHNH$_2$.

Examples of suitable α-dicarbonyl compounds are: glyoxal, biacetyl (2,3-dioxobutane), 1,2-dicyclohexyl-1,2-dioxoethane, benzil, 4,4'-dichlorobenzil, 4-chloro-2'-methoxybenzil, 4-nitro-4'-methoxybenzil, 1,6-diphenyl - 3,4-dioxohexane, 2,2'-furil or 2,2'-pyridil.

Suitable hydrazines of formula Z'—NHNH$_2$ are obtained either by reduction with tin-(II) chloride or bisulphite from the corresponding diazonium ions of formula Z'—N$_2^+$. Amines which yield suitable hydrazines are, e.g.: o-anisidine, 2-methoxy-5-methyl aniline, 2-methoxy-5-t.-butyl aniline, 2-methoxy-5-t.octyl aniline, 2-methoxy-5-phenyl aniline, 2-methoxy-5-cyclohexyl aniline, 2-methoxy-5-chloroaniline, 2-methoxy-5-methoxy aniline or 2-methoxy-4-chloroaniline. The hydrazines which are derived from substittued o-anisidines can be produced by the same method as those derived from unsubstituted o-anisidine. The remarks above regarding any liberation of o-hydroxyl groups in the v-triazoles produced with these amines by coupling, is naturally true of the identical v-triazoles also which are produced by means of the hydrazines.

Some or all the monohydrazones produced by these methods $b_1$ or $b_2$ of Formula VIIa or VIIb can be in the tautomeric azo forms VIIa', VIIa'', VIIb' and VIIb'':

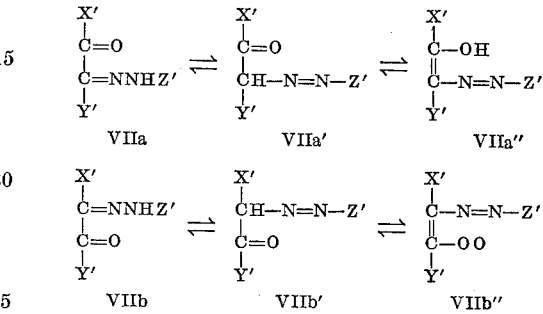

To produce the oxime hydrazones of Formula IIa and IIb, the monohydrazones mentioned above of Formula VII are reacted in the usual way with hydroxylamine.

The second way (method a) to attain oxime hydrazones of Formula II is to react mono-oximes of Formula VIa or Z'—NHNH$_2$.

The mono-oximes of Formula VI necessary are obtained introducing a nitroso group into carbonyl compounds (method $a_1$) by the usual processes. Examples of carbonyl compounds which can be converted in such a way into mono-oximes are: methylethyl ketone, methylhexyl ketone, diethyl ketone, dipropyl ketone, dipentadecyl ketone, propiophenone, laurophenone, dibenzyl ketone or di-β-phenylethyl ketone (1,5-diphenyl-3-oxopentane).

A second possibility (method $a_2$) for the production of the mono-oximes consists in the reaction of equimolar amounts of dicarbonyl compounds of Formula V and hydroxylamine. As such dicarbonyl compounds, the α-dialdehydes, α-ketoaldehydes or α-diketones mentioned in method $b_2$ are useful.

METHOD B

In addition to the cyclisation by dehydration (method A) discused above, with the oxime hydrazones of Formula IIa or IIB, also oxidative ring closure (method B) can be performed. However, the v-triazoles desired are not then formed direct but their N-oxides of the Formulas VIIIa (from IIa) and VIIIb (from IIb)

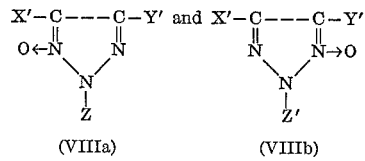

(VIIIa)      (VIIIb)

which then, after reduction and possible liberation of the o-hydroxyl group, yield the v-triazoles according to the invention.

The oxidative ring closure can be brought about by the action of the most various oxidation agents, generally the use of solvents which are stable to oxidation is recommended. In acid solution such as in acetic acid, bichromate or hydrogen peroxide for example are possible oxidation agents, in basic solvents such as pyridine or mixtures of pyridine and water, potassium ferricyanide or chlorine lye for example are useful. For general use and therefore preferred, is the oxidation with copper-(II) sulphate in pyrridine/water. It is not necessary to use stoichiometric amounts of copper; the monovalent copper formed during the reaction can continuously converted again into the divalent form by the introduction of air or oxygen.

The triazole oxides can be reduced by the known methods. A simple way of performing the reduction is, e.g. with metals such as zinc dust in acetic acid or mixtures of acetic acid and water.

Any liberation of o-hydroxyl groups and, possibly also, of other hydroxyl groups is performed by the methods given above.

Thus, v-triazoles according to the invention of Formula Ia are obtained by method B when triazole oxides of the Formula VIIIa or VIIIb

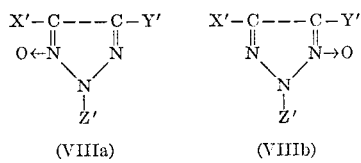

wherein X', Y' and Z' have the same meanings as in Formula IIa, are reduced and the hydroxyl group, which may be protected, is liberated.

METHOD C

A further method (C) for the production of certain v-triazoles according to the invention is the oxidation of naphtho-[1,2-d]-v-triazoles substituted in the 2-position of Formula (IX) to form v-triazoles of Formula (Ib) according to the scheme

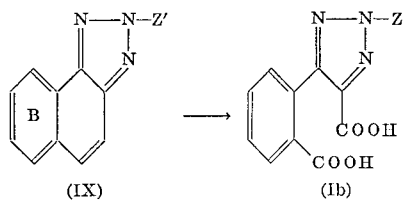

and subsequent liberation of the protected o-hydroxy group in Z' and, optionally, subsequent modification of the carboxyl groups.

In the Formulae Ib and IX, Z' represents a phenyl or naphthyl radical which has a protected hydroxyl group in o-position to the bond to the v-triazole ring and which, optionally, like ring B, is further substituted by substituents which do not provoke an oxidative opening of phenyl rings.

Examples of such substituents of Z' and B are, e.g. halogens, free or modified carboxyl or sulphonic acid groups. Also possible are low alkyl groups, particularly methyl groups which are, at least partially converted into carboxylic acid groupings in the oxidation.

For method C, only strongly oxidising oxygen compounds of multivalent metals are useful as oxidising agents. Particularly suitable are higher manganese oxides or salts of higher manganic acids, particularly permanganates, which are used in aqueous alkaline medium. If the compounds IX contain no water solubilising groups, it is advantageous to perform the reaction in suspension, care being taken that the distribution is as fine as possible.

Examples of suitable compounds of Formula IX as well as of the oxidation products obtained in which the o-hydroxyl group has also been liberated by aluminium chloride treatment in benzene, are:

2-(2-methoxy-phenyl)-naphtho[1,2-d]-v-triazole, yields
2-(2-hydroxy-phenyl)-4-carboxy-5-(2-carboxy-phenyl)-v-triazole;
2-(2-methoxy-5-methyl-phenyl)-naphtho[1,2-d]-v-triazole, yields
2-(2-hydroxy-5-carboxy-phenyl)-4-carboxy-5-(2-carboxy-phenyl)-v-triazole;
2-(2-methoxy-4-chlorophenyl)-naphtho[1,2-d]-v-triazole, yields
2-(2-hydroxy-4-chlorophenyl)-4-carboxy-5-(2-carboxy-phenyl)-v-triazole;
2-(2-methoxy-phenyl)-7-chloronaphtho[1,2-d]-v-triazole, yields
2-(2-hydroxy-phenyl)-4-carboxy-5-(2-carboxy-4-chlorophenyl)-v-triazole.

The naphthotriazoles of Formula IX are obtained in the normal way by oxidative ring closure from the coupling products of o-anisidines and 3-naphthylamines.

METHOD D

As method D for the production of v-triazoles containing amino groups of Formula Ic, the coupling of o-aminophenols optionally containing a protected hydroxy group with oximes containing nitro groups of Formula X, cyclisation of the corresponding nitro-oxime hydrazones and optional liberation of the hydroxyl group, is useful.

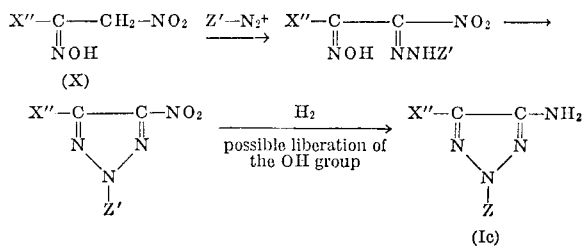

In these formulae, X'' is mainly hydrogen because of the accessibility of the compounds X.

To produce v-triazole compounds according to the invention which have specific properties, it is often of advantage to subsequently modify compounds of Formulae Ia to Ic. Such subsequent modification can be done by the most various reactions. The following are given as examples:

(1) OXIDATION

To produce v-triazoles having several carboxyl groups, it is advantageous to oxidise the alkyl groups, preferably methyl groups, to 4,5-dialkyl-v-triazole derivatives. Those oxidation methods mentioned, e.g. for the oxidation of the naphthotriazoles, are useful. Advantageously, free hydroxyl groups, particularly those in o-position of the Z substituent of Formula I, are protected, e.g. by alkylation and subsequently liberated again after the oxidation. As examples, the production of the following products is given, the liberation of the CH group being performed with $AlCl_3$ in benzene:

2-(2-hydroxy-phenyl)-v-triazole-4,5-dicarboxylic acid, [from 2-(2-methoxy-phenyl)-4,5-dimethyl-v-triazole;
2-(2-hydroxy-5-carboxy-phenyl)-v-triazole-4,5-dicarboxylic acid [from 2-(2-methoxy-5-methyl-phenyl)-4,5-dimethyl-v-triazole];
2-(2-hydroxy-4-chlorophenyl)-v-triazole-4,5-dicarboxylic acid [from 2-(2-methoxy-4-chlorophenyl)-4,5-dimethyl-v-triazole].

Naturally, more easily oxidisable groups in the radicals X and Y or the substituents in Z can also be oxidised by milder oxidations, e.g. primary hydroxyl groups into carboxylic acids, olefinic groups to diols or carboxylic acids, thiol groups into sulphonic acids, thioether groups into sulphoxides or sulphones. In this case too, an intermediary protection for hydroxyl groups to be retained is recommended. As oxidising agents, again oxides of multivalent metals such as chrome trioxide or manganese dioxide as well as salts of acids having multivalent metal ions as central atoms such as potassium permanganate or sodium bichromate are useful. Examples of such oxidation products are:

2-(2-hydroxy-3-methyl-5-carboxymethyl-phenyl)-4-methyl-5-phenyl-v-triazole [from 2-(2-methoxy-3-methyl-5-allyl-phenyl)-4-methyl-5-phenyl-v-triazole];
2-[2-hydroxy-3-methyl-5-(3-butylsulphonyl-propyl)-phenyl]-4-methyl-5-phenyl-v-triazole [from 2-[2- methoxy-3-methyl-5-(3-butylmercapto-propyl)-
phenyl]-4-methyl-5-phenyl-v-triazole].

(2) REDUCTIONS AND HYDROGENATIONS

Reduction and hydrogenations are useful mainly for changing functional groups in X, Y and the substituents of Z. As examples are mentioned, the reduction of nitro groups to amino groups and of ketones to —$CH_2$ groups (Clemmensen or Wolff-Kishner), or catalytic hydrogenation of olefinic groups to saturated structures. These are illustrated by the following examples:

2-(2-hydroxy-3,5-dimethyl-phenyl)-4-methyl-5-(3-amino-
phenyl)-v-triazole [from 2-(2-hydroxy-3,5-dimethyl-
phenyl)-4-methyl-5-(3-nitro-phenyl)-v-triazole];
2-(2-hydroxy-5-dodecyl-phenyl)-4,5-dimethyl-v-triazole
[from 2-(2-hydroxy-5-lauroyl-phenyl)-4,5-dimethyl-
v-triazole];
2-(2-hydroxy-3-propyl-phenyl)-4,5-dicyclohexyl-v-
triazole [from 2-(2-hydroxy-3-allyl-phenyl)-4,5-
dicyclohexyl-v-triazole].

(3) MODIFICATIONS OF ACID FUNCTIONS

Esterifications of carboxylic acids or transesterifications of carboxylic acid esters are an easy means of adapting the solubility properties of the v-triazole UV absorbers according to the invention to the specific application requirements. The reactions are performed under the usual conditions.

Examples are:

2-(2-hydroxy-5-methoxycarbonyl-phenyl)-v-triazole-4,5-
dicarboxylic acid dimethyl ester [from 2-(2-hydroxy-5-
carboxy-phenyl)-v-triazole-4,5-dicarboxylic acid
by esterification according to Fischer];
2-(2-hydroxy-phenyl)-4-(2-octyloxycarbonyl-phenyl)-
v-triazole-5-carboxylic acid octyl ester [from the
corresponding methyl ester by acid catalysed trans-
esterification with octanol];
2-(2-hydroxy-phenyl)-4-methyl-5-(4-ethoxycarbonyl-
butyl)-v-triazole [from 2-(2-hydroxy-phenyl)-4-
methyl-5-(4-cyano-butyl)-v-triazole by saponification
of the corresponding imido ether obtained ac-
cording to Prinner].

In applications for which polar substances are suitable, often carboxylic acid or sulphonic acid amides are desirable because of their favourable fastness to sublimation. If these groups are not already present in the components used above they are often built in by way of the corresponding acid chlorides or esters. The acid chlorides are produced in the usual way from the corresponding free acids or their alkali metal salts. Sulphonic acid chlorides are also easily obtained from diazonium chlorides by reaction with $SO_2$ in glacial acetic acid. Examples are:

2-(2-hydroxy-5-octylaminocarbonyl-phenyl)-4,5-diphenyl-
v-triazole [from 2-(2-hydroxy-5-chlorocarbonyl-phen-
yl)4,5-diphenyl-v-triazole and octylamine];
2-(2-hydroxy-5-dimethylaminocarbonyl-phenyl)-v-tri-
azole-4,5-dicarboxylic acid bis-dimethylamide
[from 2-(2-hydroxy-5-chlorocarbonyl-phen-
yl)-v-triazole-4,5-dicarboxylic acid di-
chloride and dimethylamine];
2-(2-hydroxy-phenyl)-4-4methyl-5-(4γ-methoxypropyl-
aminocarbonylbutyl)-v-triazole [from 2-(2-hy-
droxy-phenyl)-4-methyl-5-(4-chlorocarbonyl-
butyl)-v-triazole and 3-methoxypropylamine];
2-(2-hydroxy-5-diethylaminosulphonyl-phenyl)-4,5-di-
methyl-v-triazole [from 2-(2-hydroxy-5-chlorosul-
phonyl-phenyl)-4,5-dimethyl-v-triazole and
diethylamine].

Sulphonic acid esters are also built in from the corresponding acid chlorides, e.g. 2-(2-hydroxy-5-phenoxysulphonyl-phenyl) - 4,5 - dimethyl-v-triazole [from 2-(2-hydroxy-5-chlorosulphonyl-phenyl) - 4,5 - dimethyl - v - triazole and sodium phenolate].

Nitriles can be obtained in the usual way by dehydration of carboxylic acid amides. An example is: 2-(2-hydroxy-5-cyanophenyl) - 4,5 - diphenyl - v - triazole [from 2-(2-hydroxy-5-aminocarbonyl-phenyl) - 4,5 - diphenyl-v-triazole].

Also, nitriles can be used as starting products and converted by saponification into carboxylic acid amides or into the free carboxylic acids.

(4) MODIFICATIONS OF AMINO GROUPS

In general, free aromatic amino groups, particularly those in Z or X or Y, had a very adverse effect on the fastness to light of the UV absorbers according to the invention. Thus, they must be acylated. Depending on the intended use, it is advantageous to convert primary amino groups before acylation into secondary ones. In general, v-triazoles according to the invention containing secondary acylamido groups such as are obtained by direct acylation of primary amino groups are preferred in strongly polar polymers having marked hydrogen bridges or for applications from solvents having strong hydrogen bridges. On the other hand, for use in non-polar polymers, of the UV absorbers containing acylamino groups, for all practical purposes only those having tertiary acylamido groups, i.e. acylamido groups having no NH— grouping, are suitable.

The usual methods known from the literature are useful for the conversion of primary into secondary amino groups. Reductive akylations of the primary amino groups with carbonyl compounds are particularly suitable. Examples of such modifications of amino groups are:

2-(2-hydroxy-3,5-dimethyl-phenyl)-4-methyl-5-[3-(acetyl-
N-benxylamino-phenyl]-v-triazole [from 2-(2-hy-
droxy-3,5-dimethyl-phenyl)-4-methyl-5-(3-
amino-phenyl)-v-triazole, by reaction with
benzaldehyde, hydrogenation of the cor-
responding Schiff's base and acylation
of the N-benzylamine with
acetanhydride];
2-(2-hydroxy-3,5-dimethyl-phenyl)-4-methyl-5-(3-meth-
ane sulphonylamino-phenyl)-v-triazole [from 2-(2-
hydroxy-3,5-dimethyl-phenyl)-4-methyl-5-(3-
aminophenyl)-v-triazole by acylation with
methane sulphochloride];
2-(2-hydroxy-3,5-dimethyl-phenyl)-4-methyl-5-[3-(4-di-
ethylamino-6-dibutylamino-s-triazinyl-(2)-amino)-
phenyl]-v-triazole [from 2-(2-hydroxy-3,5-di-
methyl-phenyl)-4-methyl-5-(3-aminophenyl)-
v-triazole by acylation with 2-chloro-4-di-
ethylamino-6-dibutylamino-s-triazine];
2-[2-hydroxy-3-propyl-5-(benzoyl-N-butylamino)-phen-
yl]-4,5-dicyclohexyl-v-triazole [from 2-(2-hydroxy-
3-propyl-5-amino-phenyl)-4,5-dicyclohexyl-v-tri-
azole by hydrogenation in the presence or bu-
tyraldehyde and acylation of the N-butyl com-
pound so produced with benzoyl chloride];
2-[2-hydroxy-3-propyl-5-(p-toluene sulphone-N-ethyl-
amino)-phenyl]-4,5-dicyclohexyl-v-triazole [from
2-(2-hydroxy-3-propyl-5-amino-phenyl)-4,5-di-
cyclohexyl-v-triazole by hydrogenation in the
presence of acetaldehyde and acylation of
the N-ethyl compound so produced with
p-toluene sulphochloride];
2-[2-hydroxy-3-propyl-5-(methoxycarbonyl-N-benzyl-
amino)-phenyl]-4,5-dicyclohexyl-v-triazole [from
2-(2-hydroxy-3-propyl-5-amino-phenyl)-4,5-di-
cyclohexyl-v-triazole by hydrogenation of the
Schiff's base obtained with benzaldehyde
and acylation with chlorocarbonic acid
methyl ester];
2-(2-hydroxy-phenyl)-4-octyloxycarbonylamino-phenyl-
v-triazole [from 2-(2-hydroxy-phenyl)-4-amino-v-
triazole by acylation with chlorocarbonic acid
octyl ester].

(5) MODIFICATIONS OF HYDROXYL GROUPS

Hydroxyl groups can be etherified or esterified and, however, also eliminated. All reactions are performed by the usual methods known from the literature. Examples are:

2-(2-hydroxy-4-octyloxy-phenyl)-4,5-diphenyl-v-triazole [from 2-(2,4-dihydroxy-phenyl)-4,5-diphenyl-v-triazole by alkylation with octyl bromide];

2-(2-hydroxy-4-lauroyloxy-phenyl)-4,5-diphenyl-v-triazole [from 2-(2,4-dihydroxy-phenyl)-4,5-diphenyl-v-triazole by esterification with lauric acid chloride];

2-[2-hydroxy-4-(3-chloropropoxy)-phenyl]-4,5-diphenyl-v-triazole [from 2-(2-dihydroxy-phenyl)-4,5-diphenyl-v-triazole by alkylation with 3-chloropropyl bromide];

2-(2-hydroxy-4-benzyloxy-phenyl)-4,5-diphenyl-v-triazole [from 2-(2,4-dihydroxy-phenyl)-4,5-diphenyl-v-triazole by acylation with benzoyl chloride];

2-(2-hydroxy-phenyl)-4-methyl-5-(but-3-enyl)-v-triazole [from 2-(2-hydroxy-phenyl)-4-methyl-5-(4-hydroxy-butyl)-v-triazole];

2-(2-hydroxy-phenyl)-4-methyl-5-(4-decyloxy-butyl)-v-triazole [from 2-(2-hydroxy-phenyl)-4-methyl-5-(4-butoxy-butyl)-v-triazole by etherification with decyl bromide, or by reaction of decanol with 2-(2-hydroxy-phenyl)-4-methyl-5-(4-chloro-butyl)-v-triazole];

2-(2-hydroxy-phenyl)-4-methyl-5-[4-(2-ethyl-capronoyl)-butyl]-v-triazole [from 2-(2-hydroxy-phenyl)-4-methyl-5-(4-hydroxy-butyl)-v-triazole by esterification with 2-ethyl caproic acid chloride];

2-(2-hydroxy-phenyl)-4-methyl-5-(4-chloroacetyl-butyl)-v-triazole [from 2-(2-hydroxy-phenyl)-4-methyl-5-(4-hydroxy-butyl)-v-triazole by esterification with chloroacetic acid chloride];

2-(2-hydroxy-phenyl)-4-methyl-5-(4-p-toluene sulphonyl-oxy-butyl)-v-triazole [from 2-(2-hydroxy-phenyl)-4-methyl-5-(4-hydroxy-butyl)-v-triazole by esterification with p-toluene sulphonic acid chloride].

(6) NUCLEOPHILIC EXCHANGE OF HALOGEN

Halogens at $sp^3$-hybrid carbon atoms, particularly chlorine and bromine, can be exchanged by the usual nucleophilic agents such as halide, cyanide, hydroxyl, acetate, mercaptide, sulphinate, phenolate, alcoholate or sulphite ions as well as by ammonia or amines. As examples in which the combinations of nucleophilic and halogen components can be varied as desired, can be mentioned:

2-(2-hydroxy-phenyl)-4-methyl-5-(4-cyano-butyl)-v-triazole [from 2-(2-hydroxy-phenyl)-4-methyl-5-(4-bromobutyl)-v-triazole and potassium cyanide];

2-(2-hydroxy-phenyl)-4-methyl-5-(4-morpholinyl-(4)-butyl)-v-triazole [from the above v-triazole and morpholine];

2-[2-hydroxy-3-methyl-5-(2-butylmercapto-propyl)-phenyl]-4-methyl-5-phenyl-v-triazole [from 2-[2-hydroxy-3-methyl-5-(2-bromo-propyl)-phenyl]-4-methyl-5-phenyl-v-triazole and butyl mercaptan];

2-(2-hydroxy-3-phenoxyacetaminomethyl-5-methyl-phenyl)-4-methyl-5-butyl-v-triazole [from 2-(2-hydroxy-3-chloroacetaminomethyl-5-methyl-phenyl)-4-methyl-5-butyl-v-triazole and phenol];

2-(2-hydroxy-3-butoxyacetaminomethyl-5-methylphenyl)-4-methyl-5-butyl-v-triazole [from 2-(2-hydroxy-3-chloroacetaminomethyl-5-methyl-phenyl)-4-methyl-5-butyl-v-triazole and butyl alcohol];

2-(2-hydroxy-3-piperidyl-(1)-acetaminomethyl-5-methyl-phenyl)-4-methyl-5-butyl-v-triazole [from 2-(2-hydroxy-3-chloroacetaminomethyl-5-methyl-phenyl)-4-methyl-5-butyl-v-triazole and piperidine];

2-(2-hydroxy-3-N-methyl-N-cyclohexylaminoacetamino-methyl-5-methyl-phenyl)-4-methyl-5-butyl-v-triazole [from 2-(2-hydroxy-3-chloroacetaminomethyl-5-methyl-phenyl)-4-methyl-5-butyl-v-triazole and N-methylcyclohexylamine];

2-(2-hydroxy-3-N,N-diethylaminoacetaminomethyl-5-methyl-phenyl)-4-methyl-5-butyl-v-triazole [from 2-(2-hydroxy-3-chloroacetaminomethyl-5-methyl-phenyl)-4-methyl-5-butyl-v-triazole and diethylamine].

Particularly suitable UV absorbers which draw mainly from an aqueous bath onto anionic modified polyester or acrylic fibres are those which contain the cationic groups. For this purpose it is best to use v-triazoles according to the invention which have quaternary ammonium groups in X and/or Y or in the substituents of Z, such as 2-(2-hydroxy-5-methylphenyl)-4-(5-N-benzyl-dimethyl-ammonio-pentyl)-5-phenyl-v-triazole bromide [from 2-(2-hydroxy-5-methyl-phenyl)-4-(5-bromopentyl)-5-phenyl-v-triazole and N,N-dimethylbenzylamine];

2-(2-hydroxy-3-trimethylammonioacetamidomethyl-5-methyl-phenyl)-4,5-diphenyl-v-triazole chloride [from 2-(2-hydroxy-3-chloroacetamidomethyl-5-methyl-phenyl)-4,5-diphenyl-v-triazole and trimethylamine].

Naturally such quaternary ammonium compounds can also be produced by quaternising tertiary amines. For example, 2-(2-hydroxy-3-N-cyclohexylaminoacetamidomethyl-5-methyl-phenyl) - 4 - methyl - 5 - butyl-v-triazole described above can be converted with p-chlorobenzene sulphonic acid methyl ester, into 2-(2-hydroxy-3-N-cyclohexyl - N,N-dimethylammonioacetamidomethyl-5-methyl-phenyl) - 4 - methyl - 5-butyl-v-triazole-p-chlorobenzene sulphonate.

Also other known replaceable groups can be exchanged by nucleophilic reactants analogously to the halogens. As examples of groups which can be replaced well are, in particular the sulphonic acid groups such as methyl sulphonate, benzene sulphonate, p-toluene sulphonate or p-bromosulphonate, and the following reactions in which they take part are given: 2-(2-hydroxy-phenyl)-4-(8-benzene sulphonyloxy-octyl)-5-phenyl-v-triazole on reaction with ammonia yields 2-(2-hydroxy-phenyl)-4-(8-amino-octyl)-5-phenyl-v-triazole.

(7) ELECTROPHILIC SUBSTITUTIONS AT AROMATIC RINGS

The usual electrophilic substitutions such as nitration, sulphonation, halogenation, chloromethylation, reactions with methylol acid amides (Einhorn reaction) or alkylation and acylation according to Friedel-Crafts can be made to the v-triazoles according to the invention, the reactivity of the OH-group in Z being considered, which group can be temporarily protected in these reactions also. As examples are mentioned:

2-(2-hydroxy-5-nitro-3-propyl-phenyl)-4,5-dicyclohexyl-v-triazole [by nitration of 2-(2-hydroxy-3-propyl-phenyl)-4,5-dicyclohexyl-v-triazole];

2-(2-hydroxy-5-chlorosulphonyl-3-propyl-phenyl)-4,5-dicyclohexyl-v-triazole [by chlorosulphonation of 2-(2-hydroxy-3-propyl-phenyl)-4,5-dicyclohexyl-v-triazole];

2-(2-hydroxy-3,5-dimethylphenyl)-4-methyl-5-(2,4-dibromo-benzyl)-v-triazole [by bromination of 2-(2-hydroxy-3,5-dimethyl-phenyl)-4-methyl-5-benzyl-v-triazole]:

2-(2-hydroxy-3-chloroacetamidomethyl-5-methyl-phenyl)-4-methyl-5-butyl-v-triazole [reaction of N-methylol chloroacetamide with 2-(2-hydroxy-5-methyl-phenyl)-4-methyl-5-butyl-v-triazole according to Einhorn];

2-(2-hydroxy-5-lauroyl-phenyl)-4,5-dimethyl-v-triazole [by acylation of 2-(2-methoxy-phenyl)-4,5-dimethyl-v-triazole with lauroyl chloride according to Friedel- Crafts and dealkylation of the methoxy group with excess aluminium chloride].

(8) DIVERSE REACTIONS

The usual conversions of functional groups into others, such as Sandmeyer reactions, can be performed without difficulty. As example can be mentioned:

2-(2-hydroxy-3,5-dimethyl-phenyl)-4-methyl-5-(3-cyano-phenyl)-v-triazole [by reaction of diazotised 2-(2-hydroxy-3,5-dimethyl-phenyl)-4-methyl-5-(3-amino-phenyl)-v-triazole with potassium cyanide according to Sandmeyer].

Also complex reactions such as the Claisen reaction can be performed with the v-triazoles according to the invention. As example is mentioned: 2-(2-hydroxy-3-allyl-phenyl)-4,5-dicyclohexyl-v-triazole [from the O-allyl ether obtained by Claisen rearrangement from 2-(2-hydroxy-phenyl)-4,5-dicyclohexyl-v-triazole and allyl chloride].

In this conection, also isomerisations should be mentioned such as are caused by strongly electrophilic reactants such as aluminium chloride or by strong bases. This is illustrated, for example, by the rearrangement of the allyl compound mentioned above into 2-[2-hydroxy-3-prop-1-enyl)-phenyl]-4,5-dicyclohexyl-v-triazole by the action of strong lyes.

Depending on the substituents, the v-triazoles according to the invention of Formula I are, for all practical purposes, at room temperature, colourless to pale yellow liquids or, mainly, almost colourless solid bodies in particularly fine distribution. They are distinguished by excellent fastness to light, particularly in polymeric carriers, and are incorporated into the substrates to be protected or into the light filter raw materials in amounts of 0.001 to 30% by weight, preferably 0.01 to 5% by weight, calculated on the carrier. This can yield purely physical mixtures or, on reaction with the carrier, chemically modified UV absorbers.

For this purpose, carboxylic or sulphonic acids of the v-triazoles according to the invention of Formula I, especially in the form of their alkali metal salts such as sodium and potassium salts, and their salts with aliphatic amines such as mono-, di- or tri- ethanolamine, ethylenediamine or propylene-diamine or morpholine, are particularly suitable for the stabilisation of aqueous or aqueous-alcoholic solutions, dispersions or emulsions of light-sensitive materials such as fats and oils as well as aromatic substances and pharmacologically active components of cosmetic products.

For carriers of higher polarity such as nylon-4 or polymers having a high content of acrylamide, mainly compounds of Formula I are suitable which themselves contain polar groups especially those containing hydrogen atoms which form hydrogen bridges such as occur in secondary sulphonic and carboxylic acid amides.

For carriers of medium polarity such as nylon-66 or polyacrylonitrile, compounds are preferred which contain polar groups not having a hydrogen atom which forms a bridge such as tertiary carboxylic acid amide groups, nitrile groups or ester groups of low alcohols.

For carriers of low polarity such as polystyrene or polymethyl methacrylate, chiefly v-triazoles according to the invention containing weakly polar groups such as esters of alcohols having a medium number of carbon atoms are useful. But for carriers of the lowest polarity such as polyethylene or polypropylene those v-triazoles are most advantageous which, in addition to the obligate OH— group, contain as few polar groups as possible, whereby ether and ester groups which are derived from alcohols having 8 and more carbon atoms can favourably influence the fastness to sublimation.

Naturally, those v-triazoles according to the invention which have the highest light absorption are preferred as light filters. However, care should be taken that good tolerance and high fastness to sublimation in the carriers used is attained by the introduction of suitable radicals X and Y as well as substituents of Z, but this is often only possible at the cost of the absorptive power.

The chief carriers for the compounds of Formula I according to the invention are organic plastics, i.e. polymeric organic compounds, both thermoplastic as well as thermosetting polymers. This includes both fully synthetic polymers as well as natural polymers and their polymer homologous chemical conversion products. By fully synthetic polymers are meant, chiefly, pure addition and pure condensation polymers, also however condensation polymers cross-linked by addition polymerisation.

The addition polymers which are useful as carriers for the new UV absorbers can be divided into the following main types:

(1) Homopolymers and copolymers of vinyl and vinylidene monomers which are converted into the corresponding polymers by radical, ionic or metal-organic polymerisation initiators. Examples of such monomers the polymers of which are suitable carriers are:

Polymerisable ethylenic unsaturated halogen hydrocarbon compounds, particularly vinyl chloride, vinyl fluoride and vinylidene chloride.

Polymerisable hydrocarbons having a double bond to which addition can be made, particularly styrene, isobutylene, ethylene and propylene, both the atactic as well as the isotactic polymer froms being useful.

$\alpha,\beta$-Unsaturated polymerisable carboxylic acids and functional derivatives thereof such as acrylic acid, methacrylic acid, acrylonitrile, alkyl esters, particularly low alkyl esters, and amides of acrylic and methacrylic acid, e.g. the methyl, ethyl and butyl esters of methacrylic and acrylic acids.

Polymerisable acyl derivatives of ethylenically unsaturated alcohols and amines, particularly those of organic carboxylic acids, the acyl radicals of alkane and alkene carboxylic acids having up to 18 carbon atoms and of aromatic monocyclic carboxylic acids such as benzoic acids and phthalic acids, as well as of cyclic carbonic acid imides such as those of cyanuric acid, being useful. Examples are allyl phthalate, polyallyl melamines, vinyl acetate, vinyl stearate, vinyl benzoate and vinyl maleate.

Polymerisable hydrocarbons having conjugated double bonds such as butadien, isoprene, chloroprene.

(2) Homo- and co-polymers of epoxides, particularly of bis-epoxides, which are formed by acid or basic catalytic curing. For example, the polymers of the bis-glycidyl ethers of geminal bis-(p-hydroxyphenyl)-alkanes and cycloalkanes are included in this class.

(3) Homo- and co-polymers of lactams and lactones, particularly the polymers of $\epsilon$-caprolactam.

(4) Homo- and co-polymers of aldehydes, particularly of formaldehyde and acetaldehyde such as polyoxymethylene and polyoxyethylene.

(5) Addition products of isocyanates to hydroxyl and/or amino compounds, particularly those of di- or poly-isocyanates to di- or poly-valent hydroxyl or amino compounds. The polyurethanes and polyureas formed by reacting di-isocyanates with polyesters and/or polyethers containing hydroxyl groups, fall into this class.

The condensation polymers which are useful as carriers for the v-triazoles according to the invention are, among others, in particular polyesters and polyamides. Of these, particularly linear thermoplastic polycondensates should be mentioned which are derived, on the one hand, from dicarboxylic acids and organic dihydroxy derivatives or organic diamines and, on the other, from hydroxy or amino carboxylic acids. Preferred linear polycondensates are the fibre-forming polymers of $\omega,\omega'$-dicarboxylic acids and $\omega,\omega'$-dihydroxy compounds or $\omega,\omega'$-diamines as well as of $\omega$-hydroxycarboxylic acids or of $\omega$-amino carboxylic acids, particularly those polymers which are derived from saturated aliphatic, cycloaliphatic and carbocyclic, not fused aromatic carboxylic acids.

The linear condensation products of the following components are specially suitable: adipic acid-hexamethylenediamine, sebacic acid-hexamethylenediamine, terephthalic acid-ethylene glycol, terephthalic acid-1,4-dimethylol-cyclohexane, 10-aminodecane-carboxylic acid (11-aminoundecylic acid).

Cross-linked polycondensates as carriers are thermosetting and are formed, in particular, by condensation of aldehydes with polyvalent compounds which are capable of condensation. Formaldehyde condensates with phenols, ureas and melamines are mentioned.

The principal condensation polymers cross-linked by subsequent addition polymerisation are the polyester resins, i.e. copolymers of polyesters of unsaturated organic carboxylic acids containing double bonds to which addition can be made, with polyvalent, particularly divalent, alcohols, these polyesters optionally being modified with, on the one hand, dicarboxylic acids to which addition cannot be made and, on the other, with vinyl or vinylidene monomers. Useful monomers are, preferably, polymerisable mixtures of condensates of maleic acid, itaconic acid, citraconic acid and divalent alcohols, preferably the water addition products of ethylene and propylene oxide such as ethylene glycol, propylene glycol and diethylene glycol and, optionally, of other dicarboxylic acids of the aliphatic-alicyclic and monocyclic-aromatic series or their anhydrides such as succinic acid anhydride, phthalic acid anhydride and/or adipic acid and of styrene and/or methyl methacrylate. This monomeric mixture of unsaturated polyesters and vinyl and/or vinylidene monomers (often termed as liquid polyester resin) is preferably cross-linked by radical polymerisation initiators.

The natural polymers which can be used as carriers for the v-triazoles according to the invention are, mainly, polysaccharides such as cellulose, or also rubber and proteins.

The principal polymer homologous, chemically modified synthetic polymers are the reaction products of polyvinyl alcohols with aldehydes such as polyvinyl butyral, and the saponification products of polyvinyl esters. Polymer homologous chemically modified natural polymers as carriers for the new UV absorbers are, principally, the cellulose esters and ethers such as the cellulose esters of acetic acid, propionic acid, benzoic acid, having on the average 1 to 3 acyl groups per glucose unit.

The polymers given in the above list, either alone or in admixture, are the carriers for the new UV absorbers in the compositions of matter according to the invention. Particularly valuable compositions of matter according to the invention contain thermoplastic vinyl and vinylidene polymers, including polyolefins, cellulose esters and ethers, linear, fibre-forming polyesters, polyamides and polyurethanes, polyester resins, as carriers for the new UV absorbers.

In addition to these polymeric carriers, natural and synthetic light-sensitive waxes, fats and oils, as well as complex systems such as photographic material, emulsions containing light-sensitive fats, emulsions or dispersions of the polymers mentioned above, can be used as carriers for the new UV absorbers.

The molecular weight of the polymers mentioned above is of minor importance as long as it lies within the limits necessary for the characteristic mechanical properties of the polymer itself. Depending on the polymer, it can be 1000 to several millions. The v-triazoles are incorporated into these polymers, e.g. depending on the type of polymers, by working in at least one of these compounds and, optionally, other additives such as plasticisers, antioxidants, other UV absorbers, heat stabilisers, pigments, into the melt by the methods usual in the art either before or during shaping, or by dissolving in the corresponding monomers before polymerisation, or by dissolving the polymers and the additives in solvents and subsequently evaporating the latter. The v-triazoles can also be drawn onto thinner carrier materials such as films or threads from baths, e.g. from aqueous dispersions.

Of the stabilisers which are optionally to be used simultaneously with the UV absorbers according to the invention, the antioxidants and synergists thereof are the most important. Aniline and naphthylamine derivatives such as phenyl-α- and -β-naphthylamine, N,N'-dibutyl-, N,N'-dioctyl-, N,N'-diphenyl-p-phenylenediamine, 2,2,4-trimethyl-1,2-dihydroquinoline, 3-hydroxy-1,2,3,4-tetrahydro-benzo[h]-quinoline, phenothiazine, N-butyl-p-aminophenol, etc., have a good action. All these antioxidants containing amino groups become discoloured in the air and, therefore, are only useful for dark coloured or black compositions. The phenolic antioxidants which do not, or only slight tend to discolouration are much more important. In substrates having only a slight tendency to autoxidation, e.g. polyvinyl chloride, often, just simple phenols, such as 2,2-bis-(4-hydroxyphenyl)-propane, are sufficient. In substrates which are greatly subject to autoxidation, such as α-polyolefins, which embrace, in addition to polyethylene, in particular the isotactic types which are derived from alkenes having more than 2 carbon atoms, as well as in the homo- and co-polymers of butadien and/or isoprene, sterically hindered phenols must be used as antioxidants. As examples of the most simple representatives of this class can be mentioned: 2,4-dimethyl-6-t.butyl phenol, 2,6-di-t.butyl-4-methyl phenol, 2-t.butyl-5-methyl phenol and 2,6-di-t.butyl-4-methoxy phenol. Not so easily volatile and, therefore, preferred are the mononuclear phenols substituted in the side chains such as the alkanol esters of 2,6-di-t.butyl-4-(2-carboxyethyl)-phenol, of 3,5-di-t.butyl-4-hydroxybenzyl phosphonic acid, 2,6-di-t.butyl-4-dimethylaminomethyl phenol or phenols having complex hydrocarbon substituents such as reaction products of phenol, p-cresol, m-cresol with terpenes. Difficultly volatile and, therefore, suitable, are also the polynuclear phenolic antioxidants such as 4,4'-dihydroxy-2,2'-dimethyl-5,5'-di-t.butyl-diphenyl sulphide,
2,2'-dihydroxy-3,3'-di-t.butyl-5,5'-dimethyl-diphenyl-methane,
4-methyl-, 4-ethyl-, 4-t.butyl-, 4-octyl-2,6-bis-(2-hydroxy-3-t.butyl-5-methylbenzyl)-phenol,
1,1-bis-(4-hydroxy-2-methyl-5-t.butylphenyl)-propane,
1,1,3-tris-(4-hydroxy-2-methyl-5-t.butylphenyl)-butane,
1,3,5-tris-(4-hydroxy-3,5-di-t.butylphenyl)-2,4,6-trimethylbenzene,
2,4,6-tris-(4-hydroxy-3,5-di-t.butylphenyl)-phenol, the triester of trimethylol propane and the tetraester of pentaerythritol with 3-(4-hydroxy-3,5-di-t.butylphenyl)-propanoic acid or the diester of ethylene glycol with 4-hydroxy-3,5-di-t.butyl benzoic acid, also 2,4-dioctylmercapto - 6 - (4-hydroxy-3,5-di-t.butylphenylamino)-1,3,5-triazine, 2 - octylmercapto-4,6-(4-hydroxy-3,5-di-t.butylphenoxy)-1,3,5-triazine, or 2-(2-octylmercapto-ethylmercapto) - 4,6 - (4-hydroxy-3,5-di-t.butylphenyl)-1,3,5-triazine. In order to increase the action of these antioxidants particularly when they are used in low concentration, also synergists can be admixed into the compositions. The esters of thiodipropionic acid, particularly those of the higher fatty alcohols such as lauryl alcohol or octadecyl alcohol have proved to be particularly suitable. The antioxidants mentioned and the synergists are added to the compositions of matter containing UV absorbers in amounts of 0.001 to 1 part by weight and of 0.01 to 2 parts by weight per 100 parts by weight respectively.

In order to eliminate or at least reduce the slight yellowing which often occurs in the formation of plastics on heating, it is often of advantage to add phosphites, such as triphenyl phosphite, in amounts of 0.01 to 5 parts by weight per 100 parts by weight of plastic, in addition to the UV absorbers. Should the substrate, in addition to its sensitivity to heat and light, also be subjected to autoxidation, naturally antioxidant and/or synergist can be added in addition to the phosphite.

The incorporation of the UV absorbers according to the invention into slightly basic, neutral or acid carriers is particularly advantageous.

The light-sensitive materials can also be protected from the injurious effect of light by coating them with a protective coating, e.g. with a lacquer, containing at least one v-triazole according to the invention, or covering them with articles such as films, discs or plates, which contain such UV absorbers. In both these cases the amount of UV absorber added is advantageously 10–30% (calculated on the protective coating material) for protective coatings of less then 0.01 mm. thickness and 1–10% for protective coatings of 0.01–0.1 mm. thickness.

For certain uses, particularly when warm chips of polymer are powdered with protective substances, products are particularly valuable which melt at over the softening temperature of the polymers concerned and, in spite of this, are sufficiently soluble in the polymer melt.

For polyolefins such as polyethylene, polypropylene and polymers of other aliphatic α-olefins, v-triazoles of the Formula Id

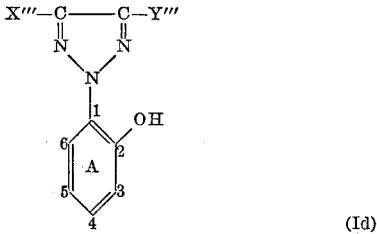

(Id)

are preferred, in which formula $X'''$ and $Y'''$ independently of each other represent alkyl groups having 1 to 18 carbon atoms, benzyl, 1- or 2-phenylethane or phenyl groups optionally substituted by chlorine, bromine or alkyl or alkoxy groups, each having 1 to 12 carbon atoms, and $X'''$ in addition also represents hydrogen, and in which the ring A is optionally further substituted in at most two of the positions 3, 4 and 5 by chlorine, bromine, alkoxy groups having 1 to 12 carbon atoms, $Y'''$ groups or by cyclopentyl or cyclohexyl groups optionally substituted by low alkyl groups, the total number of carbon atoms in $X'''$, $Y'''$ and in the substituents of the ring A being at least 7 and at most 25.

Those compounds of Formula Id are particularly preferred in which the ring A contains no halogen, $X'''$ is an aryl group and the number of carbon atoms in $X'''$, $Y'''$ and in the substituents of ring A is at least 10.

For substrates of low medium polarity such as polystyrene or polyvinyl chloride, compounds of Formula Ie

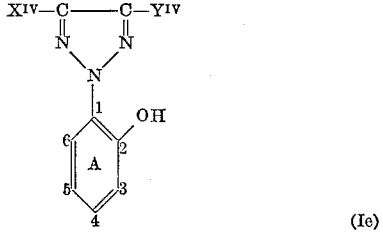

(Ie)

are preferred, in which $X^{IV}$ and $Y^{IV}$ independently of each other represent low alkyl groups having up to 6 carbon atoms, benzyl, 1- or 2-phenylethane or phenyl groups optionally substituted by chlorine, bromine or low alkyl or alkoxy groups, alkoxycarbonyl groups having 1 to 8 carbon atoms in the alkoxy group, or benzyloxycarbonyl groups optionally substituted in the phenyl ring by low alkyl or alkoxy groups, and the ring A can be further substituted in at most two of the positions 3, 4 and 5 by chlorine, bromine, alkoxy groups having 1 to 10 carbon atoms, $Y^{IV}$ groups or by cyclopentyl or cyclohexyl groups optionally substituted by low alkyl groups, and the total number of carbon atoms in $X^{IV}$, $Y^{IV}$ and in the substituents of ring A is at least 7 and at most 16.

The compounds of Formula Ie wherein $X^{IV}$ is an aryl group, $Y^{IV}$ is an aryl or esterified carboxyl group, the ring A contains no halogen and the maximal number of carbon atoms in $X^{IV}$, $Y^{IV}$ and in the substituents of ring A is 14, are particularly preferred.

The following non-limitative examples illustrate the invention further. The temperatures are given therein in degrees centigrade. Parts and percentages are given therein by weight unless stated otherwise.

EXAMPLE 1.—PRODUCTION OF 2-(2'-HYDROXYPHENYL)-4,5-DIPHENYL-V-TRIAZOLE (I) Production by way of benzil-(2-methoxy-phenylhydrazone)-oxime obtained by method (b) and cyclisation by method (a)

(a) 123 g. of o-anisidine in 400 ml. of water and 250 ml. of conc. hydrochloric acid are diazotised at 0–5° by the addition of a solution of 69 g. of sodium nitrite in 200 ml. of water. The diazonium chloride solution obtained is added dropwise within 2 hours at 5–10° to a solution of 196 g. of desoxybenzoin in 800 ml. of pyridine and the reaction mixture is stirred for 4 hours at 5–10°. The yellow precipitate of the benzil-2-methoxy-phenyl hydrazone is filtered off under suction and washed with water. It then melts at 146°. 165 g. of the benzil-2-methoxy-phenyl hydrazone so obtained, in 1000 ml. of ethanol are refluxed for 8 hours with a solution of 75 g. of hydroxylamine hydrochloride and 150 g. of crystallised sodium acetate in 250 ml. of water. At the end of this time, the same amount of hydroxylamine hydrochloride and sodium acetate solution are added to the reaction solution and the whole is stirred under reflux for another 12 hours. On cooling and carefully diluting the reaction mixture with water, the benzil-(2-methoxy-phenyl hydrazone)-oxime crystallises out. It is filtered off under suction and washed with water. Recrystallised from benzene, it melts at 112–113°.

69 g. of this benzil-(2-methoxy-phenyl hydrazone)-oxime are heated for 10 minutes at 90–100° with 40 g. of acetanhydride. The excess anhydride and the acetic acid formed are then completely distilled off in vacuo. The acetyl derivative of benzil-(2-methoxy-phenyl hydrazone)-oxime which remains melts, after crystallising once from ligroin, at 126°.

50 g. of this acetyl derivative are heated with 50 ml. of o-dichlorobenzene for 4 hours at 180°. The solvent and the acetic acid split off are then completely distilled off in vacuo, the residue is stirred with 50 ml. of methanol and the 2 - (2'-methoxy-phenyl)-4,5-diphenyl-v-triazole which crystallises out is filtered off under suction and washed with methanol. After drying, it melts at 108°.

27 g. of aluminium chloride are added in portions to a solution of 32.7 g. of 2-(2'-methoxy-phenyl)-4,5-diphenyl-v-triazole in 300 ml. of toluene. The mixture obtained is then stirred for 1 hour at 100–110°. The reaction mixture is poured onto 300 g. of ice and 50 ml. of concentrated aqueous hydrochloric acid and the solvent is distilled off with steam. The 2-(2'-hydroxy-phenyl)-4,5-diphenyl-v-triazole which remains is filtered off under suction and, after crystallising once from hexane, it melts at 99°.

(b) The benzil-2-methoxy-phenyl hydrazone mentioned under (a) is also obtained when the solution of the o-methoxybenzene diazonium chloride mentioned above is added to a solution of 224 g. of formyl desoxybenzoin[2,3-diphenyl-3-oxo-propanal-(1)] in 800 ml. of ethanol. The pH of this solution is kept at 4.5 to 5.5 by the addition of an aqueous solution of sodium acetate which contains 30 g. of sodium acetate per 100 ml. of solution. The benzil-2-methoxy-phenyl hydrazone formed as coupling product melts at 147°. It is in crystalline form and is very pure and after drying, it can be further worked up without further purification as described under (a) into 2-(2'-hydroxy-phenyl)-4,5-diphenyl-v-triazole.

(II) Production by way of the benzil-(2-hydroxy-phenyl hydrazone)-oxime obtained by method (b) and cyclisation by method (a)

109 g. of o-aminophenol in 400 ml. of water and 250 ml. of concentrated hydrochloric acid are diazotised at 0–5° by the addition of a solution of 69 g. of sodium nitrite in 200 ml. of water. The diazonium chloride solution obtained is added dropwise to a solution of 196 g. of desoxybenzoin in 800 ml. of pyridine, the addition being made within 2 hours at 5–10°, and the reaction mixture is stirred for 8 hours at 5–10°. The benzil-2-hydroxyphenyl hydrazone which precipitated is filtered off under suction, washed with water and crystallised from ethanol whereupon it melts at 196°.

158 g. of the benzil-2-hydroxy-phenyl hydrazone so obtained in 1000 ml. of ethanol are stirred under reflux for 8 hours with a solution of 75 g. of hydroxylamine hydrochloride and 150 g. of crystallised sodium acetate in 250 ml. of water. At the end of this time, the same amount of hydroxylamine hydrochloride and of sodium acetate solution are again added and the whole is refluxed for 12 hours. On cooling and carefully diluting with water, the benzil-(2-hydroxy-phenyl hydrazone)-oxime crystallises out. It is filtered off under suction, washed with water, dried and recrystallised from benzene. It melts at 180°.

66 g. of this benzil-(2-hydroxy-phenyl hydrazone)-oxime and 60 g. of acetanhydride are heated for 10 minutes at 90–100°. The excess acetanhydride and the acetic acid formed are then completely distilled off in vacuo. 80 ml. of o-dichlorobenzene are added to the diacetyl derivative of benzil-(2-hydroxy-phenyl hydrazone)-oxime which remains and the mixture is heated for 4 hours at 180°. The o-dichlorobenzene and acetic acid which is split off are then completely distilled off in vacuo. The residue is stirred with 50 ml. of methanol and the 2-(2'-acetyloxy-phenyl)-4,5-diphenyl-v-triazole which crystallises out is filtered off under suction and washed with methanol. It melts at 116°. The 2-(2'-acetyloxy-phenyl)-4,5-diphenyl-v-triazole so obtained, 150 ml. of methanol and 150 ml. of 2 N sodium hydroxide solution are then refluxed for 10–15 minutes until complete solution is obtained. After cooling, the alkaline solution is acidified with acetic acid, the precipitated 2-(2'-hydroxy-phenyl)-4,5-diphenyl-v-triazole is filtered off under suction and crystallised from hexane. It melts at 99°.

(III) Production by way of the benzil-(2-methoxy-phenyl hydrazone)-oxime obtained by method (a) and cyclisation by method (b)

A solution of 27.6 g. of o-methoxy-phenyl hydrazine in 50 ml. of ethanol is added dropwise to a solution of 45 g. of benzil-α-monoxime in 100 ml. of ethanol, the addition being made at room temperature within 30 minutes. The solution obtained is acidified with 20 ml. of a mixture of equal volume of glacial acetic acid and water and then stirred at 50°. After a short time, crystals begin to separate out. To complete the reaction, the reaction mixture is stirred for another 3 hours at 50°. The benzil-(2-methoxy-phenyl hydrazone)-oxime formed is filtered off under suction and washed with 20 ml. of methanol. After drying, it melts at 210–212° with decomposition. It is thus a different isomer from the compound obtained under (Ia) and (Ib).

A solution of 50 g. of copper sulphate in 70 ml. of water is added dropwise within 1 hour to a solution of 34.5 g. of this benzil-(2-methoxy-phenyl hydrazone)-oxime in 100 ml. of pyridine, the addition being made at the boil. The reaction mixture is stirred for 1 hour under reflux, cooled, poured into ½ a litre of ice water and the crystals which separate out are filtered off. After washing with 300 ml. of hot water, the crystals are recrystallised from ethanol and from ligroin. The 2-(2'-methoxy-phenyl)-4,5-diphenyl-v-triazole-1-oxide so obtained melts at 153–154°.

17.2 g. of 2-(2'-methoxy-phenyl)-4,5-diphenyl-v-triazole-1-oxide in 100 ml. of glacial acetic acid are refluxed for 2 hours with 7.5 g. of zinc dust. The reaction mixture is then filtered while hot and the filtrate is diluted with 200 ml. of water. When cold, white crystals separate out of the filtrate and these are recrystallised from methanol and ligroin. The 2-(2'-methoxy-phenyl)-4,5-diphenyl-v-triazole so obtained melts at 109–110° and is identical with the compound described in (Ia). It can be dealkylated as described under (Ia) or with HBr as follows:

10 g. of 2-(2'-methoxy-phenyl)-4,5-diphenyl-v-triazole are refluxed for 3 hours with 100 ml. of glacial acetic acid and 100 ml. of 48% hydrobromic acid. After cooling, it is diluted with water and the precipitated 2-(2'-hydroxy-phenyl)-4,5-diphenyl-v-triazole is filtered off under suction, dried and crystallised from hexane. It melts at 99°.

The ring of the benzil-(2-methoxy-phenyl hydrazone)-oxime, M.P. 210–212° (described under III) can also be closed by method (a) and, vice versa, that of benzil-(2-methoxy-phenyl hydrazone)-oxime, M.P. 112–113° (described in (I) can be closed by method (b). On using the same method, identical products are obtained from both isomers.

EXAMPLE 2

(2.1) Production of 2-(2'-hydroxy-5'-methyl-phenyl(-4,5-diphenyl-v-triazole 137.0 g. of p-cresidine in 600 ml. of water and 400 ml. of concentrated hydrochloric acid are diazotised at 0–5° by the addition of a solution of 69 g. of sodium nitrite in 200 ml. of water. The diazonium chloride solution obtained is added dropwise to a solution of 300 g. of tin chloride dihydrate in 500 ml. of conc. hydrochloric acid, the addition being made within 2 hours at 0.5°, and then the reaction mixture is stirred for another hour at 10°. 900 ml. of a solution of 30 g. of sodium hydroxide per 100 ml. of water are then added to the reaction mixture while cooling in such a way that the temperature does not exceed 20°. A brown oil separates which is extracted with 500 ml. of toluene. The toluene phase is separated, washed with water, dried over sodium sulphate and then evaporated to dryness. The residue crystallises from methanol. In this way, 2-methoxy-5-methyl-phenyl hydrazine, M.P. 53–54°, is obtained.

A solution of 30.9 g. of 2-methoxy-5-methyl-phenyl hydrazine in 50 ml. of ethanol is added dropwise within half an hour to a solution of 45.0 g. of benzil-α-monoxime in 100 ml. of ethanol. The reaction mixture is then acidified with 20 ml. of a mixture of equal volume of glacial acetic acid and water, heated to 50° and stirred for 3 hours at this temperature. Yellow crystals begin to separate out after a short time. On completion of the reaction, the crystalline precipitate is filtered off, washed with methanol and recrystallised from ethylene glycol monomethyl ether. The benzil-(2-methoxy - 5 - methyl-phenyl hydrazone)-oxime so obtained melts at 233–235° with decomposition.

35.9 g. of benzil-(2-methoxy-5-methyl-phenyl hydrazone)-oxime are stirred and heated in 50 ml. of acetic acid anhydride. An exothermic reaction starts at 30° which keeps the reaction mixture at reflux temperature without external heating. After the reaction has diminished, the reaction solution is refluxed for another 10 minutes. On cooling the reaction mixture, 2-(2'-methoxy-5'-methyl-phenyl)-4,5-diphenyl-v-triazole, M.P. 152–153°, crystallises out.

A mixture of 17.2 g. of 2-(2'-methoxy-5'-methyl-phenyl)-4,5-diphenyl-v-triazole and 10.0 g. of aluminium chloride in 100 ml. of dry benzene is refluxed for 1 hour. The reaction mixture is then cooled, decomposed while cooling with 100 ml. of 2 N HCl and the benzene is removed by steam distillation. The reaction product which remains is filtered off, washed with 50 ml. of cold methanol and recrystallised from ethanol and ligroin. The 2-(2'-hydroxy-5'-methyl-phenyl) - 4,5 - diphenyl-v-triazole so obtained melts at 126°.

In Table A, if the 2-methoxy anilines given are used instead of p-cresidine, the following 2-(2'-hydroxy-phenyl)-4,5-diphenyl-v-triazoles listed in Table B are obtained in an analogous way in the same sequence of reactions.

TABLE A 2-methoxy-5-tert. butyl-aniline,
2-methoxy-5-benzyl-aniline,
2-methoxy-5-cyclohexyl-aniline,
2-methoxy-5-phenyl-aniline,
2-methoxy-3,5-dimethyl-aniline,
2,5-dimethoxy-aniline,
2,4-dimethoxy-aniline,
2-methoxy-5-chloro-aniline,
2-methoxy-3,4-dichloro-aniline,
2-methoxy-5-(1',1',3',3',-tetramethylbutyl)aniline,
2-methoxy-5-(1'-methyl-cyclohexyl)-aniline.

TABLE B (2.2) 2-(2'-hydroxy-5'-tert.butyl-phenyl)-4,5-diphenyl-v-triazole,
(2.3) 2-(2'-hydroxy-5'-benzyl-phenyl)-4,5-diphenyl-v-triazole,
(2.4) 2-(2'-hydroxy-5'-cyclohexyl-phenyl)-4,5-diphenyl-v-triazole,
(2.5) 2-(2'-hydroxy-5'-phenyl-phenyl)-4,5-diphenyl-v-triazole,
(2.6) 2-(2'-hydroxy-3',5'-dimethyl-phenyl)-4,5-diphenyl-v-triazole,
(2.7) 2-(2'-hydroxy-5'-methoxy-phenyl)-4,5-diphenyl-v-triazole,
(2.8) 2-(2'-hydroxy-4'-methoxy-phenyl)-4,5-diphenyl-v-triazole,
(2.9) 2-(2'-hydroxy-5'-chlorophenyl)-4,5-diphenyl-v-triazole,
(2.10) 2-(2'-hydroxy-3',4'-dichlorophenyl)-4,5-diphenyl-v-triazole,
(2.11) 2-[2'-hydroxy-5'-(1'',1'',3'',3''-tetramethylbutyl)-phenyl]-4,5-diphenyl-v-triazole,
(2.12) 2-[2'-hydroxy-5'-(1'-methyl-cyclohexyl)-phenyl]-4,5-diphenyl-v-triazole.

EXAMPLE 3

(3.1) Production of 2-(2'-hydroxy-5'-phenyl-phenyl)-4,5-bis-(4''-methoxy-phenyl)-v-triazole A solution of 21.4 g. of 2-methoxy-5-phenyl-phenyl hydrazine (produced as described in Example 2) in 100 ml. of ethanol is added dropwise to a solution of 28.5 g. of anisil-α-monoxime in 100 ml. of ethanol. This reaction mixture is acidified with 20 ml. of a mixture of equal volume of glacial acetic acid and water, heated to 50° and stirred at this temperature for 5 hours. Pale yellow crystals begin to separate out at the end of this time. On completion of the reaction, the crystalline precipitate is filtered off under suction, washed with methanol and dried. The p-anisil-(2-methoxy-5-phenyl - phenyl hydrazone)-oxime so obtained melts at 255–258° with decomposition.

24.8 g. of p - anisil-(2-methoxy-5-phenyl-phenyl hydrazone)-oxime in 50 ml. of acetic acid anhydride are refluxed while stirring for 20 minutes. A dark solution is obtained from which, on cooling, 2-(2'-methoxy-5'-phenyl-phenyl)-4,5-(4''-methoxy-phenyl)-v - triazole crystallises out. M.P. 163°.

A mixture of 18.2 g. of 2 - (2' - methoxy-5'-phenyl-phenyl)-4,5-bis-(4''-methoxy-phenyl)-v - triazole and 6.7 g. of aluminium chloride in 100 ml. of dry benzene is refluxed for 1 hour. The reaction mixture is then cooled, decomposed while cooling with 100 ml. of 2 N HCl and the benzene is removed by steam distillation. The remaining reaction product is filtered off, washed with 50 ml. of ethanol and recrystallised from ethylene glycol monomethyl ether and from toluene. The 2 - (2' - hydroxy-5'-phenyl-phenyl)-4,5-bis-(4''-methoxy-phenyl) - v - triazole so obtained melts at 205°.

If, instead of 2 - methoxy-5-phenyl-phenyl hydrazine, the 2-methoxy-phenyl hydrazines given in Table A are reacted with equimolar amounts of anisil-α-monoxime in an analogous way as described above then, with the same sequence of reactions, the 2-(2'-hydroxy-phenyl)-4,5-bis-(4''-methoxy-phenyl) - v - triazoles listed in Table B are obtained.

TABLE A 2-methoxy-5-chlorophenyl hydrazine
2-methoxy-5-methyl-phenyl hydrazine
2-methoxy-5-dodecyl-phenyl hydrazine
2-methoxy-4,5-dimethylphenyl hydrazine
2-methoxy-3,5-dichlorophenyl hydrazine
2,5-dimethoxy-phenyl hydrazine
2-methoxy-phenyl hydrazine

TABLE B (3.2) 2-(2'-hydroxy-5'-chlorophenyl)-4,5-bis(4''-methoxy-phenyl)-v-triazole
(3.3) 2-(2'-hydroxy-5'-methyl-phenyl)-4,5-bis-(4''-methoxy-phenyl)-v-triazole
(3.4) 2-(2'-hydroxy-5'-dodecyl-phenyl)-4,5-bis(4''-methoxy-phenyl)-v-triazole
(3.5) 2-(2'-hydroxy-5',5'-dimethyl-phenyl)-4,5-bis-(4''-methoxy-phenyl)-v-triazole
(3.6) 2-(2'-hydroxy-3',5',-dichlorophenyl)4,5-bis-(4''-methoxy-phenyl)-v-triazole
(3.7) 2-(2'-hydroxy-5'-methoxy-phenyl)-4,5-bis-(4''-methoxy-phenyl)-v-triazole
(3.8) 2-(2'-hydroxy-phenyl)-4,5-bis-(4''-methoxy-phenyl)-v-triazole

EXAMPLE 4

(4.1) Production of 2-(2'-hydroxy-phenyl)-4,5-bis-(4''-hydroxy-phenyl)-v-triazole 7.5 g. of 2 - (2'-hydroxy-phenyl)-4,5-bis(4''-methoxy-phenyl) - v - triazole, M.P. 133°, described in Example 3, in 50 ml. of glacial acetic acid and 30 ml. of 50% hydrobromic acid are refluxed for 3 hours. The reaction mixture is then cooled, diluted with 100 ml. of water whereupon 2-(2'-hydroxy-phenyl)-4,5-bis - (4'' - hydroxy - phenyl)-v-triazole crystallises out. The compound melts after dissolving and recrystallising from chloro-benzene, at 244°.

This compound is also obtained when the 2-(2'-methoxy-phenyl)-4,5-bis-(4''-methoxy-phenyl) - v - triazole obtained as intermediate product in Example 3 is demethylated with a mixture of hydrobromic acid and glacial acetic acid as follows. 19.4 g. of 2-(2'-methoxy-phenyl)-4,5-bis(4''-methoxy-phenyl)-v - triazole and 100 ml. of 50% hydrobromic acid in 100 ml. of glacial acetic acid are refluxed for 3 hours. On completion of the reaction, the compound 4.1. crystallises out of the cooled reaction solution.

The v-triazoles listed in Table B are obtained from 2 - (2' - hydroxy - phenyl)-4,5-bis-(4''-hydroxy-phenyl)-v-triazole by reaction with the acid chlorides or alkyl halides given in Table A.

TABLE A acetyl chloride
lauroyl chloride
benzoyl chloride
n-octyl bromide
benzyl chloride
allyl bromide
methallyl chloride

TABLE B (4.2) 2-(2'-hydroxy-phenyl)-4,5-bis-(4''-acetoxy-phenyl)-v-triazole (4.3) 2-(2'-hydroxy-phenyl)-4,5-bis-(4''-lauroyloxy-phenyl)-v-triazole
(4.4) 2-(2'-hydroxy-phenyl)-4,5-bis-(4''-benzoyloxy-phenyl)-v-triazole
(4.5) 2-(2'-hydroxy-phenyl)-4,5-bis-(4''-n-octoxy-phenyl)-v-triazole
(4.6) 2-(2'-hydroxy-phenyl)-4,5-bis-(4''-benzyloxy-phenyl)-v-triazole
(4.7) 2-(2'-hydroxy-phenyl)-4,5-bis-(4''-allyloxy-phenyl)-v-triazole
(4.8) 2-(2'-hydroxy-phenyl)-4,5-bis-(4''-methallyloxy-phenyl)-v-triazole.

When the 2-(2',4'-dimethoxy-phenyl)-4,5-diphenyl-v-triazole described in Example 2 is demethylated analogously as described above with a mixture of hydrobromic acid and glacial acetic acid, then 2-(2',4'-dihydroxy-phenyl)-4,5-diphenyl-v-triazole (4.9) is obtained.

On alkylating or acylating the sodium salt of the p-hydroxy group in the compound 2-(2',4'-dihydroxy-phenyl)-4,5-diphenyl-v-triazole (4.8) with the alkyl halides or acyl halides given in Table A, then the v-triazoles listed in Table C are obtained.

TABLE C (4.10) 2-(2'-hydroxy-4'-acetoxy-phenyl)-4,5-diphenyl-v-triazole
(4.11) 2-(2'-hydroxy-4'-lauroyloxy-phenyl)-4,5-diphenyl-v-triazole
(4.12) 2-(2'-hydroxy-4'-benzoyloxy-phenyl)-4,5-diphenyl-v-triazole
(4.13) 2-(2'-hydroxy-4'-n-octoxy-phenyl)-4,5-diphenyl-v-triazole
(4.14) 2-(2'-hydroxy-4'-benzyloxy-phenyl)-4,5-diphenyl-v-triazole
(4.15) 2-(2'-hydroxy-4'-allyloxy-phenyl)-4,5-diphenyl-v-triazole
(4.16) 2-(2'-hydroxy-4'-methallyloxy-phenyl)-4,5-diphenyl-v-triazole.

EXAMPLE 5

(5.1) Production of 2-(2'-hydroxy-5'-chlorophenyl)-4,5-bis-(4''-chlorophenyl)-v-triazole 43.5 g. of 4,4'-dichlorobenzil-[2-hydroxy-5-chlorophenyl hydrazone]-oxime (obtained by coupling 4,4'-dichlorodesoxy benzoin with 2-hydroxy-5-chlorobenzene diazonium chloride according to Example 1, II and producing the oxime from the resultant 4,4'-dichlorobenzil-2-hydroxy-5-chlorophenyl hydrazone), and 100 ml. of acetanhydride are heated for 10 minutes at 90–100°. The excess acetic acid anhydride and the acetic acid formed are then distilled off in vacuo. The residue in 100 ml. of o-dichlorobenzene is refluxed for 4 hours. The o-dichlorobenzene and the acetic acid split off are then completely distilled off in vacuo. The residue is refluxed for 10 minutes with 200 ml. of methanol and 200 ml. of 2 N sodium hydroxide solution until complete solution is attained. After cooling, the alkaline solution is acidified with acetic acid, the precipitated 2-(2'-hydroxy - 5' - chlorophenyl)-4,5-bis-(4''-chlorophenyl)-v-triazole is filtered off under suction and recrystallised from methylethyl ketone and from ligroin. It melts at 163°.

If instead of 2-hydroxy-5-chlorobenzene diazonium chloride, the diazonium salts given in Table A are coupled with 4,4'-dichlorodesoxybenzoin and otherwise the procedure described is followed, then the v-triazoles given in Table B are obtained.

TABLE A 2-hydroxy-5-methylbenzene diazonium chloride
2-hydroxybenzene diazonium chloride
2-hydroxy 3,4-dichlorobenzene diazonium chloride
2-hydroxy-5-N,N-diethyl-sulfamyl-benzene diazonium chloride
2-hydroxy-5-N-methyl-N-cyclohexyl-sulfamoyl-benzene diazonium chloride
2-hydroxy-5-N-methyl-N-benzyl-sulfamoyl-benzene diazonium chloride
2-hydroxy-5-N-butyl-N-(3-hydroxyethyl)-sulfamoyl-benzene diazonium chloride
2-hydroxy-5-N-γ-methoxypropyl-sulfamoyl-benzene diazonium chloride
2-hydroxy-5-N-octyl-sulfamoyl-benzene diazonium chloride
2-hydroxy-5-N,N-diethyl-carbamoyl-benzene diazonium chloride
2-hydroxy-5-N-methyl-N-cyclohexyl-carbamoyl-benzene diazonium chloride
2-hydroxy-5-N-methyl-N-benzyl-carbamoyl-benzene diazonium chloride
2-hydroxy-5-N-butyl-N-(3-hydroxyethyl)-carbamoyl-benzene diazonium chloride
2-hydroxy-5-N-γ-methoxypropyl-carbamoyl-benzene diazonium chloride
2-hydroxy-5-N-octyl-carbamoyl-benzene diazonium chloride

TABLE B (5.2) 2-(2'-hydroxy-5'-methyl-phenyl)-4,5-bis-(4''-chlorophenyl)-v-triazole
(5.3) 2-(2'-hydroxy-phenyl)-4,5-bis-(4''-chlorophenyl)-v-triazole
(5.4) 2-(2'-hydroxy-3',4'-dichlorophenyl)-4,5-bis-(4''-chlorophenyl)-v-triazole
(5.5) 2-(2'-hydroxy-5'-N,N-diethyl-sulfamoyl-phenyl)-4,5-bis-(4''-chlorophenyl)v-triazole
(5.6) 2-(2'-hydroxy-5'-N-methyl-N-cyclohexyl-sulfamoyl-phenyl)-4,5-bis-(4''-chlorophenyl)-v-triazole
(5.7) 2-(2'-hydroxy-5'-N-methyl-N-benzyl-sulfamoyl-phenyl)-4,5-bis-(4''-chlorophenyl)-v-triazole
(5.8) 2-(2'-hydroxy-5'-N-butyl-N-(β-hydroxyethyl)-sulfamoylphenyl)-4,5-bis-(4''-chlorophenyl)-v-triazole
(5.9) 2-(2'-hydroxy-5'-N-γ-methoxypropyl-sulfamoyl-phenyl)-4,5-bis-(4''-chlorophenyl)v-triazole
(5.10) 2-(2'-hydroxy-5'-N-octyl-sulfamoyl-phenyl)-4,5-bis-(4''-chlorophenyl)-v-triazole
(5.11) 2-(2'-hydroxy-5'-N,N-diethyl-carbamoyl-phenyl)-4,5-bis-(4''-chlorophenyl)-v-triazole
(5.12) 2-(2'-hydroxy-5'-N-methyl-N-cyclohexyl-carbamoyl-phenyl)-4,5-bis-(4''-chlorophenyl)-v-triazole
(5.13) 2-(2'-hydroxy-5'-methyl-N-benzyl-carbamoyl-phenyl)-4,5-bis-(4''-chlorophenyl)-v-triazole
(5.14) 2-(2'-hydroxy-5'-N-butyl-N-(β-hydroxyethyl)-carbamoyl-phenyl)-4,5-bis-(4''-chlorophenyl)-v-triazole
(5.15) 2-(2'-hydroxy-5'-N-γ-methoxypropyl-carbamoyl-phenyl)-4,5-bis-(4''-chlorophenyl)-v-triazole
(5.16) 2-(2'-hydroxy-5'-N-octyl-carbamoyl-phenyl)-4,5-bis-(4''-chlorophenyl)-v-triazole.

EXAMPLE 6

(6.1) Production of 2-(2'-hydroxy-phenyl)-4,5-bis-(4''-methyl-phenyl)-v-triazole A solution of 13.8 g. of o-methoxy-phenyl hydrazine in 50 ml. of ethanol is added dropwise to a solution of 25.3 g. of p-toluyl monoxime in 100 ml. of ethanol at room temperature. After acidifying with 20 ml. of a mixture of equal volume of glacial acetic acid and water, the solution obtained is stirred for 5 hours at 50°. Toluyl oxime-o-methoxy-phenyl hydrazone separates as a crystal mass and, on completion of the reaction, it is filtered off under suction, washed with methanol and dried. It melts at 215–220° with decomposition.

18.6 g. of this toluyl oxime-o-methoxy-phenyl hydrazone in 25 ml. of acetanhydride are stirred at reflux temperature for 10 minutes. On cooling the reaction mixture, a crystalline precipitate is obtained which is filtered off under suction, washed with methanol and dried. The 2-(2' - methoxy - phenyl)-4,5-bis(4'' - methyl - phenyl)-v-triazole so obtained melts at 108–110°. 7.1 g. of this 2-

(2' - methoxy - phenyl)-4,5-bis-(4'-methyl-phenyl)-v-triazole and 3.0 g. of aluminium chloride in 100 ml. of dry benzene are refluxed for 1 hour. The reaction mixture is cooled, decomposed with 50 ml. of 2 N hydrochloric acid and the benzene is removed by steam distillation. The residue is cooled, filtered and recrystallised from ethanol. After a second recrystallisation from ligroin, the 2-(2'-hydroxy-phenyl)-4,5-bis-(4''-methyl-phenyl)-v-triazole so obtained melts at 149°.

EXAMPLE 7

(7.1) Production of 2-(2'-hydroxy-phenyl)-4-phenyl-5-(4''-ethyl-phenyl)-v-triazole 60 g. of ethylbenzene and 77 g. of phenylacetic acid chloride are dissolved in 500 ml. of o-dichlorobenzene. 75 g. of anhydrous aluminium chloride are added in portions to the solution obtained, the addition being made within 30 minutes at 25–30°. The reaction mixture is then stirred for 3 hours at 40–45° and then poured onto 500 g. of ice and 50 ml. of conc. hydrochloric acid. After distilling off the o-dichlorobenzene with steam, the benzyl-4-ethylphenyl ketone remains as an oil which, on cooling, solidifies into a crystalline mass. After recrystallisation from ethanol it melts at 59°.

61.5 g. of o-anisidine are diazotised as described in Example 1 and the diazonium chloride solution obtained is added dropwise to a solution of 112 g. of benzyl-4-ethylphenyl ketone in 400 ml. of pyridine. After 5 hours' stirring at 5–10°, the precipitated 1-(4'-ethyl-phenyl)-2-[(2 - methoxyphenyl) - hydrazono] - 2-phenyl ethanone (M.P 126°) is filtered off under suction and washed with water.

71.6 g. of the 1-(4'-ethyl-phenyl)-2-[(2-methoxy-phenyl)-hydrazono]-2-phenyl ethanone so obtained in 800 ml. of ethanol are refluxed for 8 hours with a solution of 28 g. of hydroxylamine hydrochloride and 55 g. of crystalline sodium acetate in 200 ml. of water while stirring. At the end of this time, the same amount of hydroxylamine hydrochloride and sodium acetate dissolved in 200 ml. of water is added to the reaction mixture which is then stirred for 12 hours under reflux. After cooling and diluting with water, the precipitated 1-(4'-ethyl-phenyl)-2 - [(2 - methoxyphenyl)-hydrazono]-2-phenyl-ethan-1-onoxime is filtered off under suction, washed with water and dried. Recrystallised from ligroin, it melts at 124°.

37.3 g. of 1-(4'-ethyl-phenyl)-2-[(2-methoxyphenyl)-hydrazono]-2-phenyl ethanonoxime and 200 ml. of pyridine are heated at 90°. At 90–95°, a solution of 50 g. of copper sulphate pentahydrate in 150 ml. of water is added within 30 minutes to this solution. The reaction mixture is stirred for 1 hour at 90–95°, cooled and diluted with water. The 2-(2'-methoxy-phenyl)-4-phenyl-5-(4''-ethyl-phenyl)-v-triazole-1-oxide which has crystallised out is filtered off under suction, washed with water and dried. Recrystallised from ligroin, it melts at 150°. 18.5 g. of the 2-(2'-methoxy-phenyl)-4-phenyl-5-(4-ethyl-phenyl)-v-triazole-1-oxide in 200 ml. of toluene are stirred for 1 hour at 80–85° with 13.3 g. of anhydrous aluminium chloride. After working up as described in Example 1 and crystallisation from ligroin, the 2-(2'-hydroxy-phenyl)-4-phenyl - 5 - (4''-ethyl-phenyl)-v-triazole-1-oxide obtained melts at 147°.

7 g. of 2-(2'-hydroxy-phenyl)-4-phenyl-5-(4''-ethyl-phenyl)-v-triazole-1-oxide in 70 ml. of glacial acetic acid are heated with 3 g. of zinc dust at 90–95°. 5 ml. of conc. hydrochloric acid are added to this reaction mixture within 10 minutes. The whole is then stirred for another hour at 90–95°, excess zinc is filtered off while it is still hot and the filtrate is diluted with water. The 2-(2'-hydroxy - phenyl) - 4 - phenyl - 5-(4''-ethyl-phenyl)-v-triazole which crystallises out is recrystallised from hexane and then melts at 73°.

The order of the last two steps can be reversed and the 2 - (2' - methoxy-phenyl)-4-phenyl-5-(4''-ethyl-phenyl)-v-triazole-1-oxide can first, as described above, be reduced to 2-(2'-methoxy-phenyl)-4-phenyl-5-(4''-ethyl-phenyl)-v-triazole and then this can be demethylated to form the end product, 2-(2'-hydroxy-phenyl)-4-phenyl-5-(4''-ethyl-phenyl)-v-triazole.

If the Friedel-Crafts acylation is performed using the equivalent amounts of the following acid chlorides and benzene derivatives such as phenylacetic acid chloride and ethylbenzene, then the following v-triazoles are obtained by the same method by way of all the steps:

(7.2) p-methylphenylacetic acid chloride and anisol:
2-(2'-hydroxy-phenyl)-4-(4''-methyl-phenyl)-5-(4'''-methoxy-phenyl)-v-triazole.

(7.3) phenylacetic acid chloride and resorcinol dimethyl ether: 2-(2'-hydroxy-phenyl)-4-phenyl-5-(2'',4''-dimethoxy-phenyl)-v-triazole.

(7.4) phenylacetic acid chloride and octyl benzene:
2-(2'-hydroxy-phenyl)-4-phenyl-5-(4''-octyl-phenyl)-v-triazole.

(7.5) p-chlorophenyl acetic acid chloride and octyloxy benzene: 2-(2'-hydroxy-phenyl)-4-(4''-chlorophenyl)-5-(4'''-octyloxy-phenyl)-v-triazole.

(7.6) phenylacetic acid chloride and dodecyloxy benzene:
2-(2'-hydroxy-phenyl)-4-phenyl-5-(4''-dodecyloxy-phenyl)-v-triazole.

(7.7) phenylacetic acid chloride and dodecyl benzene:
2-(2'-hydroxy-phenyl-4)-phenyl-5-(4''-dodecyl-phenyl)-v-triazole.

(7.8) p-acetylaminophenyl acetic acid chloride and o-xylene: 2-(2'-hydroxy-phenyl)-4-(4''-acetylamino-phenyl-5-(3''',4'''-dimethyl-phenyl)-v-triazole.

(7.9) α-naphthylacetic acid chloride and benzene: 2-(2'-hydroxy-phenyl)-4-α-naphthyl-5-phenyl-v-triazole.

(7.10) β-naphthylacetic acid and benzene:
2-(2'-hydroxy-phenyl)-4-β-naphthyl-5-phenyl-v-triazole.

EXAMPLE 8

(8.1) Production of 2-(2'-hydroxy-4'-acetylamino-phenyl)-4,5-diphenyl-v-triazole 77 g. of 5-nitro-2-aminophenol are slurried in 300 ml. of water and 125 ml. of concentrated hydrochloride acid and, at 0–5°, diazotised by the dropwise addition of 35 g. of sodium nitrite in 150 ml. of water. The diazonium chloride suspension is then added in small portions to a solution of 98 g. of desoxybenzoin in 400 ml. of pyridine, the addition being made within 1 hour at 0–5°. The reaction mixture is stirred for 6 hours at 15–20° and the precipitated benzil-(2-hydroxy-4-nitrophenyl)-hydrazone is filtered off under suction and washed with 6 litres of water and then with 400 ml. of methanol. It melts at 232°.

144.5 g. of benzil-(2-hydroxy-4-nitrophenyl)-hydrazone in 1 litre of ethanol are converted as described in Example I, II, into the oxime with hydroxylamine hydrochloride and sodium acetate. After crystallisation from toluene, the benzil - (2 - hydroxy-4-nitrophenyl-hydrazone)-oxime obtained melts at 194°. This benzil-(2-hydroxy-4-nitrophenyl hydrazone)-oxime is cyclised by taking 75 g. thereof in o-dichlorobenzene and proceeding by way of the acetyl derivative as is described in Example I. II. Saponification of the 2-(2'-acetyloxy-4'-nitrophenyl)-4,5-diphenyl-v-triazole obtained as intermediate product with methanolic sodium hydroxide solution yields 2-(2'-hydroxy-4'-nitrophenyl)-4,5-diphenyl-v-triazole which, after crystallisation from ligroin, melts at 181°.

35.8 g. of 2-(2'-hydroxy-4'-nitrophenyl)-4,5-diphenyl-v-triazone in 500 ml. of ethylene glycol monomethyl ether are heated at 90–95°. After adding 1 g. of Raney nickel to the solution obtained, 15 g. of hydrazine hydrate are added dropwise within 1 hour. The reaction mixture is stirred for 1 hour at 90–95°, the Raney nickel is filtered off hot and the filtrate is diluted with water. The 2-(2'-hydroxy - 4' - aminophenyl)-4,5-diphenyl-v-triazole which crystallises out is recrystallised from ligroin and then melts at 142°.

3.3 g. of 2-(2'-hydroxy-4'-aminophenyl)-4,5-diphenyl-v-triazole are dissolved in 50 ml. of pyridine. 0.8 g. of acetyl chloride are added dropwise to the solution obtained at 20° and the whole is stirred for 10 minutes at this temperature. The reaction mixture is slowly diluted with water, the precipitated 2-(2'-hydroxy-4'-acetylaminophenyl)-4,5-diphenyl-v-triazole is filtered off under suction, washed with water and dried. Recrystallised from chlorobenzene, it melts at 222°.

If the acylation of 2-(2'-hydroxy-4'-aminophenyl)-4,5-diphenyl-v-triazole is acylated with the following acid chlorides which are used in amounts equivalent to the acetyl chloride, then with the same procedure, the following v-triazoles are obtained:

(8.2) lauric acid chloride: 2-(2'-hydroxy-4'-lauroylaminophenyl)-4,5-diphenyl-v-triazole
(8.3) stearic acid chloride: 2 - (2' - hydroxy-4'-stearoyl-amino-phenyl)-4,5-diphenyl-v-triazole
(8.4) benzoyl chloride: 2-(2'-hydroxy-4'-benzoylaminophenyl)-4,5-diphenyl-v-triazole
(8.5) o - chlorobenzoyl chloride: 2 - [2 - hydroxy - 4-(o-chlorobenzoylamino)-phenyl]-4,5-diphenyl-v-triazole
(8.6) m-toluic acid chloride: 2-[2-hydroxy-4-(m-methyl-benzoylamino)-phenyl]-4,5-diphenyl-v-triazole
(8.7) anisic acid chloride: 2-[2-hydroxy-4-(p-methoxy-benzoylamino)-phenyl]-4,5-diphenyl-v-triazole
(8.8) p-toluene sulphochloride: 2-[2-hydroxy-4-(p-methyl-benzenesulphonamido)-phenyl]-4,5-diphenyl-v-triazole
(8.9) benzene sulphochloride: 2-(2'-hydroxy-4'-benzenesulphonamido-phenyl)-4,5-diphenyl-v-triazole
(8.10) p-chlorobenzene sulphochloride: 2-[2-hydroxy-4-(p-chlorobenzenesulphonamido)-phenyl]-4,5-diphenyl-v-triazole
(8.11) p-methoxybenzene sulphochloride: 2-[2-hydroxy-4-(p-methoxy-benzenesulphonamido)-phenyl]-4,5-diphenyl-v-triazole
(8.12) methane sulphochloride: 2-(2'-hydroxy-4'-methanesulphonamido-phenyl)-4,5-diphenyl-v-triazole
(8.13) butane sulphochloride: 2-(2'-hydroxy-4'-butane-sulphonamido-phenyl)-4,5-diphenyl-v-triazole
(8.14) cyclohexane sulphochloride: 2-(2'-hydroxy-4'-cyclohexanesulphonamido-phenyl)-4,5-diphenyl-v-triazole
(8.15) benzyl sulphochloride: 2-(2'-hydroxy-4'-phenylmethanesulphonamido-phenyl)-4,5-diphenyl-v-triazole
(8.16) chlorocarbonic acid methyl ester: 2-(2'-hydroxy-4'-methoxy-carboxamido-phenyl)-4,5-diphenyl-v-triazole
(8.17) chlorocarbonic acid octyl ester: 2-(2'-hydroxy-4'-octyloxy-carboxamido-phenyl)-4,5-diphenyl-v-triazole
(8.18) chlorocarbonic acid phenyl ester: 2-(2'-hydroxy-4'-phenoxy-carboxamido-phenyl)-4,5-diphenyl-v-triazole
(8.19) chlorocarbonic acid cyclohexyl ester: 2-(2'-hydroxy-4'-cyclohexyloxy-carboxamido-phenyl)-4,5-diphenyl-v-triazole
(8.20) chlorocarbonic acid benzyl ester: 2-(2'-hydroxy-4'-benzyloxy-carboxamido-phenyl)-4,5-diphenyl-v-triazole

EXAMPLE 9

(9.1) Production of 2-[2-hydroxy - 3 - (2'-oxohexamethyl-eneimido-methyl) - 5 - methyl - phenyl]-4,5-diphenyl-v-triazole 32.7 g. of 2-(2'-hydroxy-5'-methyl-phenyl)-4,5-diphenyl-v-triazole, produced according to Example 2, are dissolved at 10–15° in 150 ml. of concentrated sulphuric acid. 17.2 g. of I-methylol caprolactam are added to this solution in portions at 0–5° while stirring well. On completion of the addition, the whole is stirred for 2 hours at 0–5° and then for 2 hours at 15–20°. The sulphuric acid solution is then poured onto 500 g. of ice while stirring well. The white precipitate is filtered off under suction, washed neutral with water and dried. On recrystallising from chlorobenzene, 2-[2-hydroxy - 3 - (2'-oxohexamethyleneimidomethyl) - 5 - methyl - phenyl]-4,5-diphenyl-v-triazole is obtained, M.P. 168°.

If instead of N-methylol caprolactam, equivalent amounts of the following methylol compounds are used with otherwise the same procedure, the following v-triazoles are obtained:

(9.2) N-methylol butyric acid amide: 2-(2'-hydroxy-3'-butyroylamidomethyl-5'-methyl-phenyl)-4,5-diphenyl-v-triazole
(9.3) N-methylol lauric acid amide: 2-(2'-hydroxy-3'-lauroylamidomethyl-5'-methyl-phenyl)-4,5-diphenyl-v-triazole
(9.4) N-methylol stearic acid amide: 2-(2'-hydroxy-3'-stearoylamidomethyl-5'-methyl-phenyl)-4,5-diphenyl-v-triazole
(9.5) N-methylol acrylamide: 2-(2''-hydroxy-3'-acrylamidomethyl-5'-methyl-phenyl)-4,5-diphenyl-v-triazole
(9.6) N-methylol methacrylamide: 2-(2'-hydroxy-3'-methacrylamidomethyl-5'-methyl-phenyl)-4,5-diphenyl-v-triazole
(9.7) N-methylol benzamide: 2-(2'-hydroxy-3'-benzamidomethyl-5'-methyl-phenyl)-4,5-diphenyl-v-triazole
(9.8) N-methylol-o-chlorobenzamide: 2-[2-hydroxy-3-(2'-chlorobenzamidomethyl)-5-methyl-phenyl]-4,5-diphenyl-v-triazole
(9.9) N-methyl-3-methyl benzamide: 2-[2-hydroxy-3-(4'-methyl-benzamidomethyl)-5-methyl-phenyl]-4,5-diphenyl-v-triazole
(9.10) N-methylol cyclohexane carboxylic acid amide: 2-(2'-hydroxy-3'-cyclohexane-carboxamidomethyl-5'-methylphenyl)-4,5-diphenyl-v-triazole
(9.11) N-methylol phenylacetic acid amide: 2-(2'-hydroxy-3'-phenylacetamidomethyl-5'-methyl-phenyl)-4,5-diphenyl-v-triazole
(9.12) N-methylol carbamic acid ethyl ester: 2-(2'-hydroxy-3'-ethoxycarboxamidomethyl-5'-methyl-phenyl)-4,5-diphenyl-v-triazole
(9.13) N-methylol-N-ethyl carbamic acid ethyl ester: 2-[2-hydroxy-3-(N-ethoxycarbonyl-N-ethyl-aminomethyl)-5 methyl-phenyl]-4,5-diphenyl-v-triazole
(9.14) N-methylol-α-pyrrolidone: 2-[2-hydroxy-3-(2'-oxo-pyrrolidino-methyl)-5-methyl-phenyl]-4,5-diphenyl-v-triazole
(9.15) N-methylol-oxazolidone-(2): 2-[2-hydroxy-3-(2'-oxo-oxazolidino-methyl)-5-methyl-phenyl]-4,5-diphenyl-v-triazole

EXAMPLE 10

(10.1) Production of 2-(2'-hydroxy-3'-chloroacetamidomethyl-5'-methyl-phenyl)-4,5-diphenyl-v-triazole 32.7 g. of 2-(2'-hydroxy - 5' - methyl-phenyl) - 4,5-diphenyl-v-triazole, produced according to Example 2, are condensed with 13.5 g. of N-methylol chloroacetamide as described in Example 9. After working up the reaction mixture and crystallising the crude product from isopropanol, 2-(2' - hydroxy - 3' - chloroacetamidomethyl-5'-methyl-phenyl) - 4,5 - dipenyl-v-triazole is obtained, M.P. 198°.

If the reactive chlorine atom in the 2-(2'-hydroxy-3'-chloroacetamidomethyl - 5' - methyl - phenyl) - 4,5 - diphenyl-v-triazole obtained is reacted by known methods with the amines or alcohols or mercaptans given below, then the following v-triazoles are obtained:

(10.2) dibutylamine: 2-[2-hydroxy-3-(N,N-dibutyl-amino-acetamidomethyl)-5-methyl-phenyl]-4,5-diphenyl-v-triazole
(10.3) N-methyl-cyclohexylamine: 2-[2-hydroxy-3-(N-methyl-N-cyclohexylamino-acetamido-methyl)-5-methyl-phenyl]-4,5-diphenyl-v-triazole (10.4) butanol: 2-[2'-hydroxy-3'-(butoxy-acetamido-methyl)-5'-methyl-phenyl]-4,5-diphenyl-v-triazole (10.5) dodecanol: 2-[2'-hydroxy-3'-dodecyloxy-acet-amidomethyl)-5'-methyl-phenyl]-4,5-diphenyl-v-triazole (10.6) n-octyl mercaptan: 2-[2'-hydroxy-3'-(octylthio-acetamidomethyl)-5'-methyl-phenyl]-4,5-diphenyl-v-triazole (10.7) thiophenol: 2-[2'-hydroxy-3'-(phenylthio-acetamidomethyl)-5'-methyl-phenyl]-4,5-diphenyl-v-triazole (10.8) N-methyl-benzylamine: 2-[2-hydroxy-3-(N-methyl-N-benzylamino-acetamidomethyl)-5-methyl-phenyl]-4,5-diphenyl-v-triazole.

EXAMPLE 11

(11.1) Production of 2 - [2 - hydroxy - 3 - (2' - octyl-mercaptopropionylamidomethyl) - 5' - methyl - phenyl]-4,5-diphenyl-v-triazole 2.4 g. of sodium hydroxide are dissolved in 100 ml. of ethanol. 12.3 g. of 2-(2'-hydroxy - 3' - acrylamidomethyl - 5' - methyl - phenyl) - 4,5 - diphenyl-v-triazole (M.P. 214°, cf. Example 9.5) and 4.5 g. of octane thiol are added to this solution and this mixture is stirred under reflux for 4 hours. The reaction mixture is then acidified while hot with glacial acetic acid and then cooled to 15–20°. The 2-[2-hydroxy - 3 - (2'-octylmercaptopropionylamidomethyl) - 5' - methyl-phenyl]-4,5-diphenyl-v-triazole which crystallises out is filtered off under suction and, after one recrystallisation from ethanol, it melts at 139°.

If instead of octane thiol, the following mercaptans are used in equivalent amounts, then with the same procedure, the following v-triazoles are obtained:

(11.2) cyclohexyl mercaptan: 2-[2-hydroxy-3-(2'-cyclohexylthio-propionylaminomethyl)-5-methyl-phenyl]-4,5-diphenyl-v-triazole (11.3) benzylmercaptan: 2-[2-hydroxy-3-(2'-benzyl-thio-propionylaminomethyl)-5-methyl-phenyl]-4,5-diphenyl-v-triazole (11.4) mercaptoethanol: 2-[2-hydroxy-3-(2'-β-hydroxy-ethylthio-propionylamino-methyl)-5-methyl-phenyl]-4,5-diphenyl-v-triazole (11.5) mercaptoacetic acid: 2-[2-hydroxy-3-(2'-carboxymethylthio-propionylamino-methyl)-5-methyl-phenyl]-4,5-diphenyl-v-triazole (11.6) β-mercaptopropionic acid: 2-[2-hydroxy-3-(2'-carboxyethylthio-propionylamino-methyl)-5-methyl-phenyl]-4,5-diphenyl-v-triazole

EXAMPLE 12

(12.1) Production of 2-(2'-hydroxy-3'-methallyl-phenyl)-4,5-diphenyl-v-triazole 31.3 g. of 2-(2'-hydroxyphenyl) - 4,5 - diphenyl-v-triazole, obtained according to Example 1, are dissolved in 150 ml. of isopropanol and 10 ml. of 10 N sodium hydroxide solution. After the addition of 1 g. of sodium iodide, 13.5 g. of methallyl chloride are added dropwise to the solution obtained, the addition being made within 2 hours under reflux. On completion of the dropwise addition, the whole is stirred for 5 hours under reflux. The reaction mixture is cooled to 15–20°, made alkaline with 5 ml. of 10 N sodium hydroxide solution, diluted with 200 ml. of water and extracted with 300 ml. of toluene. After evaporation of the toluene solution in vacuo, 2 - (2' - methallyloxy - phenyl) - 4,5 - diphenyl-v-triazole remains as a brownish oil. This is heated for 3 hours with 40 ml. of dimethylaniline at 190–195°. After cooling, the reaction mixture is poured onto 300 g. of ice and 100 ml. of concentrated hydrochloric acid, whereupon the reaction product separates out as an oil which soon solidifies into a crystal mass. This is filtered off under suction, washed with water and dried. On recrystallisation from hexane, 2-(2'-hydroxy - 3' - methallyl-phenyl) - 4,5 - diphenyl - v - triazole is obtained, M.P. 88°.

18.4 g. of 2 - (2' - hydroxy - 3' - methallyl-phenyl) - 4,5 - diphenyl-v-triazole are dissolved in 200 ml. of dioxane and, after the addition of 3 g. of Raney nickel, the solution is hydrogenated with hydrogen at 20° under normal pressure. The theoretical amount of hydrogen has been taken up after 18 hours and the hydrogenation then ceases. The catalyst is filtered off from the reaction solution and the solvent is evaporated in vacuo. On crystallising the residue from isopropanol, 2-[2-hydroxy-3-(2'-methyl - propyl) - phenyl] - 4,5 - diphenyl - v - triazole (Example 12.2) is obtained, M.P. 99°.

If instead of methallyl chloride, the following halides are used in equivalent amounts then, with the same procedure, the following v-triazoles are obtained by Claisen rearrangement of the corresponding ethers:

(12.3) allyl chloride: 2-(2'-hydroxy-3'-allyl-phenyl)-4,5-diphenyl-v-triazole (12.4) 3,3-dimethylallyl chloride: 2-[2-hydroxy-3-(1',1'-dimethyl-allyl)-phenyl]-4,5-diphenyl-v-triazole (12.5) cinnamyl bromide: 2-[2-hydroxy-3-(1'-phenyl-allyl)-phenyl]-4,5-diphenyl-v-triazole (12.6) 2-chloroalkyl chloride: 2-[2'-hydroxy-3'-(2''-chloroallyl)-phenyl]-4,5-diphenyl-v-triazole.

On hydrogenating the unsaturated compounds 12.3, 12.4, and 12.5, with hydrogen in the presence of Raney nickel by the process described above, the following v-triazoles are obtained:

(12.7) 2-(2'-hydroxy-3'-propyl-phenyl)-4,5-diphenyl-v-triazole (12.8) 2-[2-hydroxy-3-(1',1'-dimethyl-propyl)-phenyl]-4,5-diphenyl-v-triazole (12.9) 2-[2-hydroxy-3-(1'-phenyl-propyl)-phenyl]-4,5-diphenyl-v-triazole.

EXAMPLE 13

(13.1) Production of 2-(2'-hydroxy-5'-octyl-phenyl)-4,5-diphenyl-v-triazole 31.3 g. of 2-(2'-hydroxy-phenyl)-4,5-diphenyl-v-triazole and 18 g. of caprilic acid chloride are dissolved in 200 ml. of o-dichlorobenzene. At 20°, 40 g. of anhydrous aluminium chloride are added to the solution obtained whereupon the temperature of the reaction mixture rises to 40°. The reaction temperature is slowly raised to 70–75° by heating in a water bath, this temperature is maintained for 4 hours and then it is heated for another 1 at 90–95°. After cooling, the reaction mixture is poured into 300 g. of ice and 50 ml. of concentrated hydrochloric acid and the o-dichlorobenzene is distilled off with steam. On crystallising the residue from hexane, 2-(2'-hydroxy-5'-capryloyl-phenyl) - 4,5-diphenyl-v-triazole is obtained, M.P. 90°.

22 g. of 2 - (2'-hydroxy-5'-capryloyl-phenyl)-4,5-diphenyl-v-triazole are dissolved in a solution of 15 g. of potassium hydroxide in 200 ml. of diethylene glycol. After the addition of 7.5 g. of hydrazine hydrate the reaction mixture is slowly heated while distilling off the water until an inner temperature of 195–200° is attained. It is stirred for 4 hours at this temperature, then cooled and the reaction mixture is poured onto 300 g. of ice and 50 ml. of conc. hydrochloric acid. The reaction product, which separates as a resin, becomes solid after some time. It is filtered off under suction, washed with water, dried, and crystallised from isopropanol. The 2-(2'-hydroxy-5'-octyl-phenyl)-4,5-diphenyl-v-triazole obtained melts at 70°.

If in the above Friedel-Crafts reaction, lauric acid chloride or stearic acid chloride is used instead of caprylic acid chloride and the procedure by way of two steps as described above is followed, then: 13.2. 2-(2'-hydroxy-5'-dodecyl-phenyl)-4,5-diphenyl-v-triazole or 13.3 2-(2'-hydroxy - 5'-octadecyl-phenyl)-4,5-diphenyl-v-triazole is obtained.

EXAMPLE 14

(14.1) Production of 2-(2'-hydroxy-3'-octyl-5'-methylphenyl)-4,5-diphenyl-v-triazole 32.7 g. of 2 - (2' - hydroxy-5'-methyl-phenyl)-4,5-diphenyl-v-triazole and 18 g. of caprylic acid chloride are dissolved in 200 ml. of o-dichlorobenzene. At 20°, 40 g. of anhydrous aluminium chloride are added to the solution obtained whereupon the temperature rises to 40°. The reaction mixture is then stirred for 15 hours at 130–135°, then cooled and poured onto 300 g. of ice and 50 ml. of conc. hydrochloric acid. After distilling off the o-dichlorobenzene with steam, the residue is recrystallised twice from hexane. The 2 - (2'-hydroxy-3'-capryloyl-5'-methyl-phenyl)-4,5-diphenyl-v-triazole so obtained melts at 78°.

9 g. of potassium hydroxide are dissolved in 100 ml. of diethylene glycol. 13.6 g. of 2-(2'-hydroxy-3'-capryloyl-5'-methyl-phenyl)-4,5-diphenyl-v-triazole and 5 ml. of hydrazine hydrate are added to this solution and the mixture is slowly heated while distilling off the water until an inner temperature of 195–200° is attained. The whole is stirred for 4 hours at this temperature, the reaction mixture is cooled and poured onto 200 g. of ice and 30 ml. of conc. hydrochloric acid. The precipitated 2-(2'-hydroxy-3'-octyl-5'-methyl-phenyl)-4,5-diphenyl-v-triazole is filtered off under suction, washed with water and dried. Recrystallised from isopropanol, it melts at 83°.

If in the above Friedel-Crafts reaction, benzoyl chloride or stearic acid chloride are used instead of caprylic acid chloride and the procedure by way of two steps as described above is followed, then (14.2) 2-(2'-hydroxy-3'-benzyl-5'-methyl-phenyl)-4,5-diphenyl-v-triazole, or (14.3) 2-(2'-hydroxy-3'-octadecyl-5'-methyl-phenyl)-4,5-diphenyl-v-triazole is obtained.

EXAMPLE 15

(15.1) Production of 2-(2'-hydroxy-phenyl)-4-methyl-5-phenyl-v-triazole

A solution of 27.6 g. of o-methoxyphenyl hydrazine in 100 ml. of a mixture of equal parts of acetic acid and water is added dropwise to a solution of 32.6 g. of isonitrosopropiophenone (produced from propiophenone according to Org. Synth. vol. II, 363) in 100 ml. of a mixture of equal parts of glacial acetic acid and water, the addition being made within 1 hour. Yellow crystals precipitate and the reaction is complete after stirring the reaction mixture for 5 hours at room temperature. The crystalline precipitate is filtered off under suction, washed with ethanol and recrystallised from ethylene glycol monoehtyl ether. The isonitrosopropiophonone-o-methoxyphenyl hydrazone so obtained melts at 212–214°.

(a) 28.3 g. of isonitrosopropiophenone-o-methoxyphenyl hyrazone are added in portions within 30 minutes to 50 ml. of boiling acetanhydride while stirring. The reaction mixture is then refluxed for 40 minutes. On cooling the reaction solution, 2-(2'-methoxy-phenyl)-4-methyl-5-phenyl-v-triazole crystallises. Recrystallised from methanol and toluene, it melts at 92°.

(b) 28.3 g. of isonitrosopropiophenone-o-methoxyphenyl hydrazone are heated for 10 minutes at 80° in 50 ml. of acetanhydride. On cooling the reaction solution, O-acetyl-isonitrosopropiophenone-o-methoxyphenyl hyrazone crystallises into pale yellow needles. Recrystallised from ligroin the product melts at 141°. 16.3 g. of O-acetyl - isonitrosopropiophenone - o - methoxyphenyl hyrazone in 200 ml. of water are; refluxed for 48 hours with 10.6 g. of sodium carbonate After cooling this reaction mixture, an oil forms on the bottom of the vessel which crystallises from methanol. After recrystallisation from ligroin, this product melts at 92° and is identical with the 2 - (2'-methoxy-phenyl)-4-methyl-5-phenyl-v-triazole produced by the method (a) above.

26.5 g. of 2-(2'-methoxy-phenyl)-4-methyl-5-phenyl-v-triazole in 100 ml. of dry benzene are refluxed for 1 hour with 13.5 g. of pulverised aluminium chloride. The reaction mixture is then cooled and, while cooling, it is decomposed with 100 ml. of 2 N hydrochloric acid and the benzene is removed by steam distillation. The reaction product which remains is filtered off under suction and recrystallised from methanol and from ligroin. The 2-(2'-hydroxy-phenyl) - 4 - methyl - 5 - phenyl - v - triazole so obtained melts at 90°.

When, instead of isonitrosopropiophenone, the following isonitrosophenones are reacted in the same way as described above with o-methoxyphenyl hydrazine and also the ring is closed, then the following v-triazoles are obtained:

from isonitrosovalerophenone: (15.2) 2-(2'-hydroxyphenyl)-4-propyl-5-phenyl-v-triazole;

from isonitrosolaurophenone: (15.3) 2-(2'-hydroxyphenyl)-4-decyl-5-phenyl-v-triazole, M.P. 35–36°;

from 1-phenyl-4-methoxy-1,2-dioxobutane monoxime: (15.4) 2-(2'-hydroxy-phenyl)-4-β-methoxyethyl-5-5-phenyl-v-triazole;

from 1-phenyl-4-methylthio-1,2-dioxobutane monoxime: (15.5) 2-(2'-hydroxy-phenyl)-4-β-methylthioethyl-5-phenyl-vtriazole;

from 1,3-diphenyl-1,2-dioxopropane monoxime: (15.6) 2-(2'-hydroxy-phenyl)-4-benzyl-5-phenyl-v-triazole;

from isonitrosostearophenone: (15.7) 2-(2'-hydroxyphenyl)-4-hexadecyl-5-phenyl-v-triazole;

from 1-phenyl-3-(4'-methoxyphenyl)-1,2-dioxopropane monoxime: (15.8) 2-(2'-hydroxyphenyl)-4-(4'-methoxyphenyl)-methyl-5-phenyl-v-triazole;

from 1-phenyl-3-(4'-octyloxyphenyl)-1,2-dioxopropane monoxime: (15.9) 2-(2'-hydroxyphenyl-4-(4'-octyloxyphenyl)-methyl-5-phenyl-v-triazole;

from 1-(4'-cyanophenyl)-1,2-dioxopropane monoxime: (15.10) 2-(2'-hydroxyphenyl)-4-(4'-cyanophenyl)-5-methyl-v-triazole;

from 1-(4'-N,N-diethyl-sulfamoyl-phenyl)-1,2-dioxopropane monoxime: (15.11) 2-(2'-hydroxyphenyl)-4-(4'-N,N-diethyl-sulfamoyl-phenyl)-5-methyl-v-triazole;

from 1-(4'-N-methyl-N-cyclohexyl-sulfamoyl-phenyl)-1,2-dioxopropanemonoxime: (15.12) 2-(2'-hydroxyphenyl)-4-(4'-N-methyl-N-cyclohexyl-sulfamoylphenyl)-5-methyl-v-triazole;

from 1-(4'-N-methyl-N-benzyl-sulfamoyl-phenyl)-1,2-dioxopropane monoxime: (15.13) 2-(2'-hydroxyphenyl)-4-(4'-N-methyl-N-benzyl-sulfamoyl-phenyl)-5-methyl-v-triazole;

from 1-[4'-N-butyl-N-(β-hydroxyethyl)-sulfamoylphenyl]-1,2-dioxopropane monoxime: (15.14) 2-(2'-hydroxyphenyl)-4-[4'-N-butyl-N-(β-hydroxyethyl)-sulfamoyl-phenyl]-5-methyl-v-triazole;

from 1-(4'-N-γ-methoxypropyl-sulfamoyl-phenyl)-1,2-dioxopropane monoxime: (15.15) 2-(2'-hydroxyphenyl)-4-(4'-N-γ-methoxypropyl-sulfamoyl-phenyl)-5-methyl-v-triazole;

from 1-(4'-N-octadecyl-sulfamoyl-phenyl)-1,2-dioxopropane monoxime: (15.16) 2-(2'-hydroxyphenyl)-4-(4'-N-octadecylsulfamoyl-phenyl)-5-methyl-v-triazole;

from 1-[4'-N,N-di-(β-hydroxy-ethyl)-sulfamoylphenyl]-1,2-dioxopropane monoxime: (15.17) 2-(2'-hydroxyphenyl)-4-[4'-N,N-di-(β-hydroxyethyl)-sulfamoyl-phenyl]-5-methyl-v-triazole.

EXAMPLE 16

(16.1) Production of 2-(2'-hydroxy-5'-methyl-phenyl)-4-methyl-5-phenyl-v-triazole Isonitrosopropiophenone is reacted with the equimolar amount of 2-methoxy-5-methylphenyl hydrazine in the same way as described in Example 15. Isonitrosopropiophenone - 2-methoxy-5-methyl-phenyl hydrazone is thus obtained, M.P. 222°. On splitting water off from this compound by means of acetanhydride similarly to Example 15, 2 - (2' - methoxy - 5'-methyl-phenyl)-4-methyl-5-phenyl-v-triazole is obtained, M.P. 74° and, on demethylating this, 2 - (2' - hydroxy - 5' - methyl-phenyl)-4-methyl - 5 - phenyl-v-triazole is obtained, M.P. 78°.

The following are obtained analogously:

from 2 - methoxy - 5 - phenyl-phenyl hydrazine: (16.2) 2 - (2' - hydroxy-5'-phenyl-phenyl)-4-methyl-5-phenyl-v-triazole from 2-methoxy-5-chlorophenyl hydrazine: (16.3) 2-(2'-hydroxy - 5' - chlorophenyl) - 4 - methyl - 5-phenyl-v-triazole from 2,5 - dimethoxy-phenyl hydrazine: (16.4) 2-(2'-hydroxy - 5' - methoxy-phenyl) - 4 - methyl - 5-phenyl-v-triazole from 2 - methoxy - 5 - cyclohexyl-phenyl hydrazine: 16.5) 2 - (2' - hydroxy - 5' - cyclohexyl-phenyl)-4-methyl-5-phenyl-v-triazole from 2' - methoxy - 5' - benzyl-phenyl hydrazine: (16.6) 2 - (2' - hydroxy - 5' - benzyl-phenyl) - 4 - methyl-5-phenyl-v-triazole from 2 - methoxy - 5 - t-octyl-phenyl hydrazine: (16.7) 2 - (2' - hydroxy - 5'-t-octyl-phenyl)-4-methyl-5-phenyl-v-triazole from 2 - methoxy - 5 - bromo-phenyl hydrazine: (16.8) 2 - (2' - hydroxy - 5' - bromo-phenyl)-4-methyl-5-phenyl-v-triazole.

EXAMPLE 17

Production of 2-(2'-hydroxy-phenyl)-4-phenyl-5-methyl-v-triazole (a) 123 g. of o-anisidine in 400 ml. of water and 250 ml. of concentrated hydrochloric acid are diazotised at 0–5° by the addition of a solution of 69 g. of sodium nitrite in 200 ml. of water. The diazonium chloride solution obtained is added dropwise within 2 hours at 5–10° to a solution of 134 g. of phenyl acetone (benzylmethyl ketone) in 500 ml. of pyridine and the reaction mixture is stirred for 4 hours at 5–10° and for 12 hours at 15–20°. The yellow precipitate of 1 - phenyl-1-(2'-methoxy-phenyl)-hydrazono-acetone is filtered off under suction, washed with water and dried. Recrystallised from methanol, it melts at 125°.

134 g. of the 1 - phenyl-1-(2'-methoxy-phenyl)-hydrazono-acetone so obtained are refluxed in 100 ml. of ethanol. After adding a solution of 40 g. of hydroxylamine hydrochloride and 80 g. of crystallised sodium acetate in 150 ml. of water, the reaction mixture is stirred under reflux for 45 minutes and then cooled to 15–20°. The crystalline precipitate formed of 1-phenyl-1-(2'-methoxy-phenyl)-hydrazono-acetone oxime is filtered off under suction, washed with 200 ml. of methanol and then with 2 litres of water and dried. After recrystallisation from ethylene glycol monomethyl ether, it melts at 212°.

A solution of 50 g. of copper sulphate in 70 ml. of water is added dropwise to a solution of 28.3 g. of 1-phenyl-1-(2'-methoxy-phenyl)-hydrazono-acetone oxime in 100 ml. of pyridine, the addition being made within 1 hour at 90–95°. The reaction mixture is stirred for 1 hour at 90–95°, cooled and poured into 300 ml. of ice water. The precipitate formed is filtered off under suction, washed well with water and dried. 2 - (2'-methoxy-phenyl) - 4 - phenyl - 5 - methyl-v-triazole-1-oxide, M.P. 134°, is obtained by recrystallisation from ligroin. 13.5 g. of aluminium chloride are added in portions to a solution of 14 g. of 2-(2'-methoxy-phenyl)-4-phenyl-5-methyl-v-triazole - 1 - oxide in 100 ml. of toluene. The mixture obtained is then stirred for 1 hour at 90–100°, cooled, poured onto 200 g. of ice and 20 ml. of concentrated aqueous hydrochloric acid and the solvent is distilled off with steam. The 2 - (2' - hydroxy-phenyl)-4-phenyl-5-methyl-v-triazole-1-oxide which remains is filtered off under suction, dried and, after crystallisation from ligroin/chlorobenzene, it melts at 163°.

5.3 g. of 2 - (2' - hydroxy-phenyl - 4 - phenyl-5-methyl-v-triazole - 1 - oxide in 50 ml. of glacial acetic acid are refluxed for 1 hour with 3 g. of zinc dust and 2 ml. of concentrated hydrochloric acid. The reaction mixture is filtered hot and the filtrate is diluted with 100 ml. of water. The white precipitate formed is filtered off under suction, washed with water and dried. On recrystallising from hexane, 2 - (2' - hydroxy-phenyl)-4-phenyl-5-methyl-v-triazole, M.P. 90°, is obtained.

(b) 1 - phenyl - 1 - (2'-methoxy-phenyl)-hydrazono-acetone can be obtained in the following way:

206 g. of 2-phenylacetic acid ethyl ester and a solution of 120 g. of sodium hydroxide in 500 ml. of water are left to stand at room temperature for 24 hours. After acidifying with glacial acetic acid and diluting with 500 ml. of ethanol, the solution described above of o-methoxy-benzene diazonium chloride is added dropwise at 0–5° within 3 hours. The 1 - phenyl - 1 - (2-methoxy-phenyl)-hydrazono-acetone, M.P. 124°, obtained as coupling product precipitates in crystalline form and, after drying, it can be worked up into 2-(2'-hydroxy-phenyl)-4-phenyl-5-methyl-v-triazole.

(c) The 2 - (2' - methoxy-phenyl)-4-phenyl-5-methyl-v-triazole-1-oxide mentioned under (a) can also be obtained in the following way:

28.3 g. of 1-phenyl-1-(2'-methoxy-phenyl)-hydrazono-acetone oxime are dissolved at 90–95° in 400 ml. of glacial acetic acid. A solution of 11.8 g. of potassium dichromate in 150 ml. of water is added to the solution obtained at this temperature within 1 hour. The reaction mixture is then stirred for 15 minutes at 90–95°, cooled and diluted with water. The 2 - (2' - methoxy-phenyl)-4-phenyl-5-methyl-v-triazole-1-oxide which crystallises out is filtered off under suction, washed with water, dried and recrystallised from ligroin.

EXAMPLE 18

(18.1) Production of 2-(2'-hydroxy-phenyl)-4,5-dimethyl-v-triazole

A solution of 69.0 g. of o-methoxy-phenyl hydrazine in 200 ml. of a mixture of equal volumes of glacial acetic acid and water is added to a solution of 50.5 g. of diacetyl monoxime (produced from methylethyl ketone according to Org. Synth. 10, 22) in 1000 ml. of a mixture of equal volumes of glacial acetic acid and water. Even after a short time, crystals begin to separate out of the reaction mixture and the reaction is completed after stirring for 5 hours at room temperature. The crystalline precipitate is filtered off under suction, washed with methanol and the diacetyl-(2-methoxy-phenyl hydrazone)-oxime so obtained melts at 172–173°.

66.3 g. of diacetyl-(2-methoxy-phenyl hydrazone)-oxime in 90 ml. of acetanhydride are refluxed for 7 hours. The acetic acid and excess acetanhydride formed are then evaporated off in vacuo and the oily residue is distilled in vacuo. The main fraction distills at 165–170° under 11 mm. pressure. This distillate crystallises with methanol and, after recrystallising twice from petroleum ether, the 2-(2'-methoxy-phenyl)-4,5-dimethyl-v-triazole so obtained melts at 78°.

20.3 g. of 2-(2'-methoxy-phenyl)-4,5-dimethyl-v-triazole and 13.5 g. of pulverised aluminium chloride in 100 ml. of dry benzene are refluxed for 1 hour. 50 ml. of 2 N hydrochloric acid are added to the cooled reaction mixture, the benzene phase is separated, washed with water, dried over sodium sulphate and evaporated to dryness. 2-(2'-hydroxy-phenyl)-4,5-dimethyl-v-triazole is obtained as residue. After recrystallisation from methanol and from ligroin, it melts at 95°.

If, instead of diacetyl oxime, the following oximes are reacted in the same way as described above with o-methoxyphenyl hydrazine and cyclisation is performed in the same way, the following v-triazoles are obtained:

from 1,2-dicyclohexyl-1,2-dioxoethane monoxime:
(18.2) 2-(2'-hydroxy-phenyl)-4,5-dicyclohexyl-v-triazole
from 5,6-dioxodecane monoxime:
(18.3) 2-(2'-hydroxy-phenyl)-4,5-dibutyl-v-triazole
from 1,6-diphenyl-3,4-dioxohexane monoxime:
(18.4) 2-(2'-hydroxy-phenyl)-4,5-bis (2''-phenylethyl)-v-triazole
from 2,3-dioxo-octane monoxime:
(18.5) 2-(2'-hydroxy-phenyl)-4-methyl-5-pentyl-v-triazole
from 1,6-dimethoxy-3,4-dioxohexane monoxime:
(18.6) 2-(2'-hydroxy-phenyl)-4,5-bis-(2''-methoxyethyl)-v-triazole
from 1,4-diphenyl-2,3-dioxobutane monoxime:
(18.7) 2-(2'-hydroxy-phenyl)-4,5-dibenzyl-v-triazole
from 1-phenyl-2,3-dioxobutane monoxime:
(18.8) 2-(2'-hydroxy-phenyl)-4-methyl-5-benzyl-v-triazole.

EXAMPLE 19

(19.1) Production of 2-(2'-hydroxy-phenyl)-4-carbomethoxy-5-(2''-carbomethoxy-phenyl)-v-triazole 167.5 g. of 2-aminonaphthalene-1-azo-(2'-methoxybenzene) M.P. 137° (obtained by coupling o-methoxybenzene diazonium chloride with β-naphthylamine) are dissolved in a mixture of 1000 ml. of pyridine and 500 ml. of water. 350 ml. of 13.4% chlorine lye are added dropwise to this solution within 3 hours at 0–5°. The reaction mixture is then stirred for 24 hours at 0–5°, then heated to 40° and, within 1 hour, another 400 ml. of chlorine lye are added. On adding 200 g. of solid sodium chloride to the reaction mixture it separates into two phases, one consisting of excess chlorine lye the other containing the reaction product dissolved in pyridine. The latter is separated and the pyridine is removed by steam distillation. The residue which remains is poured into ice water whereupon a dark red crystalline precipitate is obtained. This is filtered off under suction and recrystallised from isopropanol and from glacial acetic acid and the 2-(2'-methoxy-phenyl)-naphtho[1,2-d]-v-triazole so obtained melts at 113°.

55.0 g. of 2-(2'-methoxy-phenyl)-naphtho-[1,2-d]-v-triazole are stirred for 24 hours with 200 g. of quartz sand and a dispersing agent in 200 ml. of water. The quartz sand is removed by filtration, the filtrate is made up with water to 1000 ml. and refluxed for 4 hours with 250 g. of potassium permanganate and 64 g. of solid sodium hydroxide. Pyrolusite formed is then filtered off, the volume of the filtrate is concentrated in vacuo to 100 ml. and it is acidified with concentrated hydrochloric acid. In this way 2 - (2'-methoxy-phenyl)-4-carboxy-5-(2''-carboxyphenyl)-v-triazole is obtained which melts at 255–260° (unclear).

10.2 g. of 2-(2'-methoxy-phenyl)-4-carboxy-5-(2''-carboxy-phenyl)-v-triazole are refluxed for 1 hour with 13.5 g. of aluminium chloride in 100 ml. of benzene. 50 ml. of 5 N hydrochloric acid are added to the cooled reaction mixture, the benzene is removed by steam distillation and the residue is recrystallised from glacial acetic acid. The 2(2'-hydroxy-phenyl)-4-carboxy-5-(2''-carboxy - phenyl)-v-triazole so obtained melts at 249°.

Dry hydrogen chloride is introduced for 30 minutes into a suspension of 4.7 g. of 2-(2'-hydroxy-phenyl)-4-carboxy-5-(2''-carboxy-phenyl)-v-triazole in 50 ml. of dry methanol while cooling. This reaction mixture is left to stand for 48 hours at room temperature whereupon white crystals gradually begin to separate out. These are filtered off under suction and recrystallised from methanol. After a second crystallisation from ligroin, the 2-(2'-hydroxyphenyl)-4-carbomethoxy-5-(2''-carbomethoxy - phenyl)-v-triazole so obtained melts at 123°.

If 2 - (2' - hydroxy-phenyl)-4-carboxy-5-(2''-carboxyphenyl)-v-triazole is esterified with the alcohols given below instead of with methanol, then the following v-triazoles are obtained:

from n-octanol: (19.2) 2-(2'-hydroxy-phenyl)-4-carbo-n-octyloxy-5-(2''-n-octyloxycarbonyl-phenyl)-v-triazole
from stearyl alcohol: (19.3) 2-(2'-hydroxy-phenyl)-4-n-octadecyloxycarbonyl-5-(2''-carbo-n-octadecyloxyphenyl)-v-triazole
from 2-ethoxy-ethanol-1: (19.4) 2-(2'-hydroxy-phenyl)-4-(2-ethoxyethoxy-carbonyl)-5-[2-(2''-ethoxyethoxycarbonyl)-phenyl]-v-triazole
from ethylene glycol: (19.5) 2-(2'-hydroxy-phenyl)-4-[2-hydroxyethoxycarbonyl]-5-[2-(2''-hydroxyethoxy)-carbonyl-phenyl]-v-triazole;
from 1,4-butanediol: (19.6) 2-(2'-hydroxy-phenyl)-4-[4''-hydroxybutoxycarbonyl]-5-[2-carbo-(4''-hydroxybutoxycarbonyl)-phenyl]-v-triazole;
from allyl alcohol: (19.7) 2-(2'-hydroxy-phenyl-4-allyloxycarbonyl-5-(2''-allyloxycarbonyl-phenyl)-v-triazole.

EXAMPLE 20

From 2-(2'-methoxy-4'-chlorophenyl)-naphtho-[1,2-d]-v-triazole, which is obtained in an analogous way to Example 19, the following are obtained by the same scheme of reactions as are given in Example 19:

(20.1) 2-(2'-hydroxy-4'-chlorophenyl)-4-methoxycarbonyl-5-(2''-methoxycarbonyl-phenyl)-v-triazole
from 2-(2'-methoxy-5'-phenyl-phenyl)-naphtho-[1,2-d]-v-triazole;
(20.2) 2-(2'-hydroxy-5'-phenyl-phenyl)-4-methoxycarbonyl-5-(2''-methoxycarbonyl-phenyl)-v-triazole
from 2-(2'-methoxy-5'-methyl-phenyl)-naphtho-[1,2-d]-v-triazole
(20.3) 2-(2'-hydroxy-5'-methoxycarbonyl-phenyl)-4-methoxycarbonyl-5-(2''-methoxycarbonyl-phenyl)-v-triazole.

EXAMPLE 21

(21.1) Production of 2-(2'-hydroxy-phenyl)-4-methyl-5-carbethoxy-v-triazole 20.0 g. of 2-(2'-methoxy-phenyl)-4,5-dimethyl-v-triazole, produced according to Example 18, and 60.0 g. of potassium permanganate and 20.0 g. of sodium hydroxide in 1000 ml. of water are refluxed for 12 hours. To decompose excess potassium permanganate in the reaction mixture, 200 ml. of ethanol are slowly added and the whole is refluxed until the violet colour of the permanganate has disappeared. Precipitated pyrolusite is filtered off and the volume of the filtrate is concentrated in vacuo to 100 ml. This solution is acidified with concentrated hydrochloric acid, the precipitate formed is filtered off under suction, washed with a little water and dried. The mixture obtained of 2-(2'-methoxy-phenyl)-4-methyl-5-carboxy-v-triazole and 2-(2'-methoxy-phenyl)-4,5-dicarboxy-v-triazole is dissolved in a solution of 20 g. of sodium carbonate in 100 ml. of water, this solution is then filtered and the filtrate is evaporated to dryness. The residue is boiled down eight times with 150 ml. of alcohol each time, the alcoholic extracts are filtered and the filtrate is evaporated to dryness. The alcohol insoluble part is dissolved in 50 ml. of water and acidified with concentrated hydrochloric acid. The white precipitate formed is 2-(2'-methoxy-phenyl) - 4,5 - dicarboxy-v-triazole which after recrystallisation from water, melts at 228–230°. After acidifying the alcohol soluble part, white flakes are obtained which are filtered off and recrystallised from water. The 2-(2'-methoxy-phenyl)-4-methyl-5-carboxy-v-triazole so obtained melts at 140°.

4.7 g. of 2-(2'-methoxy-phenyl)-4-methyl-5-carboxy-v-triazole and 5.3 g. of aluminium chloride in 100 ml. of dry benzene are refluxed for 1 hour. 50 ml. of 5 N hydrochloric acid are added to the cooled reaction mixture and the benzene is removed by steam distillation. As residue, a white precipitate is obtained which is filtered off and recrystallised from water. The 2-(2'-hydroxy-phenyl)-4-methyl-5-carboxy-v-triazole obtained melts at 216–220° (with decomposition).

Dry hydrogen chloride is introduced for 30 minutes into a solution of 4.4 g. of 2-(2'-hydroxy-phenyl)-4-methyl-5-carboxy-v-triazole in 50 ml. of abs. ethanol while stirring and cooling. After standing for 48 hours at room temperature, white crystals are precipitated from the reaction mixture with 50 ml. of water. One recrystallisation from ethanol yields 2-(2'-hydroxy-phenyl)-4-methyl-5-carboethoxy-v-triazole which melts at 62°.

2-(2'- hydroxy-phenyl)-4-carboethoxy-5-phenyl-v-triazole (Example 21.2) is obtained in an analogous way by oxidising 2 - (2' - methoxy-phenyl)-4-methyl-5-phenyl-v-triazole, produced according to Example 15, then splitting the methoxy group and afterwards esterifying with ethanol.

EXAMPLE 22

Production of 2-(2'-hydroxy-phenyl)-4,5-dicarbomethoxy-v-triazole 2-(2'-methoxy-phenyl)-4,5-dicarboxy - v - triazole, obtained according to Example 21, is demethylated and esterified with methanol as described in Example 21. In this way, 2-(2' - hydroxy-phenyl)-4,5-dicarbomethoxy-v-triazole is obtained which, after recrystallisation from methanol and from ligroin, melts at 103–104°.

EXAMPLE 23

Production of 2-(2'-hydroxy-5'-sulphophenyl)-4,5-diphenyl-v-triazole 189 g. of 2-aminophenol-4-sulphonic acid are dissolved in 1000 ml. of water and 100 ml. of 10 N sodium hydroxide solution. After addition of 69 g. of sodium nitrite, the whole is cooled to 5° and 350 ml. of concentrated hydrochloric acid are added all at once. After 10 minutes, the diazonium chloride slowly crystallises out. It is left to diazotise out for 30 minutes and then the diazonium salt suspension obtained is poured within 1 hour into a solution of 196 g. of desoxybenzoin in 500 ml. of pyridine. The reaction mixture is stirred for 24 hours at room temperature, made alkaline with 300 ml. of 10 N sodium hydroxide solution and the pyridine is removed by steam distillation. The alkaline solution which remains after this distillation is made acid to congo paper while it is still hot with concentrated hydrochloric acid and then cooled. The benzil - 2 - hydroxyphenyl - hydrazone-5-sulphonic acid which crystallises out is filtered off under suction, washed with 1000 ml. of 2 N hydrochloric acid and dried.

198 g. of benzil-2-hydroxyphenyl-hydrazone-5-sulphonic acid are dissolved at 95–100° in 300 ml. of water and 150 ml. of 10 N sodium hydroxide solution. After adding a solution of 75 g. of hydroxylamine hydrochloride in 100 ml. of water, the reaction mixture is stirred under reflux for 8 hours. At the end of this time, another 100 ml. of 10 N sodium hydroxide solution and 75 g. of hydroxylamine hydrochloride are added to the reaction solution which is then stirred under reflux for 12 hours. The reaction mixture is then cooled, made acid to congo paper with concentrated hydrochloric acid and the benziloxime-2-hydroxyphenyl-hydrazone-5-sulphonic acid which crystallises out is filtered off under suction, washed with 1000 ml. of 2 N hydrochloric acid and dried.

123 g. of the benziloxime-2-hydroxy-phenyl-hydrazone-5-sulphonic acid are dissolved at 80–85° in 500 ml. of water and 200 ml. of concentrated ammonia solution. A solution of 150 g. of copper sulphate in 200 ml. of water is added dropwise within 1 hour to the solution obtained at the same temperature. On completion of the dropwise addition, 50 ml. of concentrated ammonia solution are added and the whole is stirred for another hour at 80–85°. The reaction solution is then cooled to 0–5° and made acid to congo paper by the dropwise addition of concentrated hydrochloric acid. The 2-(2'-hydroxy-5'-sulphophenyl)-4,5-diphenyl-v-triazole-1-oxide which crystallises out is filtered off under suction and washed with 1 litre of 2 N hydrochloric acid and dried.

82 g. of 2-(2'-hydroxy-5'-sulphophenyl)-4,5-diphenyl-v-triazole-1-oxide in 200 ml. of 10 N sodium hydroxide solution and 200 ml. of water are stirred for 2 hours at 90–95° with 20 g. of zinc dust. The reaction mixture is filtered hot, the filtrate is cooled to 0–5° and made acid to congo paper with concentrated hydrochloric acid. The 2 - (2' - hydroxy-5'-sulphophenyl)-4,5-diphenyl-v-triazole which crystallises out is filtered off under suction, washed with 500 ml. of 2 N hydrochloric acid and dried. The dicyclohexylamine salt thereof melts at 238° and then at 256°.

EXAMPLE 24

Production of 2-(2'-hydroxy-phenyl)-4-methyl-5-(3''-nitrophenyl)-v-triazole

A solution of 20.8 g. of m-nitro-isonitrosopropiophenone and 13.8 g. of o-methoxy-phenyl hydrazine in 200 ml. of ethanol is acidified with 50 ml. of a mixture of equal volumes of glacial acetic acid and water and stirred for 8 hours at 50–60°. A crystalline precipitate gradually separates out of the reaction mixture which, on completion of the reaction, is filtered off and washed with methanol. The 1-(3'-nitrophenyl)-1-[(2-methoxyphenyl)-hydrazono]-propan-one-2-oxime so obtained melts at 220–225° with decomposition.

16.4 g. of 1-(3'-nitrophenyl)-1-[(2-methoxy - phenyl)-hydrazono]-propan-one-2-oxime and 30 ml. of acetanhydride are refluxed while stirring for 10 minutes. On cooling the reaction mixture a crystalline precipitate is obtained which is filtered off under suction and recrystallised from toluene. In this way, 2-(2'-methoxy-phenyl)-4-methyl-5-(3''-nitrophenyl)-v-triazole is obtained which melts at 138°.

9.3 g. of 2-(2'-methoxy-phenyl)-4-methyl-5-(3''-nitrophenyl)-v-triazole are refluxed for 3 hours in a mixture of 50 ml. of glacial acetic acid and 50 ml. of 50% hydrobromic acid. On cooling the reaction mixture, a crystalline precipitate is obtained. This is filtered off under suction and recrystallised from isopropanol and from ligroin. The 2 - (2' - hydroxy-phenyl) - 4-methyl-5-(3''-nitrophenyl)-v-triazole so obtained melts at 142–143°.

EXAMPLE 25

(25.1) Production of 2,2'-bis-(2''-hydroxy-phenyl)-[4,4'-bi-v-triazole]-5,5'-dicarboxylic acid (a) 5 g. of 2,3,4,5-hexane-tetrone-3,4-dioxime and 8 g. of 2-methoxy-phenyl hydrazine are dissolved in 50 ml. of ethanol. 4 g. of 50% acetic acid are added, the mixture is heated for 3 hours at 50° and then left to stand for 10 hours at room temperature. The solvent is removed under water jet vacuum and n-butanol is poured over the residue whereupon 2,5-bis - [2 - methoxy - phenyl - hydrazono]-3,4-hexane dione dioxime precipitates in the form of yellowish crystals which, after filtering off under suction and washing with a little cold n-butanol, melt at 155–157°.

7 g. of 2,5 - bis - [2-methoxy-phenyl-hydrazono]-3,4-hexanedione-dioxime are dissolved in 100 ml. of pyridine and the solution is refluxed. A concentrated aqueous solution of 20 g. of copper sulphate pentahydrate is added dropwise to the boiling solution while stirring, the mixture is kept another hour under reflux and is then cooled to room temperature. The 2,2'-bis-(2''-methoxy-phenyl)-5,5' - dimethyl - [4,4'-bi-v-triazole]-3,3'-dioxide formed is precipitated by the addition of 800 ml. of water. It is filtered off under suction and recrystallised from ethanol whereupon it melts at 238°.

4 g. of 2,2'-bis-(2''-methoxy-phenyl)-5,5'-dimethyl-[4,4'-bi-v-triazole]-3,3'-dioxide are dissolved in 50 ml. of hot glacial acetic acid and, after the addition of 10 g.

of zinc dust, the whole is refluxed for 15 minutes. Excess zinc is filtered off and the filtrate is cooled. The 2,2'-bis-(2''-methoxy-phenyl) - 5,5' - dimethyl-4,4'-bi-v-triazole precipitates as white crystals which are filtered off under suction, washed with water, dried and recrystallised from glacial acetic acid, whereupon the substance melts at 160–162°.

23 g. of sodium hydroxide are dissolved in 3500 ml. of water. 100 g. of potassium permanganate and 27 g. of 2,2'-bis-(2''-methoxy-phenyl)-5,5'-dimethyl - 4,4' - bi-v-triazole are added to the solution and the whole is refluxed for 50 hours. The manganese dioxide formed is filtered off while still hot, the filter cake is washed with 1000 ml. of hot water, the combined filtrates are cooled and acidified while cooling with concentrated hydrochloric acid. The 2,2'-bis-2''-methoxy-phenyl)-[4,4' - bi - v - triazole]-5,5'-dicarboxylic acid precipitates as a white solid body which melts at >300°. This is filtered off under suction and dried.

19 g. of 2,2'-bis-(2''-methoxy-phenyl) - [4,4' - bi-v-triazole]-5,5'-dicarboxylic acid are suspended in 150 ml. of benzene and 24 g. of finely pulverised aluminium chloride are added in portions while cooling with ice. The mixture is then refluxed for 6 hours and then poured into a mixture of hydrochloric acid and ice water. The white precipitate of 2,2'-bis-(2''-hydroxyphenyl)-[4,4'-bi-v-triazole] - 5,5'-dicarboxylic acid is filtered off under suction, washed with water and dried. After recrystallisation from glacial acetic acid, the acid melts at 263–264°.

(b) 4 g. of 2,2'-bis-(2''-hydroxy-phenyl)-[4,4'-bi-v-triazole]-5,5'-dicarboxylic acid are suspended in 100 ml. of methanol. A stream of dry HCl gas is introduced into the suspension for half an hour and then the whole is stirred for 30 hours at room temperature. The product is filtered off under suction, washed with methanol and dried. In this way, white crystals of 2,2'-bis-(2''-hydroxy-phenyl)-[4,4'-bi-v-triazole]-5,5'-dicarboxylic acid dimethyl ether (compound 25.2) are obtained. These are recrystallised from ligroin, then from ethylene glycol monomethyl ether and then from methylethyl ketone whereupon the substance then melts at 230°.

(c) 2.3 g. of 2,2'-bis-(2''-hydroxy-phenyl) - [4,4'-bi-v-triazole]-5,5'-dicarboxylic acid and 3 g. of n-octanol are dissolved or suspended in 100 ml. of xylene, 0.1 g. of p-toluene sulphonic acid are added and the whole is refluxed for 12 hours, the water formed being removed in a water separator. The solvent is removed under water jet vacuum and 10 ml. of methanol are poured over the residue which is then stirred and filtered off under suction. The residue is taken up in hexane, undissolved parts are filtered off from the hexane solution and the filtrate is evaporated to dryness. The 2,2' - bis-(2''-hydroxy-phenyl)-[4,4'-bi-v-triazole]-5,5'-dicarboxylic acid dioctyl ester so obtained (compound 25.3) is recrystallised from methanol and melts at 60°.

(d) If 2,2'-bis-(2''-methoxy-phenyl) - 5,5' - dimethyl-[4,4'-bi-v-triazole] demethylated direct according to paragraph (a), then 2,2'-bis-(2''-hydroxy-phenyl)-5,5'-dimethyl-4,4'-bi-v-triazole (compound 25.4) is obtained. On using 1,4-diphenyl-1,2,3,4-butane-tetrone - 2,3 - dioxime as starting material, 2,2' - bis-(2''-hydroxy-phenyl)-5,5'-diphenyl-[4,4'-bi-v-triazole] (compound 25.5) is obtained analogously.

EXAMPLE 26

(26.1) Production of 2-(2'-hydroxyphenyl(-4-phenyl-5-(4''-benzoylamino-phenyl)-v-triazole 102.0 g. of 4-nitrobenzil are suspended in 500 ml. of ethanol and a solution of 27.8 g. of hydroxylamine hydrochloride in 40 ml. of water is added. While cooling with ice, a solution of 47.8 g. of sodium hydroxide in 120 ml. of water is slowly added to this reaction mixture. After 5 hours the reaction is complete; the reaction mixture is filtered and the filtrate is acidified with 50% acetic acid whereupon the 4-nitrobenzil monoxime precipitates in crystalline form. The compound melts at 132–133°. A solution of 41.3 g. of 4-nitrobenzil monoxime and 21.1 g. of o-methoxyphenyl hydrazine in 100 ml. of ethanol is acidified with 40 ml. of a mixture of equal volumes of glacial acetic acid and water and the whole is stirred for 6 hours at 50°. The 4-nitrobenzil-(2-methoxy-phenyl hydrazone)-oxime precipitates in crystalline form. This compound melts at over 260°. 42.0 g. of 4-nitrobenzil-(2-methoxy-phenyl hydrazone)-oxime in 50 ml. of acetic acid anhydride are refluxed for 10 minutes. The reaction mixture is then evaporated to dryness and the residue is refluxed for 4 hours in 200 ml. of glacial acetic acid and 150 ml. of 50% hydrobromic acid. On cooling the reaction mixture, 2-(2'-hydroxyphenyl)-4-phenyl-5-(4''-nitrophenyl)-v-triazole crystallises which, after recrystallisation from glacial acetic acid and ligroin, melts at 194°.

18.0 g. of 2-(2'-hydroxyphenyl))-4-phenyl-5-(4''-nitrophenyl)-v-triazole are dissolved in 250 ml. of methyl Cellosolve at 90°. 1.0 g. of Raney nickel are suspended in this solution and 10.0 g. of hyrazine hydrate are added dropwise within 1 hour. The reaction mixture is kept for another hour at 90–100° and then filtered. On diluting the filtrate with 400 ml. of water, while crystals are obtained which are filtered off under suction, washed with water and recrystallised from alcohol. The 2-(2'-hydroxyphenyl)-4-phenyl-5-(4''-aminophenyl)-v-triazole so obtained melts at 151°.

1.4 g. of benzoyl chloride are added dropwise to a solution of 3.3 g. of 2-(2'-hydroxyphenyl)-4-phenyl-5-(4''-aminophenyl)-v-triazole in 30 ml. of pyridine, while cooling. After a reaction time of 30 minutes, the reaction mixture is diluted with 50 ml. of water and the crystalline precipitate formed is isolated and recrystallised from methyl cellosolve and from toluene. The 2-(2'-hydroxyphenyl)-4-phenyl - 5 - (4''-benzoylaminophenyl)-v-triazole so obtained melts at 200°.

If the acylation described above of 2-(2'-hydroxy-phenyl)-4-phenyl-5-(4''-aminophenyl)-v-triazole is performed with the following acid chlorides which are used in amounts equivalent to the benzoyl chloride then, with the same procedure, the following v-triazoles are obtained:

acetyl chloride: (26.2) 2-(2'-hydroxyphenyl)-4-phenyl-5-(4''-acetylamino-phenyl)-v-triazole, M.P. 201°.

lauroyl chloride: (26.3) 2-(2'-hydroxyphenyl)-4-phenyl-5-(4''-lauroylamino-phenyl)-v-triazole, M.P. 146°.

o-chlorobenzoyl chloride: (26.4) 2-(2'-hydroxyphenyl)-4-phenyl-5-(4''-o-chlorobenzoylaminophenyl)-v-triazole, M.P. 191°.

o-methoxybenzoyl chloride: (26.5) 2-(2'-hydroxyphenyl)-4-phenyl-5-(4''-o-methoxybenzoylaminophenyl)-v-triazole, M.P. 179°.

benzene sulphochloride: (26.6) 2-(2'-hydroxyphenyl)-4-phenyl-5-(4''-benzene-sulphonamidophenyl)-v-triazole, M.P. 179°.

chlorocarbonic acid ethyl ester: (26.7) 2-(2'-hydroxyphenyl)-4-phenyl-5-(4''-ethoxycarboxamidophenyl)-v-triazole, M.P. 146°.

cyclohexane-carboxylic acid chloride: (26.8) 2-(2'-hydroxyphenyl)-4-phenyl-5-(4''-cyclohexylcarboxamidophenyl)-v-triazole, M.P. 200–201°.

methane sulphochloride: (26.9) 2-(2'-hydroxyphenyl)-4-phenyl-5-(4''-methane-sulphonamidophenyl)-v-triazole, M.P. 185°.

EXAMPLE 27

Production of 2-(2'-hydroxy-5'-chlorophenyl)-4-methyl-5-pyridyl-(2'')-v-triazole 43.8 g. of p-chloranisidine in 100 ml. of water and 65 ml. of concentrated hydrochloric acid are diazotised at 0–5° by the addition of a solution of 19.2 g. of sodium nitrite in 60 ml. of water. The diazonium chloride solution so obtained is added dropwise within 4 hours at 0–5° to a solution of 37.5 g. of pyridyl-2-acetone in 120 ml. of pyridine. The precipitate formed is filtered off under suction, washed with water and ethanol and then refluxed for 10 hours in 400 ml. of ethanol and 100 ml. of water with 37.8 g. of hydroxylamine hydrochloride and 74.4 g. of sodium acetate. It is then cooled and the 1-(2'-pyridyl)-2-(2''-methoxy-5'''-chlorophenyl hydrazono) - propane-1-one oxime formed is filtered off under suction, washed with water and alcohol and dried. It melts at 198–200°.

A solution of 109.0 g. of copper sulphate pentahydrate in 200 ml. of water is added dropwise at 80–90° to a solution of 69.3 g. of 1-(2'-pyridyl)-2-(2''-methoxy-5''-chlorophenyl hydrazono)-propane-1-one oxime in 250 ml. of pyridine. The reaction mixture is refluxed for 2 hours, then cooled and poured into 500 ml. of ice water. The precipitate formed is filtered off under suction, washed with water and methanol and dried. The 2-(2'-methoxy-5'-chlorophenyl)-4-methyl-5-pyridyl-(2'') - v - triazole-3-oxide so obtained melts at 125°. On reducing this with zinc dust in glacial acetic acid analogously to the method described in Example 17, 2-(2'-methoxy-5'-chlorophenyl)-4-methyl-5-pyridyl-(2'')-v-triazole is obtained, M.P. 105°. 2-(2'-hydroxy-5'-chlorophenyl) - 4 - methyl-5-pyridyl-(2'')-v-triazole is obtained by ether cleavage with hydrobromic acid in glacial acetic acid. It melts at 142°.

EXAMPLE 28

(28.1) Production of 2-(2'-hydroxy-5'-chlorophenyl)-4-methyl-5-thienyl-(2'')-v-triazole A solution of 33.8 g. of isonitroso-2-propiothiophenes and 34.5 g. of 2-methoxy-5-chlorophenyl hydrazine in 100 ml. of ethanol is acidified with 30 ml. of a mixture of equal volumes of glacial acetic acid and water and the whole is stirred for 6 hours at 50–60°. The reaction mixture is then cooled, the precipitate formed is filtered off under suction, washed with methanol and dried. The isonitroso-2-propiothiophene - (2'-methoxy-5'-chlorophenyl hydrazone) formed melts at 220–224° with decomposition.

32.4 g. of isonitroso-2-propiothiophene-(2'-methoxy-5'-chlorophenyl hydrazone) are dissolved in 100 ml. of boiling pyridine. A solution of 30.0 g. of copper sulphate pentahydrate in 50 ml. of water is slowly added dropwise to this solution and then the reaction mixture is refluxed for 2 hours. It is then poured onto ice and the precipitate formed is filtered off under suction, and washed with water and methanol. The 2-(2'-methoxy-5'-chlorophenyl)-4-methyl-5-thienyl-(2'')-v-triazole-3-oxide so obtained melts at 160–165°.

10.0 g. of 2-(2'-methoxy - 5' - chlorophenyl)-4-methyl-5-thienyl-(2'')-v-triazole-3-oxide and 10.0 g. of zinc dust in 100 ml. of glacial acetic acid are refluxed for 4 hours. At the end of this time, the reaction mixture is filtered while hot, the filtrate is diluted with 200 ml. of water and then extracted with toluene. The toluene phase is separated, dried over sodium sulphate and evaporated to dryness. The residue is taken up in 100 ml. of dry benzene and this benzene solution is refluxed for 1 hour with 4.7 g. of aluminium chloride, 100 ml. of water are then added to the reaction mixture while cooling and the benzene phase is isolated, dried over sodium sulphate and evaporated to dryness. The residue is recrystallised from ethanol and from ligroin. The 2-(2'-hydroxy-5'-chlorophenyl)-4-methyl-5-thienyl-(2'')-v-triazole so obtained melts at 94°.

(28.2) 2-(2'-hydroxy - 5' - chlorophenyl) - 4 - methyl-5-furyl-(2'')-v-triazole, M.P. 100°, is obtained by using isonitroso-2-propiofurane in the procedure described above.

EXAMPLE 29

(29.1) Production of 2-(2'-hydroxyphenyl)-4-acetamino-v-triazole 123 g. of o-anisidine are diazotised as described in Example 1 and the diazonium chloride solution obtained is added dropwise to a solution of 114.5 g. of methazonic acid (nitroacetaldehyde oxime) in 1 litre of water at 0–5°. The pH of the solution is maintained at 4–5 by the addition of sodium acetate. After stirring for 2 hours at 5–10°, the azo dyestuff which has precipitated is filtered off under suction, washed with water and, while still moist, dissolved in 800 ml. of pyridine, 300 ml. of acetanhydride are poured into this solution at 25–30°, the whole is then diluted with 400 ml. of water and, after stirring for 1 hour at room temperature, the precipitate formed is filtered off. After one crystallisation from ethanol, the 2-(2'-methoxyphenyl)-4-nitro-v-triazole obtained melts at 76°. On demethylating with hydrobromic acid and glacial acetic acid as described in Example 1, 2-(2'-hydroxyphenyl)-4-nitro-v-triazole is obtained from this compound. Recrystallised from ligroin, it melts at 146°.

103 g. of 2-(2'-hydroxyphenyl)-4-nitro-v-triazole are dissolved in 500 ml. of ethylene glycol monomethyl ether at 120°. After adding 1 g. of Raney nickel, 75 g. of hydrazine hydrate are added dropwise within 4 hours, the whole is stirred under reflux for 1 hour and then the catalyst is filtered off and the solution evaporated in vacuo. After crystallisation of the residue from ligroin, 2 - (2' - hydroxyphenyl) - 4 - amino - v - triazole is obtained which melts at 94°. On acetylating 2-(2'-hydroxyphenyl)-4-amino-v-triazole in glacial acetic acid with acetanhydride, 2 - (2' - hydroxyphenyl) - 4 - acetamino-v-triazole is obtained, M.P. 182°.

If the 2 - (2' - hydroxyphenyl) - 4 - amino - v - triazole is acylated with the following acid chlorides, then the following v-triazoles are obtained:

lauric acid chloride: (29.2) 2-(2'-hydroxyphenyl)-4-laurylamino-v-triazole benzoyl chloride: (29.3) 2-(2'-hydroxyphenyl)-4-benzoylamino-v-triazole p-toluene sulphochloride: (29.4) 2-(2'-hydroxyphenyl)-4-(p-methylbenzene-sulphonamido)-v-triazole methane sulphochloride: (29.5) 2-(2-hydroxyphenyl)-4-(methane-sulphonamido)-v-triazole chlorocarbonic acid methyl ester: (29.6) 2-(2'-hydroxyphenyl)-4-methoxycarboxamido-v-triazole chlorocarbonic acid octyl ester: (29.7) 2-(2'-hydroxyphenyl)-5-octyloxycarboxamido-v-triazole benzene sulphochloride: (29.8) 2-(2'-hydroxyphenyl)-4-benzenesulphonamido-v-triazole.

EXAMPLE 30

(30.1) Production of 2-(2'-hydroxyphenyl)-4-phenylsulphonyl-5-methyl-v-triazole 61.5 g. of o-anisidine are diazotised as described in Example 1 and the diazonium chloride solution is added dropwise at 5–10° to a solution of 99.1 g. of phenylsulphonyl acetone (obtained from the sodium salt of benzene sulphinic acid and chloracetone) in 1.5 litres of ethanol. The pH of the solution is kept at 4–5 by the addition of sodium acetate. After stirring for 5 hours at 5–10°, the precipitated 1-phenylsulphonyl-1-(2-methoxyphenyl)-hydrazono-propanone, M.P. 160°, is filtered off under suction, washed with water and methanol and dried.

1 - phenylsulphonyl - 1 - (2 - methoxyphenyl) - hydrazono-propanone oxime, M.P. 157°, is obtained therefrom as described in Example 1, with hydroxylamine. 34.7 g. of this oxime are heated with 30 ml. of acetanhydride for 1 hour at 130–135° whereupon the excess anhydride and the acetic acid formed are completely distilled off in vacuo. 50 ml. of o-dichlorobenzene are added to the residue and the whole is heated for 4 hours at 170–180°. The solvent and the acetic acid split off are completely distilled off in vacuo, the residue is stirred with 40 ml. of methanol and the 2-(2'-methoxyphenyl)-4-phenylsulphonyl-5-methyl-v-triazole which crystallises out is filtered off under suction and washed with a slight amount of methanol. Recrystallised from ligroin, it melts at 102°.

2 - (2' - hydroxyphenyl) - 4 - phenylsulphonyl - 5-methyl-v-triazole is obtained from this compound by demethylating with hydrobromic acid and glacial acetic acid as described in Example 1. After one recrystallisation from ligroin, it melts at 102°.

If instead of phenylsulphonyl acetone, an equimolar amount of methylsulphonyl acetone or 1 - methylsulphonyl 1,2 - phenyl - 2 - ethanone or 1 - phenylsulphonyl-2-phenyl-ethanone is used with the procedure described above, then the following v-triazoles are obtained:

(30.2) 2-(2'-hydroxyphenyl)-4-methylsulphonyl-5-methyl-v-triazole, M.P. 114°.

(30.3) 2-(2'-hydroxyphenyl)-4-methylsulphonyl-5-phenyl-v-triazole, M.P. 101°.

(30.4) 2-(2'-hydroxyphenyl)-4-phenylsulphonyl-5-phenyl-v-triazole, M.P. 123°.

EXAMPLE 31

(31.1) Production of 2-(2'-hydroxyphenyl)-v-triazole

A solution of 38 g. of 2-(2'-methoxyphenyl)-4-amino-v-triazole (M.P. 54°, produced by Béchamp reduction of the 2 - (2' - methoxyphenyl) - 4 - nitro - v - triazole mentioned in Example 29) in 150 ml. of glacial acetic acid is added dropwise at −5° to 0° to a solution of nitrosyl sulphuric acid (produced from 15.4 g. of sodium nitrite and 200 ml. of concentrated sulphuric acid). The reaction mixture is stirred for 12 hours at 0° and then poured onto 400 g. of ice. A concentrated aqueous solution of 200 g. of sodium hypophosphite is added to the diazonium sulphate solution obtained, while cooling. When the strong nitrogen development has ceased, the whole is stirred for 3 hours while cooling with ice whereby the reaction product which first separates in oily form gradually becomes solid. The 2 - (2' - methoxyphenyl) - v-triazole obtained is purified by distillation, B.P.$_{11}$ 144°. 2-(2'-hydroxyphenyl)-v-triazole, M.P. 50–51°, is obtained therefrom by demethylation with hydrobromic acid in glacial acetic acid.

If instead of 2-(2-methoxyphenyl)-4-amino-v-triazole, 2 - (2' - methoxy - 5' - chlorophenyl) - 4 - amino - v-triazole (M.P. 118°) is used with otherwise the same procedure, then 2-(2'-hydroxy-5'-chloropehenyl)-v-triazole is obtained, M.P. 104° (compound No. 31.2).

EXAMPLE 32

Production of 2-(2'-hydroxyphenyl)-4-methyl-v-triazole 4.7 g. of 2-(2'-methoxyphenyl)-4-methyl-5-carboxy-v-trizaole (produced according to Example 21) and 1 g. of copper chromite in 40 ml. of quinoline are heated for 15 minutes at 180°. After cooling, the catalyst is filtered off, the filtrate is poured into 200 ml. of ice water and acidified with hydrochloric acid. The 2-(2'-methoxyphenyl)-4-methyl-v-triazole which precipitates is taken up in benzene, the benzene solution is evaporated and the liquid residue is refluxed for 5 hours with 50 ml. of glacial acetic acid and 50 ml. of hydrobromic acid (48%). The reaction mixture is diluted with 200 ml. of water and extracted with benzene. After evaporating the benzene solution, the oily residue is purified by distillation. In this way, 2-(2'-hydroxyphenyl)-4-methyl-v-triazole, M.P. 52°, is obtained.

EXAMPLES 33.1 TO 33.25

Tht following UV absorbers are produced by following the procedure of the examples as shown in the last column of the following table, from the correspondingly substituted starting materials.

| Compound | UV absorber | Melting point, degree | Produced analogously to Example |
|---|---|---|---|
| 33.1 | 2-(2'-hydroxyphenyl)-4-(4''-methoxyphenyl)-5-methyl-v-triazole. | 85–86 | 16 |
| 33.2 | 2-(2'-hydroxyphenyl)-4-(4''-hydroxyphenyl)-5-methyl-v-triazole. | 162 | 16,4 |
| 33.3 | 2-(2'-hydroxy-3',5'-di-tert.butylphenyl)-4,5-diphenyl-v-triazole. | 197 | 1 |
| 33.4 | 2-(2'-hydroxy-4'-methoxyphenyl)-4-phenyl-5-methyl-v-triazole. | 77 | 17 |
| 33.5 | 2-(2'-hydroxy-4'-ethoxyphenyl)-4-phenyl-5-methyl-v-triazole. | 92 | 17 |
| 33.6 | 2-(2',4'-dihydroxyphenyl)-4-phenyl-5-methyl-v-triazole. | 152 | 17 |
| 33.7 | 2-(2'-hydroxy-5'-methoxyphenyl)-4,5-bis-(4''-chlorophenyl)-v-triazole. | 165 | 5 |
| 33.8 | 2-(2'-hydroxy-5'-tert.butylphenyl)-4,5-bis-(4''-chlorophenyl)-v-triazole. | 190 | 5 |
| 33.9 | 2-(2'-hydroxy-5'-phenylphenyl)-4,5-bis-(4''-chlorophenyl)-v-triazole. | 210 | 5 |
| 33.10 | 2-(2'-hydroxy-5'-chlorophenyl)-4,5-bis-(4''-methylphenyl)-v-triazole. | 134 | 6 |
| 33.11 | 2-(2'-hydroxy-5'-methylphenyl)-4-benzyl-5-methyl-v-triazole. | 69 | 17 |
| 33.12 | 2-(2'-hydroxyphenyl)-4-(4''-methylphenyl)-5-methyl-v-triazole. | 97 | 17 |
| 33.13 | 2-(2'-hydroxyphenyl)-4-(4''-acetaminophenyl)-5-methyl-v-triazole. | 202–205 | 26 |
| 33.14 | 2-(2'-hydroxyphenyl)-4-(4''-p-toluenesulphonamidophenyl)-5-methyl-v-triazole. | 159–160 | 26 |
| 33.15 | 2-(2'-hydroxyphenyl)-4-phenyl-5-(2''-methoxycarbonyl-ethyl)-v-triazole. | 82 | 17 |
| 33.16 | 2-(2'-hydroxy-5'-carboethoxy-phenyl)-4-carboethoxy-5-(2''-carboethoxy-phenyl-v-triazole. | 97–98 | 20 |
| 33.17 | 2-(2'-hydroxyphenyl)-4,5-bis-(2''-methoxyphenyl)-v-triazole. | 109 | 1 |
| 33.18 | 2-(2'-hydroxyphenyl)-4-phenyl-5-(2''-hydroxy-4''-methoxyphenyl)-v-triazele. | 143 | 7 |
| 33.19 | 2-(2'-hydroxy-5'-chloracetamido-methylphenyl)-4-phenyl-5-methyl-v-triazole. | 124 | 9 |
| 33.20 | 2-[2'-hydroxy-5'-N,N-dibutyl-sulfamolyphenyl]-4,5-diphenyl-v-triazole. | 129 | 2 |
| 33.21 | 2-[2'-hydroxy-5'-N-benzyl-sulfamoyl-phenyl]-4,5-diphenyl-v-triazole. | 182 | 2 |
| 33.22 | 2-(2'-hydroxyphenyl)-4-(3'',4''-dichlorophenyl)-5-methyl-v-trizole. | 1 5 | 15 |
| 33.23 | 2-(2'-hydroxyphenyl)-4-(4''-carboxyphenyl)-5-methyl-v-triazole. | 234 | 15 |
| 33.24 | 2-(2'-hydroxyphenyl)-4-phenyl-v-triazole. | 84 | 1 |
| 33.25 | 2-(2'-hydroxy-5'-chlorophenyl)-4-phenyl-v-triazole. | 104 | 1 |

EXAMPLE 34

Production of 2-(2'-hydroxy-5'-methylphenyl)-4,5,6,7-tetrahydrobenzotriazole 22.5 g. of 2-(2'-hydroxy-5'-methylphenyl)-benzotriazole are dissolved in 750 ml. of ethyl acetate and, after adding 10 g. of Raney nickel, hydrogenated at room temperature (25°) and under ambient pressure. After 16½ hours, when about 4600 ml. of hydrogen have been absorbed, the hydrogenation ceases. The catalyst is removed by filtration, the solution is completely evaporated and the residue is crystallized. From ethanol: (34.1) 2-(2'-hydroxy-5'-methylphenyl)-tetrahydrobenzotriazole having a melting point of 101° is thus obtained.

By repeating the above procedure, but using an equivalent amount of 2-(2'-hydroxy-5'-methylphenyl)-5-methyl-benzotriazole or 2-(2'-hydroxy-5'-methylphenyl) - 5 - t-butyl-benzotriazole, respectively, in lieu of 2-(2'-hydroxy-5'-methylphenyl)benzotriazole (34.2) 2-(2'-hydroxy-5'-methylphenyl)-5-methyl - 4,5,6,7-tetrahydro-benzotriazole, or (34.3) 2-(2'-hydroxy-5'-methylphenyl)-5-t-butyl - 4,5,6,7-tetrahydro-benzotriazole
is obtained.

EXAMPLE 35

Production of 2-(2'-hydroxyphenyl)-4-cyano-v-triazole 220 g. of 1,1,3,3-tetraethoxypropane are suspended in 2000 ml. of 0.5 N hydrochloric acid and shaken in an apparatus for 4 hours at 25° until completely dissolved. To the malonaldehyde solution thus obtained, a diazonium chloride solution, obtained by diazotizing 109 g. of o-aminophenol, is added over a period of one hour at 0–5°, while the pH of the reaction mixture is kept at about 4.5 by the addition of sodium acetate. After stirring for five hours at 10–15° the precipitated 2-hydroxyphenyl-azo-malonaldehyde is filtered by suction, washed with water and recrystallized from glacial acetic acid/water. 94 g. of the resulting 2-hydroxyphenyl-azo-malonaldehyde are dissolved in 1000 ml. of ethanol and at 40° together with a solution of 75 g. of hydroxylamine hydrochloride and 150 g. of sodium acetate are added to 250 ml. of water. After some time 2-hydroxyphenyl-azo-malonaldoxime begins to crystallize and, after standing for 12 hours at 20°, it is separated by suction filtration.

44.5 g. of 2-hydroxyphenyl-azo-malonaldoxime are heated under reflux in 100 ml. of acetic acid anhydride for four hours. At that time, excess acetic acid anhydride and acetic acid, which has formed, are completely evaporated in vacuo. The residual 2-(2'-acetyloxyphenyl)-4-cyano-v-triazole is dissolved with methanolic sodium hydroxide solution at 40–50°. The alkaline solution is then acidified with glacial acetic acid, and 2-(2'-hydroxyphenyl)-4-cyano-v-triazole precipitate; it is recrystallized from methanol/water.

EXAMPLE 36

(36.1) Production of 2-(2'-hydroxyphenyl)-4-N,N-dibutylcarbamoyl-v-triazole 93 g. of 2-(2'-hydroxyphenyl)-4-cyano-v-triazole obtained as described in Example 35 are heated under reflux for 8 hours in 250 ml. of glacial acetic acid and 250 ml. of 48% hydrobromic acid. After cooling the reaction mixture to 25°, the 2-(2'-hydroxyphenyl)-4-carboxy-v-triazole, which has crystallized, is separated by suction filtration. After crystallization from chlorobenzene it has a melting point of 198°.

61.5 g. of 2-(2'-hydroxyphenyl)-4-carboxy-v-triazole are heated under reflux in 300 ml. of toluene with 100 g. of thionyl chloride until the development of hydrochloric acid is completed. After removal of the solvent and excess thionyl chloride by distillation, the resulting 2-(2'-hydroxyphenyl)-4-chlorocarbonyl-v-triazole is crystallized from ligroin.

22.4 g. of 2-(2'-hydroxyphenyl)-4-chlorocarbonyl-v-triazole are added in portions to a solution of 13 g. of dibutylamine in 150 ml. of pyridine at 35–40°. The reaction mixture is then stirred for one hour at the aforesaid temperature, diluted with 100 ml. of water and cooled to 10–15°. The 2-(2'-hydroxyphenyl)-4-N,N-dibutylcarbamoyl-v-triazole which precipitates is separated by suction filtration and recrystallized from ethanol/water.

By repeating the above procedure, but replacing the dibutylamine by an equivalent amount of one of the amines given in Table A, the v-triazoles given in Table B are obtained.

TABLE A

N-methyl-cyclohexylamine,
N-methyl-benzylamine,
N-butyl-ethanolamine,
3-methoxypropylamine,
octadecylamine,
allylamine,
diethanolamine.

TABLE B (36.2) 2-(2'-hydroxyphenyl)-4-N-methyl-N-cyclohexyl-carbamoyl-v-triazole,
(36.3) 2-(2'-hydroxyphenyl)-4-N-methyl-N-benzyl-carbamoyl-v-triazole,
(36.4) 2-(2'-hydroxyphenyl)-4-N-butyl-N-(β-hydroethyl)-carbamoyl-v-triazole,
(36.5) 2-(2'-hydroxyphenyl)-4-N-γ-methoxypropyl-carbamoyl-v-triazole,
(36.6) 2-(2'-hydroxyphenyl)-4-N-octadecyl-carbamoyl-v-triazole,
(36.7) 2-(2'-hydroxyphenyl)-4-N-allyl-carbamoyl-v-triazole,
(36.8) 2-(2'-hydroxyphenyl)-4-N,N-di-(β-hydroxyethyl)-carbamoyl-v-triazole.

EXAMPLE 37

(37.1) Production of the trisodium salt of 2-(2'-hydroxy-5-carboxyphenyl) - 4 - carboxy-5-(2''-carboxyphenyl)-v-triazole.

3.7 g. of 2-(2'-hydroxy-5'-carboxyphenyl)-4-carboxy-5-(2''-carboxyphenyl)-v-triazole (intermediate used for making the compound of Example 20.3) are dissolved in 100 ml. of methanol. After adding a solution of 1.2 g. of sodium hydroxide in 100 ml. of water, a solution of the trisodium salt of 2-(2'-hydroxy-5'-carboxyphenyl)-4-carboxy-5-(2''-carboxyphenyl) - v - triazole is obtained.

By repeating the above procedure, but replacing the sodium hydroxide used in the neutralization of the above-described tricarboxylic acid by an equivalent amount of one of the following bases, the following salts are obtained:

potassium hydroxide: (37.2) tripotassium salt of 2-(2'-hydroxy-5'-carboxyphenyl) - 4 - carboxy - 5 - (2''-carboxyphenyl)-v-triazole;
ammonium hydroxide: (37.3) tris-ammonium salt of 2-(2'-hydroxy - 5' - carboxyphenyl) - 4 - carboxy-5-(2''-carboxyphenyl)-v-triazole;
triethylamine: (37.4) tris-triethylammonium salt of 2-(2'-hydroxy-5'-carboxyphenyl) - 4 - carboxy - 5 - (2''-carboxyphenyl)-v-triazole;
isopropanolamine: (37.5) tris-isopropanolammonium salt of 2-(2'-hydroxy-5'-carboxyphenyl) - 4 - carboxy-5-(2''-carboxyphenyl)-v-triazole;
benzyl trimethylammonium hydroxide: (37.6) tris-(benzyl trimethylammonium) salt of 2-2'-hydroxy-5-carboxyphenyl) - 4 - carboxy - 5 - 2''-carboxyphenyl)-v-triazole.

EXAMPLE 38

Production of 2-(2'-hydroxy-5'-bromo-phenyl)-4-bromo-v-triazole

A solution of 125 g. of sodium nitrate in 175 ml. of water is poured quickly, at 60°, into a solution obtained from 14 g. of 2-(2'-methoxyphenyl)-4-amino-v-triazole and a mixture of 650 ml. of 48% hydrobromic acid and 700 ml. of water. The reaction mixture is then heated for 45 minutes under reflux and then cooled to 20°. The oil which precipitates is decanted and then refluxed for 5 hours with 100 ml. of a mixture of equal parts of glacial acetic acid and aqueous 48%-hydrobromic acid. By diluting the reaction solution with water, 2(2'-hydroxy-5'-bromophenyl)-4-bromo-v-triazole crystallizes, which, after suction filtration and recrystallization from alcohol, has a melting point of 146–147°.

EXAMPLE 39

A solution of 15 g. of acetyl cellulose having on the average 2.5 acetoxy groups per glucose unit and of 0.3 g. of one of the UV absorbers given in the following Table I, 2.0 g. of dibutyl phthalate and 82.7 g. of acetone is cast into a film on a glass plate. After evaporation of the acetone, cellulose acetate films are obtained which are dried first at room temperature and then in an oven at 60°. Samples of these 0.04 mm. thick films are exposed for 1000 hours in a Fade-O-Meter and tested as to their brittleness. The results obtained are given in Table I.

TABLE I.

| No. | UV absorber | Behaviour of film on folding |
|---|---|---|
| a | 2-(2-hydroxy-phenyl)-4,5-dicyclohexyl-v-triazole. | Can be folded. |
| b | 2-(2-hydroxy-phenyl)-4,5-dibutyl-v-triazole | Do. |
| c | 2-[2-hydroxy-3-(2-octylmercaptopropionyl-amidomethyl)-5-methyl-phenyl]-4,5-diphenyl-v-triazole. | Do. |
| d | 2-[2-hydroxy-3-methallyl-phenyl]-4,5-diphenyl-v-triazole. | Do. |
| e | 2-(2-hydroxy-phenyl)-4-decyl-5-phenyl-v-triazole. | Do. |
|  | None | Brittle. |

These films show only a slight loss of transmission during the exposure time mentioned which, compared with the unavoidable variations in thickness, is not of material importance.

EXAMPLE 40

As the films of Example 39 have too slight loss of transmission, i.e. a too constant filter action, for exact measurement of the loss of UV absorption, which is due to photolysis and sublimation, analogous films were produced which, however, only contained 0.03 g. UV absorber instead of 0.3 g. After 500 hours' exposure in the Fade-O-Meter, the films suitable as UV filters were tested as to their remaining UV absorption. The UV absorbers listed in Table II gave the results shown, measured in the range of 300 to 330 nm.

TABLE II

| No. | UV absorber | Percent[1] |
|---|---|---|
| a | 2-(2-hydroxy-phenyl)-4,5-dicyclohexyl-v-triazole | 65 |
| b | 2-(2-hydroxy-phenyl)-4,5-dibutyl-v-triazole | 66 |
| c | 2-[2-hydroxy-3-(2-octylmercaptopropionylamidomethyl)-5-methyl-phenyl]-4,5-diphenyl-v-triazole. | 81 |
| d | 2-(2-hydroxy-3-methallyl-phenyl)-4,5-diphenyl-v-triazole. | 80 |
| e | 2-(2-hydroxy-phenyl)-4-decyl-5-phenyl-v-triazole | 87 |
| f | 2-(2-hydroxy-phenyl)-4,5-bis-(4-methoxy-phenyl)-v-triazole. | 70 |
| g | 2-(2-hydroxy-phenyl)-4,5-bis-(4-hydroxy-phenyl)-v-triazole. | 44 |
| h | 2-(2-hydroxy-phenyl)-4-methyl-5-phenyl-v-triazole | 87 |
| i | 2-(2-hydroxy-5-methoxy-phenyl)-4,5-diphenyl-v-triazole. | 64 |
| j | 2-(2-hydroxy-5-cyclohexyl-phenyl)-4,5-diphenyl-v-triazole. | 88 |
| k | 2-(2-hydroxy-5-phenyl-phenyl)-4,5-bis-(4-chlorophenyl)-v-triazole. | 75 |
| l | 2-(2-hydroxy-5-t.butyl-phenyl)-4,5-bis-(4-chlorophenyl)-v-triazole. | 88 |
| m | 2-(2-hydroxy-5-ethoxycarbonyl-phenyl)-4-ethoxycarbonyl-5-(2-ethoxycarbonyl-phenyl)-v-triazole. | 96 |
| n | 2-(2-hydroxy-5-chlorophenyl)-4-ethoxycarbonyl-5-(2-ethoxycarbonyl-phenyl)-v-triazole. | 95 |
| o | 2-(2-hydroxy-phenyl)-4,5-diphenyl-v-triazole | 97 |
| p | 2-(2-hydroxy-5-benzyl-phenyl)-4,5-diphenyl-v-triazole | 89 |
| q | 2-(2-hydroxy-phenyl)-4-ethoxycarbonyl-5-methyl-v-triazole. | 80 |
| r | 2-(2-hydroxy-phenyl)-4,5-bis-(ethoxycarbonyl)-v-triazole. | 95 |
| s | 2-(2-hydroxy-3,5-dimethyl-phenyl)-4,5-diphenyl-v-triazole. | 85 |
| t | 2-(2-hydroxy-3-octyl-5-methyl-phenyl)-4,5-diphenyl-v-triazole. | 88 |
| u | 2-(2-hydroxy-3-acryloylamidomethyl-5-methylphenyl)-4,5-diphenyl-v-triazole. | 80 |
| v | 2-[2-hydroxy-3-[(2-oxo-perhydro-1-azepinyl)-methyl]-5-methyl-phenyl]-4,5-diphenyl-v-triazole. | 79 |
| w | 2-[2-hydroxy-3-(2-methylpropyl)-phenyl]-4,5-diphenyl-v-triazole. | 93 |
| x | 2-(2-hydroxy-phenyl)-4,5-bis-(4-methyl-phenyl)-v-triazole. | 88 |
| y | 2-(2-hydroxy-phenyl)-4-phenyl-5-(3-butyroylamidophenyl)-v-triazole. | 70 |
| z | 2,2'-bis-(2-hydroxy-phenyl)-[4,4'-bi-v-triazole]-5,5'-dicarboxylic acid dimethyl ester. | 94 |

[1] Original UV absorption present after exposure.

EXAMPLE 41

Difficultly combustible polyester resins, after the addition of 0.5% by weight of a UV absorber given in Table III, is polymerised at 80° with 1% by weight of benzoyl peroxide to form 2.5 mm. thick sheets. The sheets are then cured at 120°.

Sheets so produced and exposed show considerably less browning than sheets similarly exposed but produced without the UV absorber mentioned above.

The polyester resin used was produced as follows: A mixture of 343 g. of maleic acid anhydride and 428 g. of tetrachlorophthalic acid anhydride is added in portions at 80° to a mixture of 170 g. of ethylene glycol and 292 g. of diethylene glycol. After replacing the air in the reaction vessel by nitrogen, the temperature is raised within 1 hour to 150°, then with 9 hours to 210° and afterwards maintained for 1 hour. The mass is then cooled to 180°, placed under vacuum and the pressure is slowly reduced to 100 torr. These conditions are maintained until the acid number of the reaction mixture has dropped to below 50.

100 g. of the polyester so obtained is mixed with 50 g. of styrene and the mixture is polymerised under the conditions given above.

Similar results are obtained if, instead of tetrachlorophthalic acid, the equivalent amount of phthalic acid anhydride is used, but the resultant polyester resin is not then difficultly inflammable.

If in the above process, the styrene is replaced by methyl methacrylate, then sheets are obtained which have less tendency to browning and, in addition, can be more easily stabilised.

TABLE III

| No. | UV absorber | Percent Transmission[1] | Loss of transmission[2] |
|---|---|---|---|
| | None | 88 | 31 |
| a | 2-(2-hydroxy-5-chlorophenyl)-4-ethoxycarbonyl-5-(2-ethoxycarbonylphenyl)-v-triazole. | 87 | 13 |
| b | 2-(2-hydroxy-5-tert. butyl-phenyl)-4,5-bis-(4-chlorophenyl)-v-triazole. | 88 | 19 |
| c | 2-(2-hydroxy-5-phenyl-phenyl)-4,5-bis-(4-chlorophenyl)-v-triazole. | 88 | 14 |
| d | 2-(2-hydroxy-5-methoxy-phenyl)-4,5-bis-(4-chlorophenyl)-v-trizole. | 87 | 18 |
| e | 2-(2-hydroxy-phenyl)-4,5-bis-ethoxycarbonyl-v-triazole. | 88 | 19 |
| f | 2-(2-hydroxy-phenyl)-4-(3-piperidinosulphonyl-phenyl)-5-phenyl-v-triazole. | 88 | 20 |

[1] At 440 nm. before exposure.
[2] At 440 nm. after 1,000 hours' fade-o-meter exposure.

EXAMPLE 42

100 parts of methacrylic acid methyl ester, 0.5 part of a UV absorber given in Table IV and 0.2 part of lauroyl peroxide are mixed and polymerised at a temperature of 50–70° into sheets of 2 mm. thickness.

As can be seen from the following table, such sheets can be used as colourless UV filters.

TABLE IV

| | | Percent transmission of light of wavelength | |
|---|---|---|---|
| No. | UV absorber | 340 nm. | 430 nm. |
| | None | 86 | 92 |
| a | 2-(2-hydroxy-3-allyl-phenyl)-4-methyl-5-phenyl-v-triazole. | <2 | 92 |
| b | 2-(2-hydroxy-3,4-dimethyl-phenyl)-4,5-diphenyl-v-triazole. | <2 | 92 |
| c | 2-(2-hydroxy-4-octyloxy-phenyl)-4,5-diphenyl-v-triazole. | <2 | 92 |
| d | 2-(2-hydroxy-5-N-benzyl-methoxycarbonyl-amido-phenyl)-4,5-dimethyl-v-triazole. | <2 | 92 |
| e | 2-(2-hydroxy-4-N-methyl-benzoylamido-phenyl)-4,5-diphenyl-v-triazole. | <2 | 92 |
| f | 2-(2-hydroxy-5-diethylamidosulphonyl-phenyl)-4,5-diphenyl-v-triazole. | <2 | 92 |
| g | 2-(2-hydroxy-5-morpholinosulphonyl-phenyl)-4-ethyl-5-methyl-v-triazole. | <2 | 92 |
| h | 2-(2-hydroxy-5-piperidinosulphonyl-phenyl)-4-phenyl-5-propyl-v-triazole. | <2 | 92 |
| i | 2-(2-hydroxy-5-dibutyl-amidocarbonyl-phenyl)-4,5-diphenyl-v-triazole. | <2 | 92 |
| j | 2-(2-hydroxy-5-morpholinocarbonyl-phenyl)-4,5-diphenyl-v-triazole. | <2 | 92 |
| k | 2-(2-hydroxy-5-piperidinocarbonyl-phenyl)-4,5-diphenyl-v-triazole. | <2 | 92 |
| l | 2-(2-hydroxy-phenyl)-4-(3-N-benzyl-acetyl-amido-phenyl)-5-phenyl-v-triazole. | <2 | 92 |
| m | 2-(2-hydroxy-phenyl)-4-(3-N-butyl-methoxy-carbonylamido-phenyl)-5-phenyl-v-triazole. | <2 | 92 |
| n | 2-(2-hydroxy-phenyl)-4-(3-diethylaminosulphonyl-phenyl)-5-phenyl-v-triazole. | <2 | 92 |
| o | 2-(2-hydroxy-phenyl)-4,5-difuranyl-v-triazole. | <2 | 92 |
| p | 2-(2-hydroxy-phenyl)-4-methyl-5-thienyl-v-triazole. | <2 | 92 |
| q | 2-(2-hydroxy-phenyl)-4,5-di-(3-pyridyl)-v-triazole. | <2 | 92 |

EXAMPLE 43

A mixture of:

100 parts of suspension polyvinyl chloride (K value 60),
2.5 parts of a dialkyl tin mercaptide stabiliser (Advastab 17 M, produced by Deutschen Advance Produktion GmbH, Germany)

1.0 part of an epoxy stabiliser (Advaplast 39 produced by the above company)

1.0 part of a wax used as lubricant and working auxiliary (Wax E produced by Farbwerke Hoechst, Germany) and
0.2 part of a UV absorber given in Table V is worked up in a set of two mixing rollers in the usual way into films.

Samples of these films are exposed for 2000 hours in a Xenotest exposure apparatus and changes in colour are checked. The results are given in Table Va.

TABLE Va

| No. | UV absorber | Appearance of exposed sample |
|---|---|---|
| | None | Colour of whole sample greatly changed. |
| a | 2-(2-hydroxy-phenyl)-4-ethoxy-carbonyl-5-(2-ethoxycarbonyl-phenyl)-v-triazole. | Slight browning but only in spots. |
| b | 2-(2-hydroxy-5-chlorophenyl)-4,5-bis-(4-chlorophenyl)-v-triazole. | Just noticeable spots beginning to be formed. |
| c | 2-(2-hydroxy-5-phenylphenyl)-4-diethylaminocarbonyl-5-(2-diethyl-aminocarbonylphenyl)-v-triazole. | A few slightly brownish spots. |

If instead of the above mixture, one of the following prescription is used and otherwise the same procedure is followed, then the results given in Table Vb are obtained:

100 parts of suspension polyvinyl chloride (K value 62)
1.2 parts of a barium-cadmium soap (Mark WS of S. A. Argus Chemical N.V., Belgium)
0.5 part of an organic phosphite (Mark C of the above firm)
1.0 part of a wax (Wax E of Farbwerke Hoechst, Germany) and
0.2 part of the UV absorber given in Table Vb.

TABLE Vb

| No. | UV absorber | Appearance of exposed sample |
|---|---|---|
| | None | Very brown colouring of whole sample. |
| a | 2-(2-hydroxy-5-chlorophenyl)-4-ethoxycarbonyl-5-(2-ethoxycarbonyl-phenyl)-v-triazole. | A few just noticeable spots formed. |
| b | 2-(2-hydroxy-phenyl)-4-(3,4-dichloro-phenyl)-5-phenyl-v-triazole. | A few slightly brownish spots. |
| c | 2-(2-hydroxy-phenyl)-4-[3-N-methyl-(2-methoxypropylamino)-sulphonyl-phenyl]-5-phenyl-v-triazole. | Do. |

EXAMPLE 44

100 parts of polyethylene (density 0.917) and 1 part of a UV absorber given in Table VI and 0.5 part of 3-(3,5-di-t. butyl-4-hydroxy-phenyl)-propionic acid octadecyl ester are homogeneously mixed in a Brabender plastograph at 180°. The mass obtained is then pressed at 165° into 1 mm. thick sheets.

These sheets have considerably less tendency to become brittle on weathering than those not containing the additive of Table VI.

TABLE VI

No.:     UV absorber
(a)—2-(2-hydroxy-5-octylphenyl)-4,5-diphenyl-v-triazole
(b)—2-(2-hydroxy-5-octylphenyl)-4-benzyl-5-phenyl-v-triazole
(c)—2-(2-hydroxy-phenyl)-4-decyl-5-phenyl-v-triazole
(d)—2-(2-hydroxy-phenyl)-v-triazole-4,5-dicarboxylic acid dioctyl ester If instead of the phenolic antioxidant mentioned above, the same amount of 3,5-di-t.butyl-4-hydroxy-benzyl-di-octadecylphosphonate is used then with otherwise the same procedure, similar results are obtained.

EXAMPLE 45

100 parts of polypropylene (density 0.96), 1 part of a UV absorber given in Table VII, 0.2 part of bis-(5-t.-butyl-4-hydroxy-2-methylphenyl)-sulphide, 0.2 part of dilauryl thiodipropionic acid and 0.2 part of trioctadecyl phosphite are homogeneously mixed in a Brabender plastograph at 220°. The mass so obtained is pressed into 1 mm. thick sheets at 180°.

These sheets have considerably less tendency to crack on weathering than sheets not containing the UV absorber of Table VII but otherwise produced in the same way.

TABLE VII

No.:     UV absorber
(a)—2-(2-hydroxy-phenyl)-4-decyl-5-phenyl-v-triazole
(b)—2,2'-bis-(2-hydroxy-phenyl)-[4,4'-bi-v-triazole]-5,5'-dicarboxylic acid dioctyl ester
(c)—(2-hydroxy-phenyl)-4,5-bis-(4-octyl-phenyl)-v-triazole
(d)—2-(2-hydroxy-phenyl)-4-(4-octyloxy-phenyl)-5-phenyl-v-triazole
(e)—2-(2-hydroxy-phenyl)-4-(2-octyloxycarbonyl-phenyl)-v-triazole-5-carboxylic acid octyl ester

EXAMPLE 46

100 parts of polystyrene granulate and 0.3 part of a UV absorber according to Table VIII and 0.1 part of 2,4,6-tri-t.butylphenol are mixed in a dry state and cast into 2 mm. thick sheets from an injection moulding machine.

The sheets obtained are exposed for 1000 hours in a Xenotest apparatus and then their yellowing is determined by means of the yellowing factor as follows:

$$Y.F. = \frac{\Delta T(420) - \Delta T(680)}{T(560)} \cdot 100$$

wherein $\Delta T$ means the loss of transmission at wavelengths 420 or 680 nm. during the exposure and $T(560)$ means the transmission in percent of that of an unexposed sample at 560 nm.

TABLE VIII

| No. | UV absorber | Y.F. |
|---|---|---|
| | None | 15 |
| a | 2-(2-hydroxy-phenyl)-4-methyl-5-phenyl-v-triazole | 7 |
| b | 2-(2-hydroxy-phenyl)-4-methyl-5-(4-methylbenzyl)-v-triazole. | 8 |
| c | 2-(2-hydroxy-phenyl)-4-(4-ethoxy-benzyl)-5-methyl-v-triazole. | 8 |

EXAMPLE 47

Bleached maple veneer is painted with a lacquer for wood of the following composition:

| | Parts by wt. |
|---|---|
| Cellulose acetate containing about 56% acetic acid (e.g. Cellit F 900) | 15.0 |
| Dimethyl glycol phthalate | 10.0 |
| 2-(2-hydroxy - 3 - [2-(ethoxycarbonyl-ethylthio)-propionylamidomethyl] - 5 - methyl-phenyl)-4,5-diphenyl-v-triazole | 2.0 |
| Methyl alcohol | 5.0 |
| Toluene | 10.0 |
| Ethyl acetate | 50.0 |

The natural yellowing of the wood is retarded by this lacquer.

EXAMPLE 48

100 parts of granulated polycaprolactam (Grilon, Emserwerke A.G., Domat-Ems, Switzerland) and 1 part of a compound given in Table IX are melted at 255° while excluding air in an autoclave having a die in the bottom. The melt is extruded through the die by nitrogen pressure.

The monogeneous mass so obtained absorbs UV light and can be used to produce UV-impermeable packing materials.

UV-impermeable material is also obtained if instead of polycaprolactam, polyhexamethylene adipamide is used.

TABLE IX

No.: UV absorber
(a)—2-(2-hydroxy-phenyl) - 4,5 - diphenyl-v-triazole
(b)—2-(2-hydroxy - 4 - acetylamido - phenyl)-4,5-diphenyl-v-triazole
(c)—2-(2-hydroxy-phenyl) - 4 - (2-morpholinocarbonyl-phenyl)-v-triazole - 5 - carboxylic acid morpholide
(d)—2-(2-hydroxy-phenyl) - 4 - (2-carboxy-phenyl)-v-triazole-5-carboxylic acid

EXAMPLE 49

1.0 g. of Malachite Green (C.I. Basic Green 4, C.I. 42,000) and 1.0 g. of a UV absorber given in Table X are slurried with 2 ml. of 80% aqueous acetic acid solution and 4000 ml. of water are poured in while stirring. 3 g. of crystallised sodium acetate and 4 g. of a condensation product of oleyl alcohol with 15 mols of ethylene oxide are added to the resultant solution which is then heated to 50°. 100 g. of polyacrylonitrile fibers containing sulphonic acid groups (Orlon 42, Du Pont, USA) are introduced and the temperature is raised to the boil within 15 minutes. Dyeing is performed for 1 hour at the boil after which the bath is exhauted for all practical purposes. The dyed goods are then soaked at 80° for 15 minutes in a solution of 6 g. of the sodium salt of N-oleyl-N-methyl taurine, then washed in flowing water and dried.

Compared with the same dyeings without the addition of UV absorber, the dyeings obtained have increased fastness to light.

TABLE X

No.: UV absorber
(a)—2-(2-hydroxy - 5 - methyl - phenyl)-4-(5-trimethylammoniopentyl) - 5 - phenyl - v - triazole-methyl sulphate
(b)—2-(2-hydroxy - 3 - trimethylammonio-acetamidomethyl - 5 - methyl-phenyl)-5-methyl-4-phenyl-v-triazole-p-toluene sulphonate Similar results are obtained when dyeing is performed when the dyestuff and UV absorber are used separately instead of together.

The light fastness of polyethylene glycol terphthalates containing sulphonic acid groups (Dacron 64, Du Pont, USA) can be improved by dyeing in an analogous way with a cationic UV absorber.

EXAMPLE 50

A UV absorber for cosmetic purposes is obtained as follows:

| | Parts |
|---|---|
| White ceresine wax | 5 |
| White petrolatum | 22 |
| White mineral oil | 19.5 |
| Lanolin, anhydrous | 15 |
| 2-(2-hydroxy-phenyl) - 4 - methyl - 5 - hexyl-v-triazole | 2 |
| Water | 36 |
| Perfume | 0.5 |

The ceresine, petrolatum and lanolin are melted together and the UV absorber is dissolved in the melt. The mineral oil is then added at 70° after which the water is stirred in at the same temperature. Stirring is continued until the temperature has dropped below 50° whereupon the perfume is added.

EXAMPLE 51

A UV absorber for cosmetic purposes which can be sprayed is obtained by dissolving 10 parts of ricinoleic acid methyl ester, 10 parts of oleyl alcohol and 1 part of 2-(2-hydroxyphenyl)-4-methyl - 5 - ethyl-v-triazole in 80 parts of ethanol. After the addition of a usual commercial propellant containing fluorine (e.g. Freon products, Du Pont, USA), the solution can be sprayed from an aerosol container.

We claim:
1. A compound of the formula:

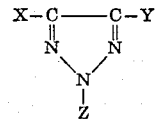

wherein:

each of X and Y represents, independently of the other, (A) chlorine; (B) bromine; (C) hydrogen; (D) cyano; (E) —NH—E—R; (F) —COO⁻M⁺; (G) —COOR$_2$′;

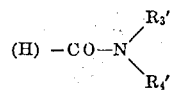

R$_2$′ represents hydrogen, alkyl of at most 18 carbon atoms, hydroxy-lower alkyl, lower alkoxy-lower alkyl or lower alkenyl;

R$_3$′ represents hydrogen, alkyl of at most 18 carbon atoms, hydroxy-lower alkyl, lower alkoxyl-lower alkyl, lower alkenyl, benzyl or cyclohexyl;

R$_4$′ represents lower alkyl or hydroxy-lower alkyl,

M⁺ represents an alkali metal ion or an optionally substituted ammonium ion any substituent of which is selected from lower alkyl, hydroxy-lower alkyl and benzyl;

E represents CO or SO$_2$, and

R represents alkyl of at most 17 carbon atoms, alkoxy of at most 8 carbon atoms, cyclohexyl, benzyl, cyclohexyloxy, benzyloxy, phenoxy or a phenyl radical any substituent of which is selected from lower alkyl, lower alkoxy and halogen.

(I) a non-colour-imparting monovalent organic radical selected from
(1) alkyl of at most 16 carbon atoms;
(2) cycloalkyl of from 5 to 6 carbon atoms;
(3) a substituted lower alkyl group of the formula

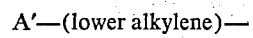

wherein:
A′ represents lower alkoxy, lower alkoxy-carbonyl, lower alkylthio, phenyl or alkoxy-phenyl, wherein alkoxy has a total of at most 8 carbon atoms;
(4) a phenyl radical any substituent of which is selected from
(a) nitro,
(b) cyano,
(c) halogen,
(d) hydroxy,
(e) alkyl of at most 12 carbon atoms,
(f) alkoxy of at most 12 carbon atoms,
(g) benzyloxy,
(h) lower alkenyloxy,
(i) alkanoyloxy of at most 12 carbon atoms,
(j) benzoyloxy,
(k) —NH—E—R
wherein E and R have the aforesaid meanings,
(l) —COO⁻M⁺ wherein M⁺ has the aforesaid meaning,
(m) —COOR$_2$′ wherein R$_2$′ has the aforesaid meaning,

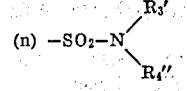

wherein R$_3$′ has the aforesaid meaning, and R$_4$″ represents hydrogen, lower alkyl or hydroxy-lower alkyl;

(5) a mononuclear aromatic heterocyclic radical having from 5 to 6 ring members one of which is a hetero atom selected from nitrogen, sulfur and oxygen, the remaining ring members being carbon atoms; or X and Y together represent a tetramethylene radical substituted by from 0 to 2 lower alkyl groups; and Z is an o-hydroxyphenyl radical any substituent of which is selected from
(1) alkyl of at most 18 carbon atoms,
(2) a substituted lower alkyl radical the substitution of which is selected from:

(a) a group 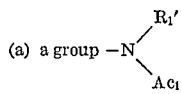

wherein $R_1'$ represent hydrogen or lower alkyl, and $AC_1$ is selected from
  (i) alkanoyl of at most 18 carbon atoms,
  (ii) lower alkenoyl,
  (iii) substituted lower alkanoyl the substitution of which is selected from halogen, phenyl, phenylthio, cyclohexylthio, benzylthio, hydroxy-lower alkylthio, or carboxy-lower alkylthio,
  (iv) amino-lower alkanoyl, wherein the amino moiety is

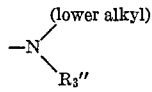

and $R_3''$ represents lower alkyl, cyclohexyl or benzyl;
  (v) mono-oxa-alkanoyl of a total of at most 14 carbon atoms,
  (vi) monothia-alkanoyl of a total of at most 14 carbon atoms,
  (vii) cyclohexanoyl,
  (viii) a benzoyl radical any substituent of which is selected from halogen, lower alkyl or lower alkoxy, and
  (ix) lower alkoxy-carbonyl;
(b) a radical of the formula

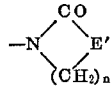

wherein
  E' represents —CH$_2$— or —O—, and
  $n$ is an integer ranging from 2 to 6;
(3) a lower alkenyl radical any substituent of which is selected from halogen and phenyl;
(4) cyclohexyl;
(5) lower alkyl-cyclohexyl;
(6) phenyl,
(7) phenyl-lower alkyl;
(8) halogen;
(9) hydroxy;
(10) alkoxy of at most 12 carbon atoms;
(11) lower alkenyloxy;
(12) benzyloxy;
(13) alkanoyloxy of at most 12 carbon atoms;
(14) benzoyloxy;
(15) —COOH;
(16) —SO$_3$H;
(17) a group —E—O$^-$M$^+$ wherein E represents CO or SO$_2$, and M$^+$ has the aforesaid meaning;
(18) lower alkoxy carbonyl;
(19) a group —NH—E—R, and
(20) a group

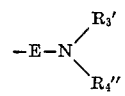

E, R and $R_3'$ in the latter two groups having the aforesaid meanings, and $R_4''$ in the latter group represents hydrogen, alkyl of at most 8 carbon atoms, hydroxy-lower alkyl or lower alkoxy-lower alkyl.

2. A compound as defined in claim 1, wherein each of X and Y represent a phenyl radical as defined under (4).

3. A compound as defined in claim 2, which is 2-(2'-hydroxy-phenyl)-4,5-di-phenyl-v-triazole.

4. A compound as defined in claim 2, which is 2-(2'-hydroxy-3',5'-di-t-butyl-phenyl)-4,5-di-phenyl-v-triazole.

5. A compound as defined in claim 2, which is 2-(2'-hydroxy-5'-octyl-phenyl)-4,5-di-phenyl-v-triazole.

6. A compound as defined in claim 1, which is 2-(2'-hydroxy-phenyl)-4-decyl-5-phenyl-v-triazole.

References Cited
UNITED STATES PATENTS 3,189,615    6/1965    Heller et al. _____ 260—308
3,271,412    9/1966    Rawe et al. _____ 260—308

ALTON D. ROLLINS, Primary Examiner

U.S. Cl. X.R.

106—124, 176; 260—45.8 N, 45.85 N, 45.8 NZ, 239.3 R, 240 K, 244 R, 247.1, 247.5 R, 248 R, 249.6, 249.8 288 R, 293.4 G, 294.7 E, 294.7 F, 294.8 R, 294.8 F, 294.9 295 R, 295 K, 295 L, 296, 299, 304, 307 C, 308 B, 566 A

UNITED STATES PATENT OFFICE
CERTIFICATE OF CORRECTION

Patent No. 3,642,813      Dated Feb. 15, 1972

Inventor(s) Rudolf Kirchmayr, Hans-Jorg Heller & Jean Rody

It is certified that error appears in the above-identified patent and that said Letters Patent are hereby corrected as shown below:

Column 14, line 22 "C-OO" should read "C-OH".

Column 17, line 62 "4-4methyl" should read "4-methyl".

Column 32, line 3 "N-(3-)" should read "N-(β-)".

Column 32, line 15 "N-(3-)" should read "N-(β-)".

Column 52, line 32, Melting Point Degree column, " 1 5" should read "135".

Signed and sealed this 13th day of March 1973.

(SEAL)
Attest:

EDWARD M. FLETCHER, JR.       ROBERT GOTTSCHALK
Attesting Officer      Commissioner of Patents